US012809056B2

(12) United States Patent
ElKabbash et al.

(10) Patent No.: US 12,809,056 B2

(45) Date of Patent: Nov. 24, 2026

(54) FANO RESONANT OPTICAL COATING

(71) Applicants: University of Rochester, Rochester, NY (US); Case Western Reserve University, Cleveland, OH (US)

(72) Inventors: Mohamed ElKabbash, Cambridge, MA (US); Chunlei Guo, Rochester, NY (US); Michael Hinczewski, Beachwood, OH (US); Giuseppe Strangi, Cleveland, OH (US)

(73) Assignee: University of Rochester, Rochester, NY (US)

( * ) Notice: Subject to any disclaimer, the term of this patent is extended or adjusted under 35 U.S.C. 154(b) by 587 days.

(21) Appl. No.: 17/703,618

(22) Filed: Mar. 24, 2022

(65) Prior Publication Data

US 2022/0308264 A1 Sep. 29, 2022

Related U.S. Application Data

(60) Provisional application No. 63/165,881, filed on Mar. 25, 2021.

(51) Int. Cl.

| | |
|---|---|
| ***G02B 1/00*** | (2006.01) |
| ***G02B 1/11*** | (2015.01) |
| ***G02B 5/00*** | (2006.01) |

(52) U.S. Cl.

CPC ................ *G02B 1/005* (2013.01); *G02B 1/11* (2013.01); *G02B 5/003* (2013.01)

(58) Field of Classification Search

CPC .......... G02B 1/005; G02B 1/11; G02B 5/003; G02B 5/22; G02B 1/00

See application file for complete search history.

(56) References Cited

U.S. PATENT DOCUMENTS

| | | | | |
|---|---|---|---|---|
| 5,337,191 A * | 8/1994 | Austin | C03C 17/3618 | 359/359 |
| 5,381,149 A * | 1/1995 | Dougherty | H01Q 17/00 | 501/12 |
| 6,177,673 B1 * | 1/2001 | Blomberg | G02B 5/22 | 250/370.08 |
| 2004/0095645 A1 * | 5/2004 | Pellicori | G02B 5/285 | 359/584 |
| 2010/0096011 A1 * | 4/2010 | Griffiths | G02B 5/288 | 257/E31.127 |

(Continued)

OTHER PUBLICATIONS

Limonov, M. F., et al., Fano resonances in photonics. Nature Photonics vol. 11, 543-544 (2017).

(Continued)

*Primary Examiner* — William R Alexander

*Assistant Examiner* — Gabriel A Sanz

(74) *Attorney, Agent, or Firm* — Harris Beach Murtha Cullina PLLC

(57) ABSTRACT

An optical coating includes a first resonator with a broadband light absorber. A second resonator includes a narrowband light absorber which is disposed adjacent to and optically coupled to the broadband light absorber. The phase of light reflected from the first resonator slowly varies as a function of wavelength compared to the rapid phase change of the second resonator which exhibits a phase jump within the bandwidth of the broadband light absorber. A thin film optical beam spitter filter coating is also described.

1 Claim, 33 Drawing Sheets

(56) References Cited

U.S. PATENT DOCUMENTS

| | | | | |
|---|---|---|---|---|
| 2014/0268332 | A1* | 9/2014 | Guo | G02B 5/008 359/885 |
| 2015/0241612 | A1* | 8/2015 | Talvitie | G02B 5/22 250/493.1 |
| 2018/0131311 | A1* | 5/2018 | Karalis | H01L 31/022425 |
| 2019/0056544 | A1* | 2/2019 | Bahabad | G02B 5/203 |
| 2021/0057676 | A1* | 2/2021 | Montgomery | H10K 50/81 |
| 2022/0199840 | A1* | 6/2022 | Meerheim | H10F 77/413 |
| 2022/0293666 | A1* | 9/2022 | Sellers | H01L 27/1462 |

OTHER PUBLICATIONS

Miroshnichenko, A. E., et al. Fano Resonances: A Discovery that Was Not Made 100 Years Ago. Opt. Photon. News 19, 48-48 (2008).

Giannini, V., et al., Fano Resonances in Nanoscale Plasmonic Systems: A Parameter-Free Modeling Approach. Nano Letters 11, 2835-2840 (2011).

Mukherjee, S., et al., Fanoshells: Nanoparticles with Built-in Fano Resonances. Nano Letters 10, 2694-2701 (2010).

Zhang, S., et al., Substrate-Induced Fano Resonances of a Plasmonic Nanocube: A Route to Increased-Sensitivity Localized Surface Plasmon Resonance Sensors Revealed. Nano Letters 11, 1657-1663 (2011).

Luk'yanchuk, B., et al. The Fano resonance in plasmonic nanostructures and metamaterials. Nature Materials vol. 9, 707-715 (2010).

Fan, J. A., et al., Self-Assembled Plasmonic Nanoparticle Clusters. Science vol. 328, 1135-1138 (2010).

Verellen, N., et al. Fano Resonances in Individual Coherent Plasmonic Nanocavities. Nano Letters vol. 9, 1663-1667 (2009).

Fedotov, V. A., et al., Sharp Trapped-Mode Resonances in Planar Metamaterials with a Broken Structural Symmetry. Physical Review Letters 99, 147401-147404 (2007).

Yang, Y., et al., All-dielectric metasurface analogue of electromagnetically induced transparency. Nature Communications 5, 5753 (2014).

Shen, Y. et al., Structural Colors from Fano Resonances. ACS Photonics 2, 27-32 (2015).

Khurgin, J. B., Slow light in various media: a tutorial. Advance in Optics and Photonics, vol. 2, 287-318 (2010).

Miroshnichenko, A. E., et al., Fano resonances in nanoscale structures. Reviews of Modern Physics vol. 82, 2257-2298 (2010).

Ruan, B., et al. Ultrasensitive Terahertz Biosensors Based on Fano Resonance of a Graphene/Waveguide Hybrid Structure. Sensors (Basel, Switzerland) 17, 1924 (2017).

Wu, C., et al. Fano-resonant asymmetric metamaterials for ultrasensitive spectroscopy and identification of molecular monolayers. Nature Materials vol. 11, 69-75 (2011).

Sounas, D. L., et al., Fundamental bounds on the operation of Fano nonlinear isolators. Physical Review B 97, 115431-1-115431-10 (2018).

Cordaro, A., et al., High-Index Dielectric Metasurfaces Performing Mathematical Operations vol. 19, 08418-8423 (2019).

Sonnefraud, Y., et al. Experimental Realization of Subradiant, Superradiant, and Fano Resonances in Ring/Disk Plasmonic Nanocavities. ACS Nano vol. 4, 1664-1670 (2010).

Liu, N., et al. Plasmonic analogue of electromagnetically induced transparency at the Drude damping limit. Nature Materials vol. 8, 758-762 (2009).

Gallais, L., et al., Laser-induced damage thresholds of bulk and coating optical materials at 1030 nm, 500 fs. Applied Optics, vol. 53, A186-A196 (2014).

Anjum, F., et al., Improving silver mirrors with aluminum oxynitride protection layers: variation in refractive index with controlled oxygen content by radiofrequency magnetron sputtering. Journal of Astronomical Telescope, Instruments and Systems, vol. 4, 044004-1-04404-10 (SPIE, 2018).

Tannas, L.E., Flat-panel displays displace large, heavy, power-hungry CRTs. IEEE Spectr. 26, 34-35 (1989).

Hornbeck, L. J., Digital Light Processing for high-brightness high-resolution applications. vol. 3013 EI (SPIE, 1997).

Dobrowolski, J. A., et al., Research on thin film anticounterfeiting coatings at the National Research Council of Canada. Applied Optics, vol. 28, 2702-2717 (1989).

Granqvist, C. G., et al., Surfaces for radiative cooling: Silicon monoxide films on aluminum. Applied Physics Letters 36, 139-141 (1980).

Raman, A. P., et al., Passive radiative cooling below ambient air temperature under direct sunlight. Nature, vol. 515, 540 (2014).

Chen, Z., et al., Radiative cooling to deep sub-freezing temperatures through a 24-h day-night cycle. Nature Communications 7, 13729 (2016).

Chen, D., Anti-reflection (AR) coatings made by sol-gel processes: A review. Solar Energy Materials and Solar Cells 68, 313-336 (2001).

Li, Z., et al., Large-Area, Lithography-Free Super Absorbers and Color Filters at Visible Frequencies Using Ultrathin Metallic Films. ACS Photonics 2, 183-188 (2015).

ElKabbash, M., et al., Designer Perfect Light Absorption Using Ultrathin Lossless Dielectrics on Absorptive Substrates. Advanced Optical Materials 6, 1800672 (2018).

Kats, M. A., et al., Nanometre optical coatings based on strong interference effects in highly absorbing media. Nature Materials vol. 12, 20-24 (2013).

Elkabbash, M., et al., Iridescence-free and narrowband perfect light absorption in critically coupled metal high-index dielectric cavities. Optic Letters, vol. 42, 3598-3601 (2017).

Svensson, J. S. E. M. & Granqvist, C. G. Electrochromic Coatings For "Smart Windows". Solar Energy Materials, vol. 12, 391-402 (1985).

Yu, N., et al., Flat optics with designer metasurfaces. Nature Materials, vol. 13, 139-150 (2014).

Li, Z., et al., Omnidirectional, broadband light absorption using large-area, ultrathin lossy metallic film coatings. Scientific Reports 5, 15137 (2015).

Letsou, T., et al., Heat-induced perfect light absorption in thin-film metasurfaces for structural coloring [Invited]. Optic Materials. Express vol. 9, 1386-1393 (2019).

Fan, S., Thermal Photonics and Energy Applications. Joule 1, 264-273 (2017).

Watts, C. M., et al., Metamaterial Electromagnetic Wave Absorbers. Advanced Optical Materials 24, OP98-OP120 (2012).

Aydin, K., et al., Broadband polarization-independent resonant light absorption using ultrathin plasmonic super absorbers. Nature Communications 2, 517 (2011).

Landy, N. I., et al., Perfect Metamaterial Absorber. Physical Review Letters 100, 207402 (2008).

Dotan, H., et al., Resonant light trapping in ultrathin films for water splitting. Nature materials, vol. 12, 158-164 (2013).

Elkabbash, M., et al. Hydrogen Sensing Using Thin-Film Perfect Light Absorber. ACS Photonics vol. 6, 1889-1894 (2019).

Sreekanth, K. V., et al. Generalized Brewster Angle Effect in Thin-Film Optical Absorbers and Its Application for Graphene Hydrogen Sensing. ACS Photonics, vol. 6, 1610-1617 (2019).

Joe, Y. S., et al., Classical analogy of Fano resonances. Physica Scripta 74, 259-266 (2006).

Ismail, N., et al., Fabry-Pérot resonator: spectral line shapes, generic and related Airy distributions, linewidths, finesses, and performance at low or frequency-dependent reflectivity. Optics Express, vol. 24, 16366-16389 (2016).

Fu, S., et al. Review of recent progress on single-frequency fiber lasers [Invited]. Journal of the Optical Society of America B, vol. 34, A49-A62 (2017).

Lee, K.-T., et al., Angular- and polarization-independent structural colors based on 1D photonic crystals. Laser & Photonics Reviews 9, 354-362 (2015).

Tsakmakidis, K. L., et al., Ultraslow waves on the nanoscale. Science 358, 319 (2017).

Yang, Z., et al. Reflective Color Filters and Monolithic Color Printing Based on Asymmetric Fabry- Perot Cavities Using Nickel as a Broadband Absorber. Advanced Optical Materials 4, 1196-1202 (2016).

(56) References Cited

OTHER PUBLICATIONS

Kumar, K., et al. Printing colour at the optical diffraction limit. Nature Nanotechnology, vol. 7, 557-561 (2012).
Tan, S. J., et al. Plasmonic Color Palettes for Photorealistic Printing with Aluminum Nanostructures. Nano Letters 14, 4023-4029 (2014).
Wang, H., et al. Full Color Generation Using Silver Tandem Nanodisks. ACS Nano 11, 4419-4427 (2017).
Cheng, F., et al. Aluminum plasmonic metamaterials for structural color printing. Optics Express, vol. 23, 14552-14560 (2015).
Song, M., et al. Achieving full-color generation with polarization-tunable perfect light absorption. Optical Materials Express, vol. 9, 779-787 (2019).
Cheng, F., et al., Structural color printing based on plasmonic metasurfaces of perfect light absorption. Scientific Reports 5, 11045 (2015).
Yang, B., et al. Ultrahighly Saturated Structural Colors Enhanced by Multipolar-Modulated Metasurfaces. Nano Letters 19, 4221-4228 (2019).
Guay, J.-M., et al. Laser-induced plasmonic colours on metals. Nature Communications 8, 16095 (2017).
Mojiri, A., et al., Spectral beam splitting for efficient conversion of solar energy—A review. Renewable and Sustainable Energy Reviews 28, 654-663 (2013).
Paul Denholm, et al., Overgeneration from Solar Energy in California: A Field Guide to the Duck Chart. National Renewable Energy Laboratory: Golden, CO, (2015).
Branz, H. M., et al., Hybrid solar converters for maximum exergy and inexpensive dispatchable electricity. Energy & Environmental Science 8, 3083-3091 (2015).
Vossier, A., et al. Performance bounds and perspective for hybrid solar photovoltaic/thermal electricity-generation strategies. Sustainable Energy & Fuels 2, 2060-2067 (2018).
Cao, F., et al. Toward a High-Efficient Utilization of Solar Radiation by Quad-Band Solar Spectral Splitting. Advanced Materials 28, 10659-10663 (2016).
Shockley, W. et al., Detailed Balance Limit of Efficiency of p-n Junction Solar Cells. Journal of Applied Physics 32, 510-519 (1961).
Zhu, L., et al., Radiative cooling of solar cells. Optica vol. 1, 32-38 (2014).
Sun, X., et al., Radiative Sky Cooling fundamental physics, materials, structures, and applications in Nanophotonics vol. 6 997-1015 (2017).
Teo, H. G., et al., An active cooling system for photovoltaic modules. Applied Energy 90, 309-315 (2012).
Mittelman, G., et al., Solar cooling with concentrating photovoltaic/thermal (CPVT) systems. Energy Conversion and Management 48, 2481-2490 (2007).
Riesen, Y., et al., Temperature dependence of hydrogenated amorphous silicon solar cell performances. Journal of Applied Physics 119, 044505-1-044505-10 (2016).
Saleem, M. R., et al., Thermal properties of TiO2 films fabricated by atomic layer deposition, IOP Conference Series: Materials Science and Engineering. 1-9 (IOP Publishing).
Zhan, Z., et al. Enhancing thermoelectric output power via radiative cooling with nanoporous alumina. Nano Energy 65, 104060 (2019).
Kraemer, D., et al. High-performance flat-panel solar thermoelectric generators with high thermal concentration. Nature Materials vol. 10, 532-538 (2011).
Weinstein, L. A., et al. A Hybrid Electric and Thermal Solar Receiver. Joule 2, 962-975 (2018).
Lee, Y. U., et al. Double Fano resonances in a composite metamaterial possessing tripod plasmonic resonances. Journal of Optics 17, 1-14 (2015).
Yang, Y., et al. Nonlinear Fano-Resonant Dielectric Metasurfaces. Nano Letters 15, 7388-7393 (2015).
Xu, Y., et al., Reconfigurable nonreciprocity with a nonlinear Fano diode. Physical Review B 89, 134306 (2014).
Chen, Z., et al. Graphene controlled Brewster angle device for ultra broadband terahertz modulation. Nature Communications 9, 4909 (2018).
Sreekanth, K. V., et al. Phase-Change-Material-Based Low-Loss Visible-Frequency Hyperbolic Metamaterials for Ultrasensitive Label-Free Biosensing. Advanced Optical Materials 7, 1900081 (2019).
Yu, J., et al., Optical pulse propagation in a Fabry-Perot etalon: analytical discussion. J. Opt. Soc. Am. A vol. 18, 2153-2160 (2001).
Bendickson, J. M., et al., Analytic expressions for the electromagnetic mode density in finite, one-dimensional, photonic band-gap structures. Physical Review E vol. 53, 4107-4121 (1996).
Chilwell, J. et al., Thin-films field-transfer matrix theory of planar multilayer waveguides and reflection from prism-loaded waveguides. J. Opt. Soc. Am. A vol. 1, 742-753 (1984).
Bermel, P., et al. Design and global optimization of high-efficiency thermophotovoltaic systems. Optics Express, vol. 18, A314-A334 (2010).
Xi, J. Q., et al. Optical thin-film materials with low refractive index for broadband elimination of Fresnel reflection. Nature Photonics vol. 1, 176-179 (2007).
Wang, Y., et al., Solar thermophotovoltaics: Progress, challenges, and opportunities. APL Materials vol. 7, 080906-1-080906-10 (2019).
Mitchell, B., et al. Four-junction spectral beam-splitting photovoltaic receiver with high optical efficiency. Progress in Photovoltaics: Research and Applications 19, 61-72 (2011).
Meade, R.D., et al., Electromagnetic Bloch waves at the surface of a photonic crystal. Physical Review vol. B44, 10961-10964 (1991).

* cited by examiner

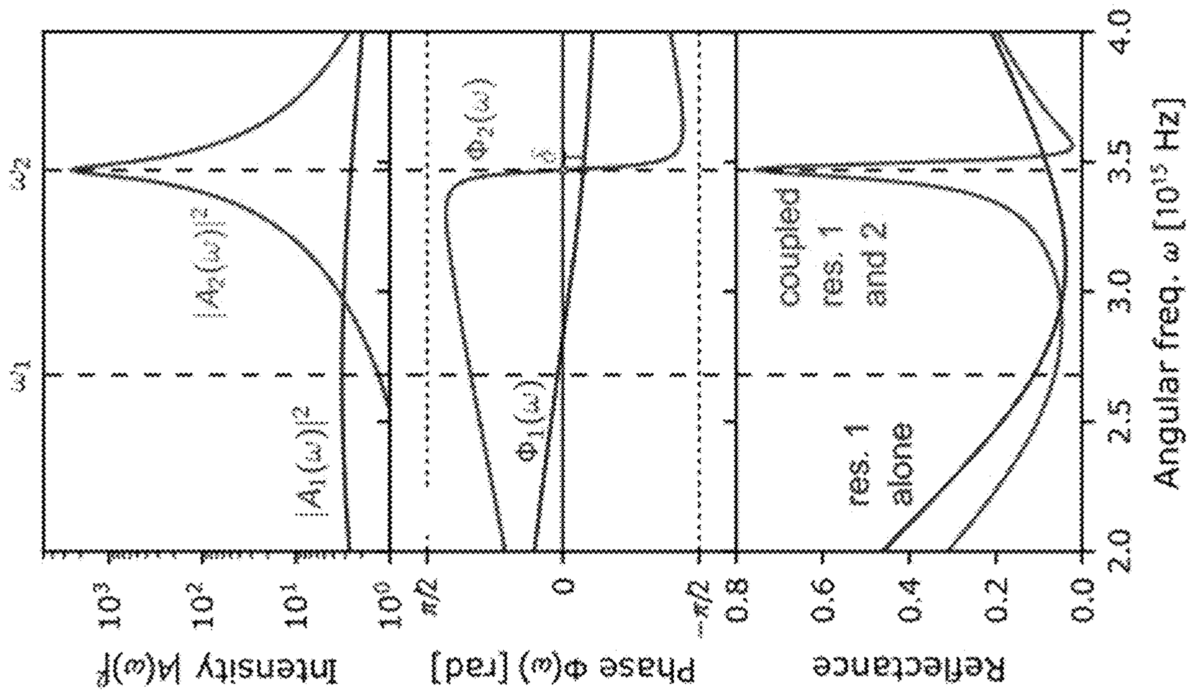
FIG. 1C
FIG. 1D
FIG. 1E
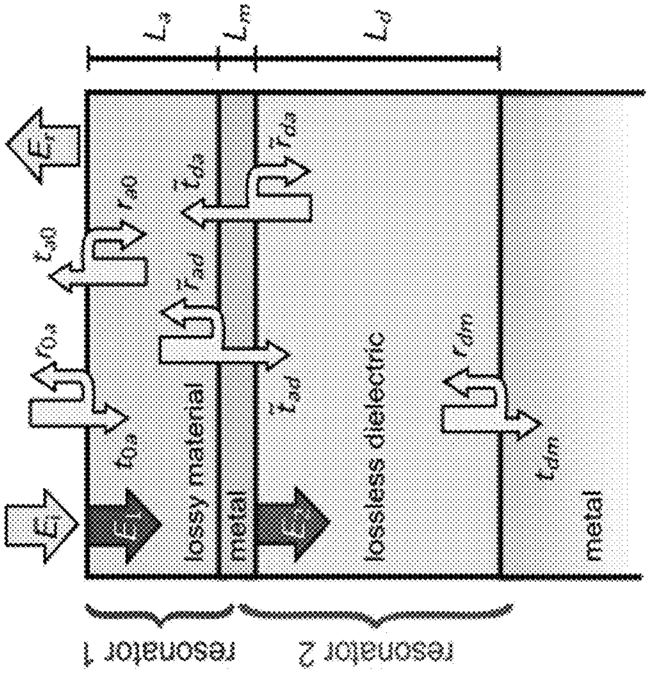
FIG. 1B

FANO RESONANT OPTICAL COATING

CROSS-REFERENCE TO RELATED APPLICATIONS

This application claims priority to and the benefit of U.S. provisional patent application Ser. No. 63/165,881, FANO RESONANT OPTICAL COATING, filed Mar. 25, 2021, which application is incorporated herein by reference in its entirety.

STATEMENT REGARDING FEDERALLY FUNDED RESEARCH OR DEVELOPMENT

This invention was made with government support under W911NF2010256 awarded by ARMY Research Office and IIP-1701163 and IIP-1722169 awarded by the National Science Foundation. The government has certain rights in the invention.

FIELD OF THE APPLICATION

The application relates to optical coatings, particularly to optical coatings for optical filters or mirrors.

BACKGROUND

Optical coatings are typically thin films of material deposited on an optical instrument or optical components, e.g., anti-reflective coatings, color filters, and dielectric mirrors.

SUMMARY

An optical coating includes a first resonator broadband light absorber. A second resonator includes a narrowband light absorber which is disposed adjacent to and optically coupled to the broadband light absorber. The first resonator exhibits a phase transition within a bandwidth of the broadband light absorber which is slower relative to a rapid phase change of the second resonator within the bandwidth of the broadband light absorber.

A resonant destructive interference between spectrally overlapping cavities of the first resonator and the second resonator yields an asymmetric Fano resonance absorption and reflection line. The broadband light absorber provides a continuum response. The narrowband light absorber provides a discrete state response. The optical coating is typically a thin film optical coating. A phase of light reflected from the first resonator varies slowly as a function of wavelength compared to a rapid phase change of the second resonator which exhibits a phase jump within a bandwidth of the broadband light absorber.

The first resonator can include a lossy material on a metal. The first resonator can include a lossless dielectric on a lossy metal. The first resonator can include a lossy dielectric on a lossy metal. The first resonator can include a dielectric on a lossy material on a metal. The first resonator can include a lossy material on a dielectric on a metal.

The second resonator can include a metal dielectric metal cavity. The second resonator can include a lossless dielectric on a low loss metal. The second resonator can include a dielectric mirror-dielectric-dielectric mirror cavity.

The optical coating can be configured as a beam splitter filter.

A thin film optical coating beam spitter filter includes a first resonator broadband light absorber. A second resonator is a narrowband light absorber disposed adjacent to and optically coupled to the broadband light absorber. The thin film optical beam spitter filter coating can be configured as a multi-band spectrum splitter and a thermal receiver.

The thin film optical beam spitter filter coating can be a Fano resonant optical coating (FROC) which behaves simultaneously as a multi-band spectrum splitter and a thermal receiver. The thin film optical beam spitter filter coating can be a component of a hybrid solar thermal-electric energy generation system.

The optical coating can include a first metal layer. A lossless dielectric layer can be disposed adjacent to and optically coupled to the first metal layer. A second metal layer can be disposed adjacent to and optically coupled to the lossless dielectric layer. A lossy material layer can be disposed adjacent to and optically coupled to the second metal layer.

A lossy material layer and the second metal layer can provide the first resonator including the broadband light absorber. The second metal layer, the lossless dielectric layer, and the first metal layer can provide the second resonator including the narrowband light absorber.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1B is a drawing showing an exemplary schematic of a FROC having two weakly coupled resonators where resonator 1 represent a broadband absorber and resonator 2 represents a narrowband absorber;

FIG. 1C is a graph showing calculated oscillator intensities for the structure of FIG. 1B;

FIG. 1D is a graph showing corresponding oscillator phases $\Phi_i(\omega)$ for the structure of FIG. 1B;

FIG. 1E is a graph showing the reflectance from the whole system of the two coupled resonators;

DETAILED DESCRIPTION

In the description, other than the bolded paragraph numbers, non-bolded square brackets ("[ ]") refer to the citations listed hereinbelow.

The Application is divided into 10 parts. Part 1 Introduction, Part 2 Coupled oscillator theory in thin-film optical coatings, Part 3 Demonstration and properties of FROCs, Part 4 Full and high purity structural coloring in FROCs, Part 5 FROCs as beam splitter filters, Part 6 Hybrid Solar thermal/electric energy generation using FROCs, Part 7 Other Applications, Part 8 Supplemental description, Part 9 FROC Generalized, and Part 10 Theory.

Definitions

Lossy Material—A material with strong optical losses within a given wavelength range such that a thick layer of the material is not transparent.

Lossless Dielectric—an optically transparent material with low optical losses. Lossy Metal—A metal that deviates significantly from the behavior of a perfect electric conductor (PEC). These metals have a high absorption coefficient. At optical wavelengths, examples of these metals are tungsten, Nickel and Chromium. Low loss metals at optical wavelengths are Silver, Gold, and Aluminum.

Part 1 Introduction:

In photonics, Fano resonance takes place when two oscillators with different damping rates are weakly coupled, i.e., by coupling resonators with narrow (weakly damped) and broad (strongly damping) spectral lines [1]. While individual Mie scatterers exhibit a subtle Fano resonance near their plasmonic or polaritonic resonance [1,2], a clear Fano resonance is observed in the extinction of coupled plasmonic nanostructures with multiple overlapping resonances with different damping rates. This is realized by coupling a radiatively broadened bright mode and a dark mode [3-8]. In metamaterials, Fano resonance was demonstrated in the reflection of asymmetric split-ring resonators which occurs due to the interference between narrowband magnetic dipole and broadband electric dipole modes [6-9]. High quality factor Fano resonance was demonstrated in all-dielectric metasurfaces [10]. The steep dispersion associated with Fano resonances and their relatively high quality-factor promise various applications in lasing, structural coloring [11], slow light devices [1,12] optical switching and bistability [13], biosensing [14], ultrasensitive spectroscopy [15], nonlinear optical isolators [16], and image processing [17]. In addition, Fano resonance morphs into electromagnetic induced transparency when the energy levels of both broad and narrow resonance coincide [1,18,19]. However, demonstrations of Fano resonance in nanophotonic devices typically require time consuming and costly nano-lithography fabrication techniques, e.g., electron-beam lithography or focused-ion beam milling [7] which limits their utility from a technological perspective.

Figure 1A:
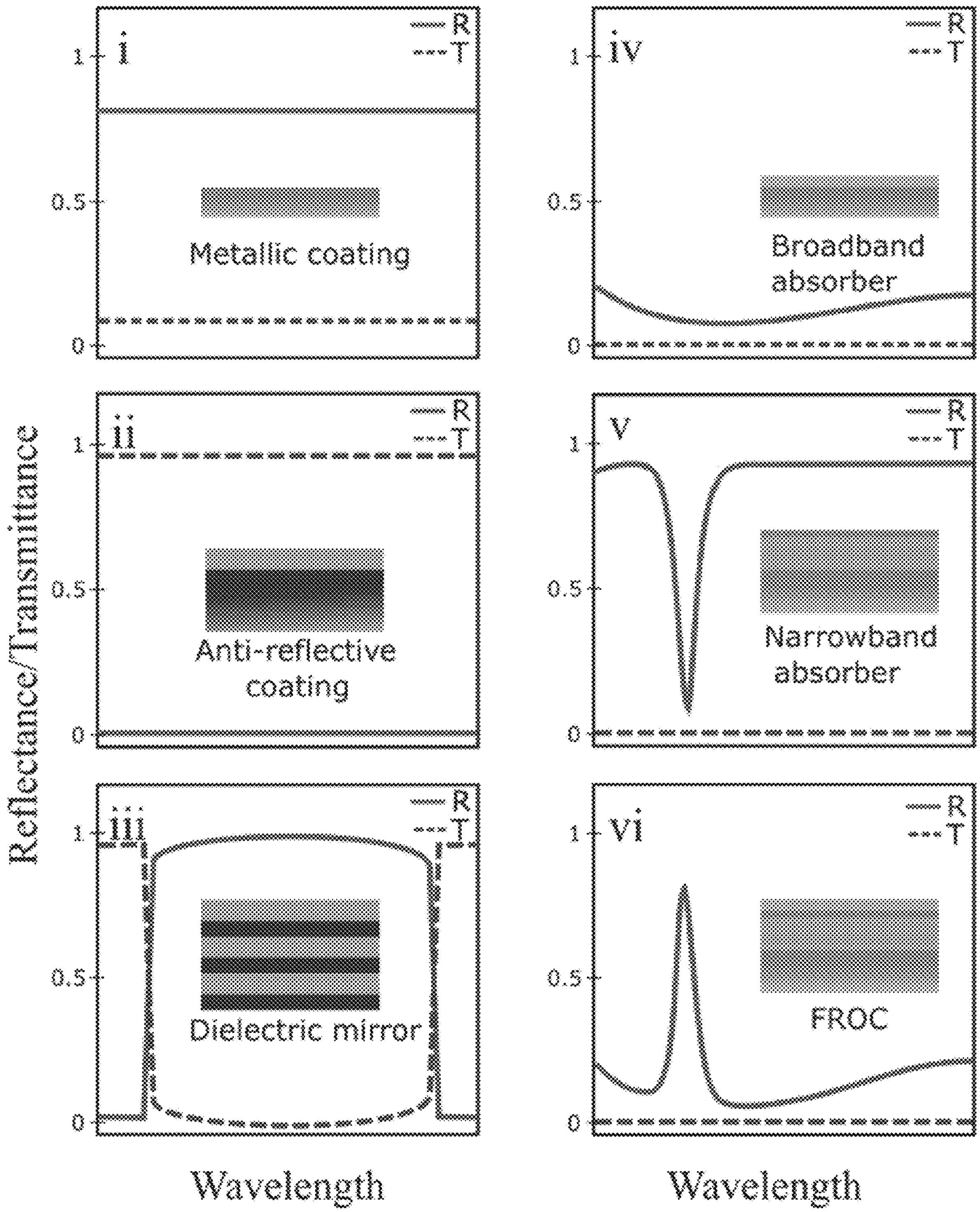
FIG. 1A includes graphs showing (i-v) Schematics of the structure and reflectance R and transmittance T of the main types of optical coatings including (i) metallic coatings used as mirrors and beam splitters, (ii) anti-reflective dielectric coatings, (iii) dielectric (Bragg) mirrors, (iv) broadband optical absorbers, and (v) narrowband absorbers, and (vi) schematically the new fano resonant optical coating (FROC) according to the Application.

Optical coatings represent a century old class of optical elements that are integral components in nearly every optical instrument with unlimited technological applications [20-36]. FIG. 1A schematically shows the main types of thin-film optical coatings. A metallic film deposited on a transparent substrate (FIG. 1A-*i*) forms the simplest optical coating that can serve as a mirror or as a beam splitter by controlling the film thickness. An anti-reflective coating (FIG. 1A-*ii*) suppresses reflection includes a dielectric film deposited on a higher index dielectric substrate in its simplest form. A dielectric (Bragg) mirror includes multiple dielectric thin films with different refractive indices (FIG. 1A-*iii*) and optical thickness ~$\lambda/4$ where $\lambda$ is the central wavelength reflected. More recently, significant attention was given to thin-film optical absorbers as they provide large-scale and inexpensive alternative to complex and lithographically intense nano-resonators, metamaterials, and metasurfaces for controlling light absorption and thermal emission beyond the intrinsic absorption/emission of materials [27, 28, 30-33, 37-43]. A broadband light absorber has an ultrathin dielectric film with strong optical losses deposited on a highly reflective metallic substrate [32] or a lossless dielectric on an absorptive substrate [31] with promising applications in solar energy conversion and solar-based water splitting [32, 44]. A narrowband light absorber has a metal-dielectric-metal (MDM) cavity which was shown as an absorption filter for structural coloring [30, 33] and gas sensing [45, 46]. Note that light absorbers are essentially absorptive anti-reflection coatings.

A new type of thin film optical coating that exhibits photonic Fano resonance is described in this Application. The optical coating has a broadband light absorber, representing the continuum, and a narrowband light absorber, representing the discrete state (FIG. 1A-*vi*) such that the resonant destructive interference between the spectrally overlapping cavities yields an asymmetric Fano resonance absorption and reflection line. We first describe an analytical model for Fano Resonant Optical Coatings (FROCs) based on the coupled oscillator theory. Then we describe FROCs' optical properties as compared to other commonly used optical coatings, e.g., thin-film light absorbers, dielectric mirrors, transmission filters, and beam splitters. Experimentally demonstrated structural color generation with FROCs which covers the full color gamut with high color purity and saturation is also described. A property of semi-transparent FROCs is also described, where the FROC behaves as a beam-splitting color filter. Finally, Efficient hybrid solar thermal/electric energy generation using FROCs is described.

FIG. 1A includes graphs showing (i-v) Schematics of the structure and reflectance R and transmittance T of the main types of optical coatings including (i) metallic coatings used as mirrors and beam splitters, (ii) anti-reflective dielectric coatings, (iii) dielectric (Bragg) mirrors, (iv) broadband optical absorbers, and (v) narrowband absorbers, and (vi)

schematically the new Fano resonant optical coating (FROC) according to the Application.

FIG. 1B is a drawing showing an exemplary schematic of a FROC having two weakly coupled resonators where resonator 1 represent a broadband absorber and resonator 2 represents a narrowband absorber. FIG. 1C is a graph showing calculated oscillator intensities for the structure of FIG. 1B. The calculated oscillator intensities $|A_i(\omega)|^2$, i=1, 2. The resonant frequencies $\omega_i$ are indicated as dashed lines. FIG. 1D is a graph showing corresponding oscillator phases $\Phi_i(\omega)$ for the structure of FIG. 1B. FIG. 1E is a graph showing the reflectance from the whole system of the two coupled resonators (labeled coupled re. 1 and 2). For contrast, the reflectance of just resonator 1 (lossy material on a metal substrate) (labeled res. 1 alone).

Part 2 Coupled Oscillator Theory in Thin-Film Optical Coatings:

The coupled mechanical oscillator model is used extensively to model Fano resonances [47]. We extend the coupled oscillator theory to thin film optical coatings [1, 48] (for detailed derivation See Theory). A schematic of a FROC is shown in FIG. 1B: Resonator 1 includes a lossy material of thickness $L_a$ and complex refractive index $$n_a = n_a^{Re} + in_a^{Im},$$

followed by a metal of thickness $L_m$ and complex refractive index $$n_m = n_m^{Re} + in_m^{Im}.$$

Resonator 2 is an MDM cavity [49] having a thin metallic film with thickness $L_m$, a lossless dielectric with thickness $L_d$ and refractive index $n_d$, and an optically opaque metallic substrate. The total electric field within the first and second resonators are $E_1$ and $E_2$, respectively. We define an intensity ratio $A_k$ as the ratio of the field inside the kth resonator ($E_k$) to the field injected into the kth resonator $$(E_k^i), \text{ i.e., } A_k = (E_k/E_k^i).$$

These ratios are given by:

$$A_1(\omega) \approx \frac{1}{1 - |r_{a0} r_{am}| e^{-2Im(\phi_a(\omega))} e^{i(2Re(\phi_a(\omega)+\phi_{a0}+\phi_{am}))}}, \text{ and} \tag{1}$$

$$A_2(\omega) \approx \frac{1}{1 - |r_{dm}|^2 e^{2i(\phi_d(\omega)+\phi_{dm})}}, \tag{2}$$

FIG. 1C shows the calculated oscillator intensities $|A_k(\omega)|^2$. The resonant frequencies $\omega_i$ are indicated by a dashed line. The oscillator phases $\Phi_i(\omega)$ defined through $A_i(\omega)=|A_i(\omega)|\exp(i\Phi_i(\omega))$, are shown in FIG. 1D. Note that the phase of the strongly damped oscillator (resonator 1) varies slowly, while the phase on the weakly damped oscillator (resonator 2) changes by ~π at resonance. When the two resonators are coupled and resonator 1 is driven by a field incident from the superstrate $E_i$, we can express the total field injected into resonator 1 as $E_{1i}=t_{0a}E_i+E_{2i}r_{dm}\tilde{t}_{da}r_{a0}e^{i(2\phi_d(\omega)+\phi_a(\omega))}$. In turn, the field in resonator 2 exists due to the field from resonator 1 propagating downward through the spacer and is given by, $E_{2i}=E_1\tilde{t}_{ad}e^{i\phi_a(\omega)}$. Here $\tilde{t}_{ad}$ and $\tilde{t}_{da}$ represent transmission coefficients across the metal spacer layer (See FIG. 1B and Theory). These relationships can be expressed in the following matrix equation for $E_1$ and $E_2$:

$$\begin{pmatrix} \frac{1}{A_1(\omega)} & -r_{dm}\tilde{t}_{da}r_{a0}e^{i(2\phi_d(\omega)+\phi_a(\omega))} \\ -\tilde{t}_{ad}e^{i\phi_a(\omega)} & \frac{1}{A_2(\omega)} \end{pmatrix} \begin{pmatrix} E_1 \\ E_2 \end{pmatrix} = \begin{pmatrix} t_{a0}E_i \\ 0 \end{pmatrix}. \tag{3}$$

The coupling between $E_1$ and $E_2$ occurs through the off-diagonal terms in the matrix. We now have all the necessary ingredients for Fano resonance: a strongly damped, driven oscillator (resonator 1), weakly coupled to a weakly damped oscillator (resonator 2). Equation 3 enables us to obtain the reflectance from the coupled oscillator as shown in FIG. 1E. The coupled oscillator reflectance shows a narrow reflection band that exhibits the asymmetric Fano line shape with a peak occurring at $\sim\omega_2$. Note that for $\tilde{t}_{ad}$ and $\tilde{t}_{da}\to 0$, i.e., for an optically opaque top metal film, i.e., when the cavities are decoupled, ($L_m\to\infty$), the off-diagonal terms vanish and the Fano resonance disappears.

Figures 2A, 2B, 2C:
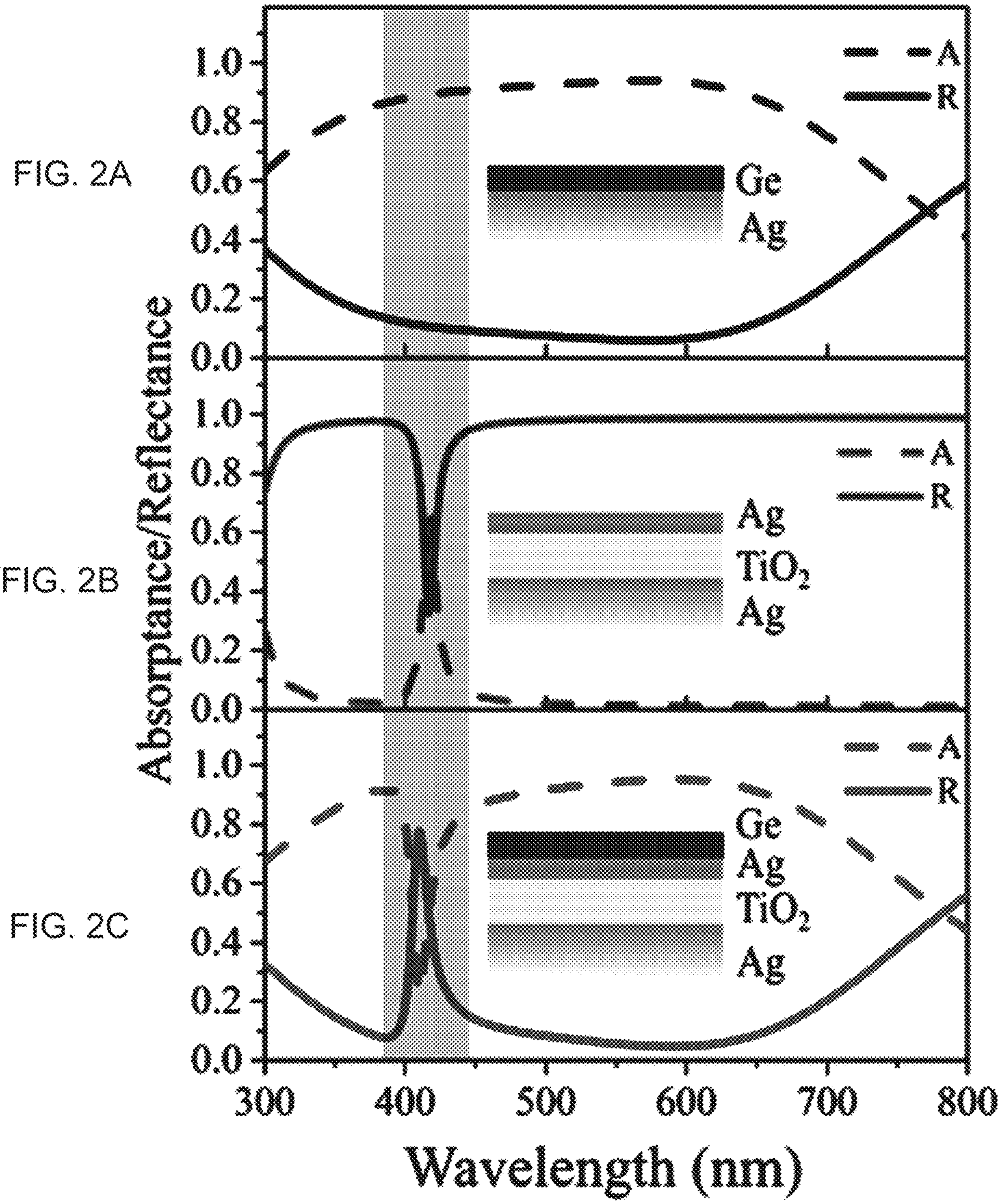
FIG. 2A is a graph showing a calculated reflection and absorption of an exemplary thin-film broadband light absorber.
FIG. 2B is a graph showing an exemplary narrowband light absorber.
FIG. 2C is a graph showing an exemplary a FROC using the structures of FIG. 2A and FIG. 2B.

Part 3 Demonstration and Properties of FROCs:

FIG. 2A is a graph showing a calculated reflection and absorption of an exemplary thin-film broadband light absorber. FIG. 2B is a graph showing an exemplary narrowband light absorber. FIG. 2C is a graph showing an exemplary a FROC using the structures of FIG. 2A and FIG. 2B.

Figures 2D, 2E, 2F:
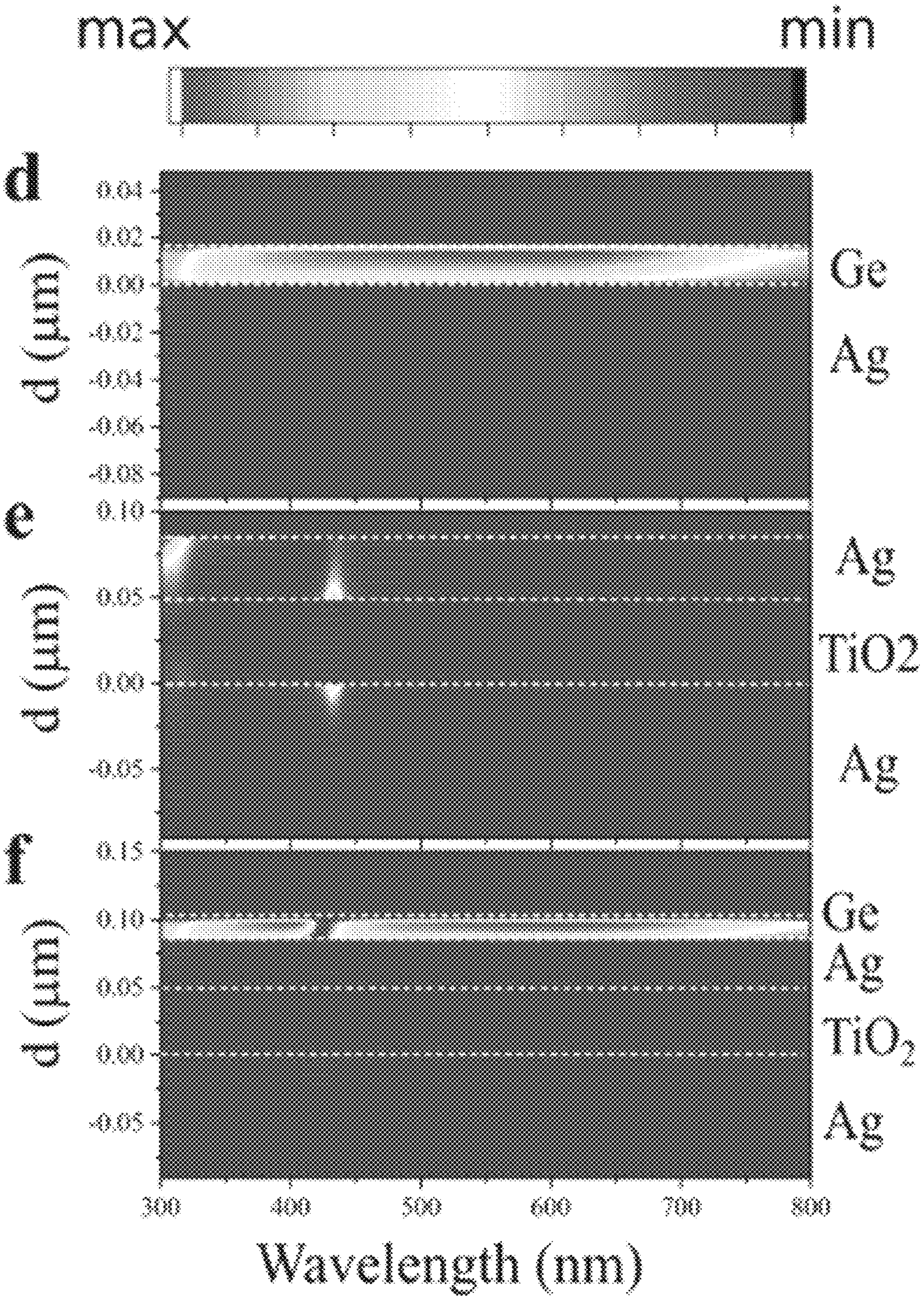
FIG. 2D is a graph showing a calculated power dissipation density in a Ge—Ag structure highlighting the resonant destructive interference between the broadband and narrowband nanocavities.
FIG. 2E is a graph showing a calculated power dissipation density in a Ag—$TiO_2$—Ag structure highlighting the resonant destructive interference between the broadband and narrowband nanocavities.
FIG. 2F is a graph showing a calculated power dissipation density in a Ge—Ag—$TiO_2$—Ag structure highlighting the resonant destructive interference between the broadband and narrowband nanocavities.

FIG. 2D is a graph showing a calculated power dissipation density in a Ge—Ag structure highlighting the resonant destructive interference between the broadband and narrowband nanocavities. FIG. 2E is a graph showing a calculated power dissipation density in a Ag—$TiO_2$—Ag structure highlighting the resonant destructive interference between the broadband and narrowband nanocavities. FIG. 2F is a graph showing a calculated power dissipation density in a Ge—Ag—$TiO_2$—Ag structure highlighting the resonant destructive interference between the broadband and narrowband nanocavities.

Figure 2G:
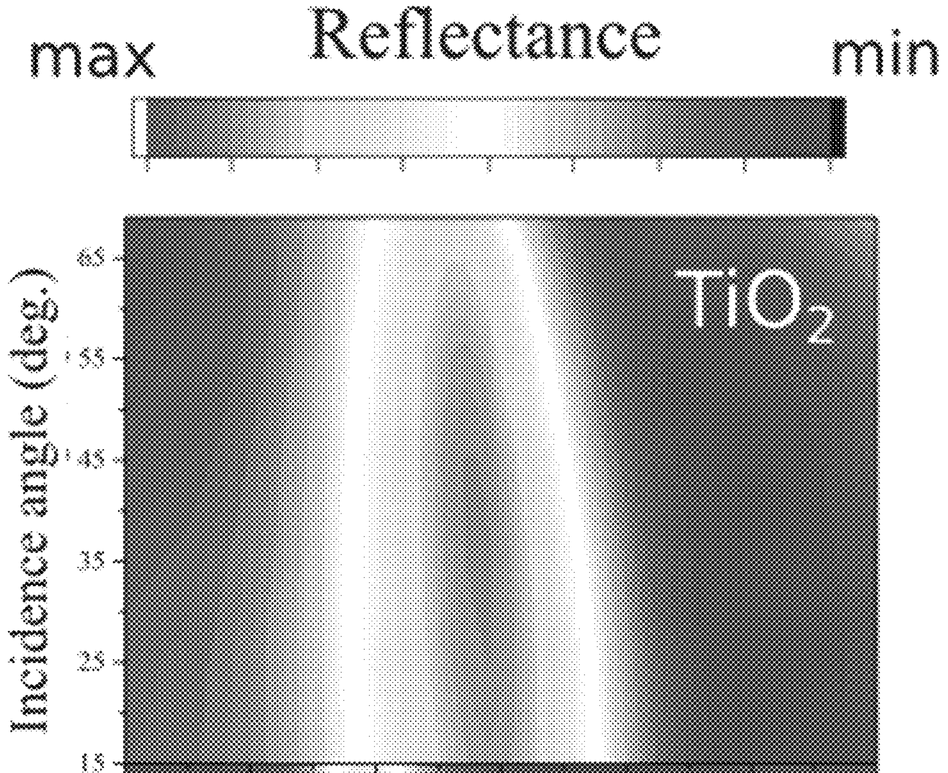
FIG. 2G is a graph showing a measured angular reflection of a FROC with a high index dielectric ($TiO_2$)
Figure 2H:
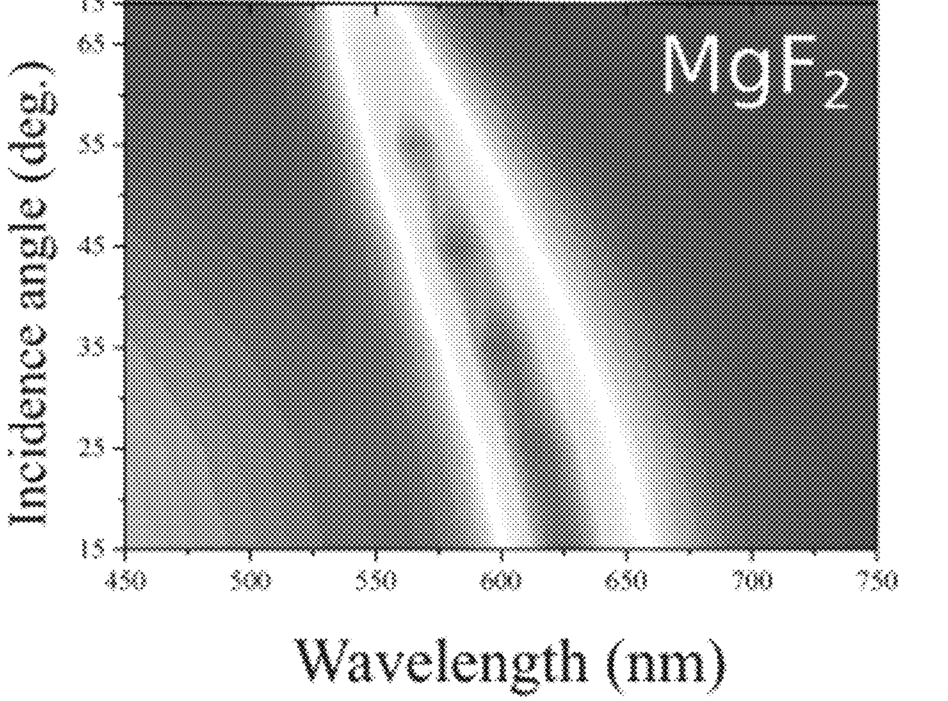
FIG. 2H is a graph showing a measured angular reflection of a FROC with a low-index dielectric ($MgF_2$)

FIG. 2G is a graph showing a measured angular reflection of a FROC with a high index dielectric ($TiO_2$), and FIG. 2H is a graph showing a measured angular reflection of a FROC with a low-index dielectric ($MgF_2$).

Figure 2I:
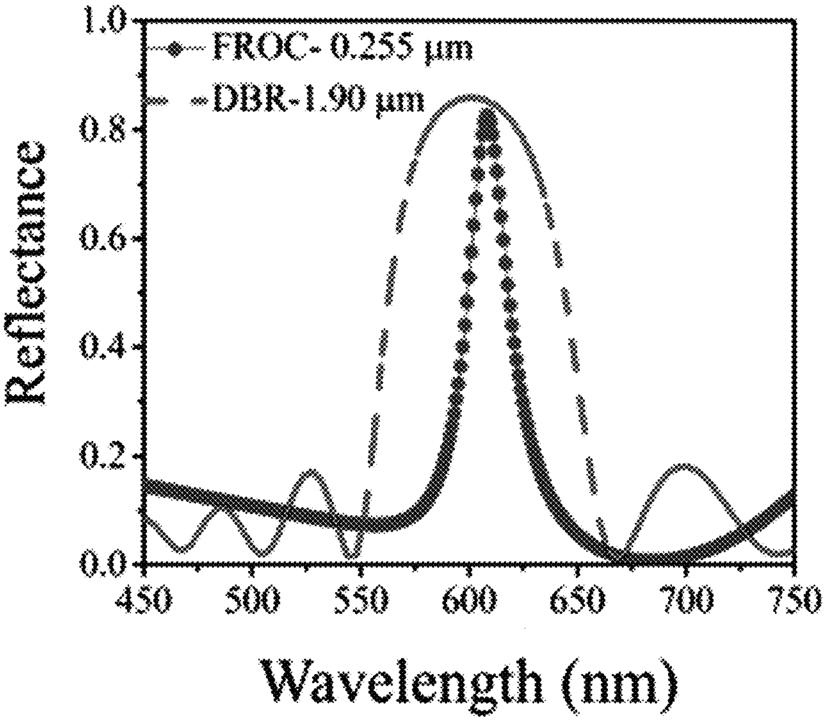
FIG. 2I is a graph showing a low index-contrast dielectric Bragg reflector vs. the selective reflection of a FROC with an order of magnitude less thickness.
Figure 2J:
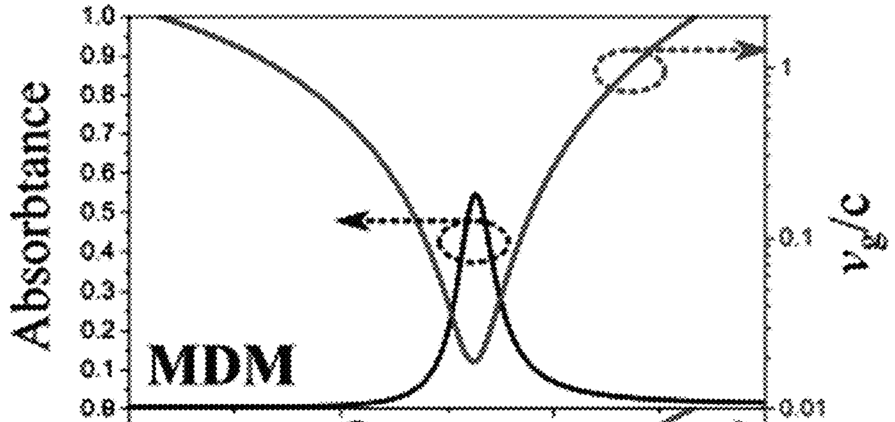
FIG. 2J is a graph showing absorbance for an MDM cavity of the structure of FIG. 2I.
Figure 2K:
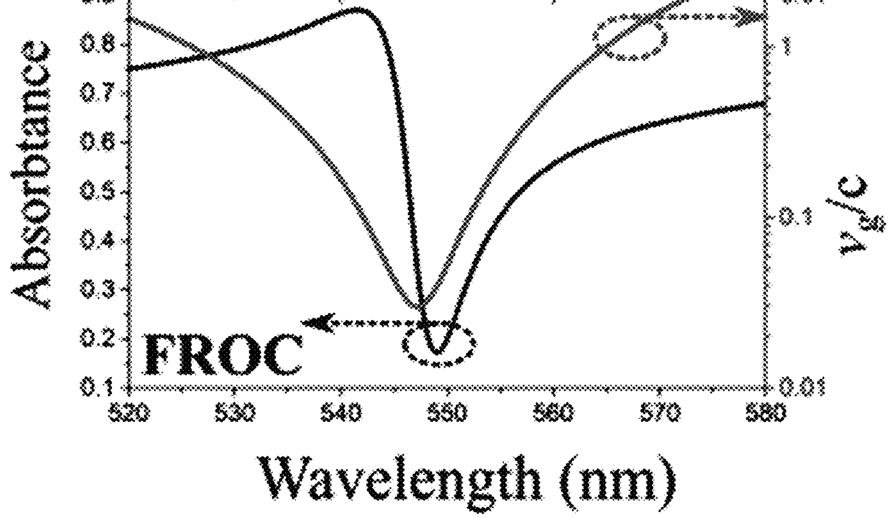
FIG. 2K is a graph showing absorbance for a FROC of the structure of FIG. 2I.

FIG. 2I is a graph showing a low index-contrast dielectric Bragg reflector vs. the selective reflection of a FROC with an order of magnitude less thickness. The calculated group velocity normalized with the speed of light in vacuum ($v_g/c$) and absorption. FIG. 2J is a graph showing absorbance for an MDM cavity of the structure of FIG. 2I. FIG. 2K is a graph showing absorbance for a FROC of the structure of FIG. 2I.

FIG. 2A, FIG. 2B, and FIG. 2C show the calculated reflectance and absorptance of a broadband absorber, narrowband absorber, and a FROC using the transfer matrix method, respectively. The exemplary broadband absorber (FIG. 2A) includes a 15 nm Germanium film on 100 nm silver film Ag [Ge (15 nm)-Ag (100 nm)] with an absorption band full-width half maximum (FWHM) of ~600 THz. The exemplary narrowband absorber (FIG. 2B) includes an MDM cavity Ag (30 nm)-$TiO_2$ (50 nm)-Ag (100 nm) producing an absorption line with a FWHM 15 THz. FIG. 2C shows the calculated reflection and absorption of a FROC [Ge (15 nm)-Ag (30 nm)-$TiO_2$ (50 nm)-Ag (100 nm)]. The FROC in FIG. 2C is realized by overlapping the broadband absorber, which represents a continuum with a nearly constant phase, and a narrowband absorber with a rapid phase shift near resonance (See FIG. 6). The FROC produces broadband absorption except at wavelengths corresponding to the MDM cavity resonance where it shows an asymmetric (Fano) reflection and absorption lines (See also FIG. 7). FIG. 2E, FIG. 2E, and FIG. 2F, show the calculated power dissipation density corresponding to the optical coatings presented in FIG. 2A, FIG. 2B, and FIG. 2C, respectively (See Theory). For the broadband absorber (FIG. 2*d*), the incident light is trapped inside the absorbing Ge film [46]. Similarly, when the MDM cavity is at resonance, light is trapped inside the cavity and dissipated in the metallic mirrors (FIG. 2E). By overlapping the two optical coatings, resonant destructive interference between the two resonators takes place and light escapes both resonators (FIG. 2F).

Note that FROC's reflection-line closely mirrors the MDM cavity's absorption-line in terms of resonant wavelength and bandwidth. Consequently, the selective reflection's wavelength, bandwidth, and iridescence, are determined by the MDM cavity [33] (See Theory). FIG. 2G and FIG. 2H show the measured angular reflection spectrum of p-polarized light from a high-index dielectric FROC [Ge (15 nm)-Ag (20 nm)-$TiO_2$ (100 nm)-Ag (100 nm)], and a low-index dielectric FROC [Ge (15 nm)-Ag (20 nm)-$MgF_2$ (180 nm)-Ag (100 nm)], respectively (See also FIG. 8 for s-polarized angular reflection). Note that the refractive indices of $TiO_2$ and $MgF_2$ are ~2.2 and 1.35, respectively. The reflectance of the high-index FROC is angle independent over a wide angular range (±70°), while low-index FROC is highly iridescent. Iridescent structural colors are important for anti-counterfeiting measures used in many currencies and spectral splitting of the solar spectrum (See also FIG. 9 [25]. For most structural coloring applications, however, iridescence is problematic and using a high-index FROC is more suitable.

The observed selective reflection is reminiscent of dielectric mirrors, e.g., distributed Bragg reflectors (DBR). While dielectric mirrors are used as high-reflection coatings, their selective reflection properties make them attractive for structural coloring and single frequency lasers [50,51]. The bandwidth of a DBR mirror is inversely proportional to the refractive index difference between its two constituting dielectrics. Similarly, the number of periods to achieve high reflection is inversely proportional to the index difference. FIG. 2I compares the calculated reflectance of a DBR mirror and a FROC. The exemplary DBR includes $Al_2O_3$–$SiO_2$ 10 bilayers with overall thickness of 1.9 μm and FWHM ~100 nm. The exemplary FROC includes Ge (15 nm)-Ag (35 nm)-$TiO_2$ (105 nm)-Ag (100 nm), with an overall thickness of 0.255 μm and FWHM of ~30 nm. Accordingly, FROCs can provide narrowband selective reflectance with an order of magnitude less thickness compared to DBR mirrors. FROCs act as an ultrathin absorptive notch filter, i.e., it absorbs the remainder of the operating wavelength range instead of transmitting it as in traditional notch filters (shown in FIG. 4B). Accordingly, FROCs are a viable alternative to notch filters where noise from unwanted transmitted light is problematic.

The high dispersion associated with Fano resonance leads to a high effective group index and slow light [12]. Although an MDM cavity exhibits low group velocity $v_g$, the lowest $v_g$ corresponds to maximum optical losses (~0.55) inside the cavity (FIG. 2J). In FROCs, however, the lowest $v_g$ (here ~0.017 c) corresponds to minimum optical losses (~0.15) (FIG. 2K) which makes FROC a promising candidate for nanoscale slow light devices [52] (the group velocity calculations are presented in Theory).

Figure 3B:
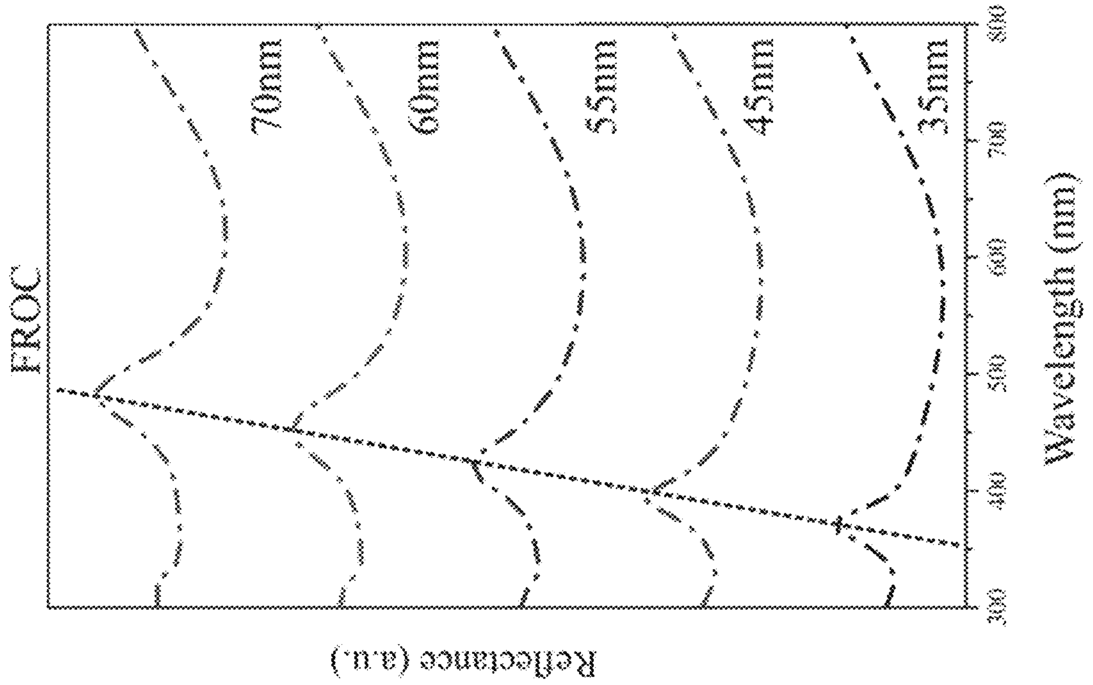
FIG. 3B is a graph showing reflectance of exemplary FROCs by increasing a $TiO_2$ thickness.
Figure 3A:
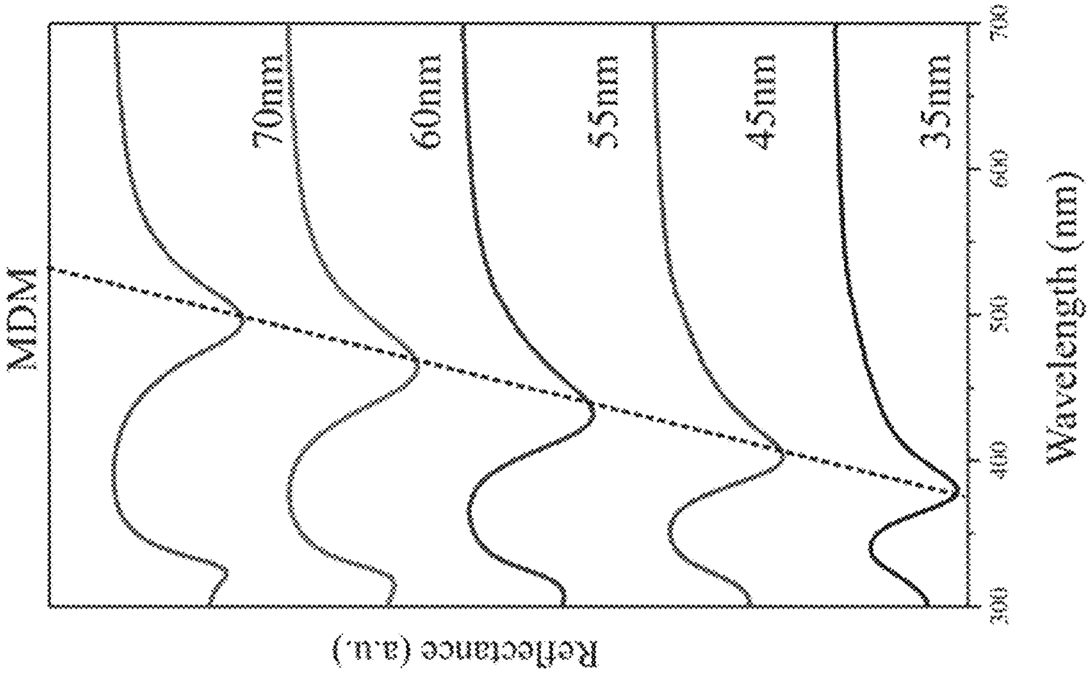
FIG. 3A is a graph showing reflectance of exemplary MDM cavities.
Figure 3C:
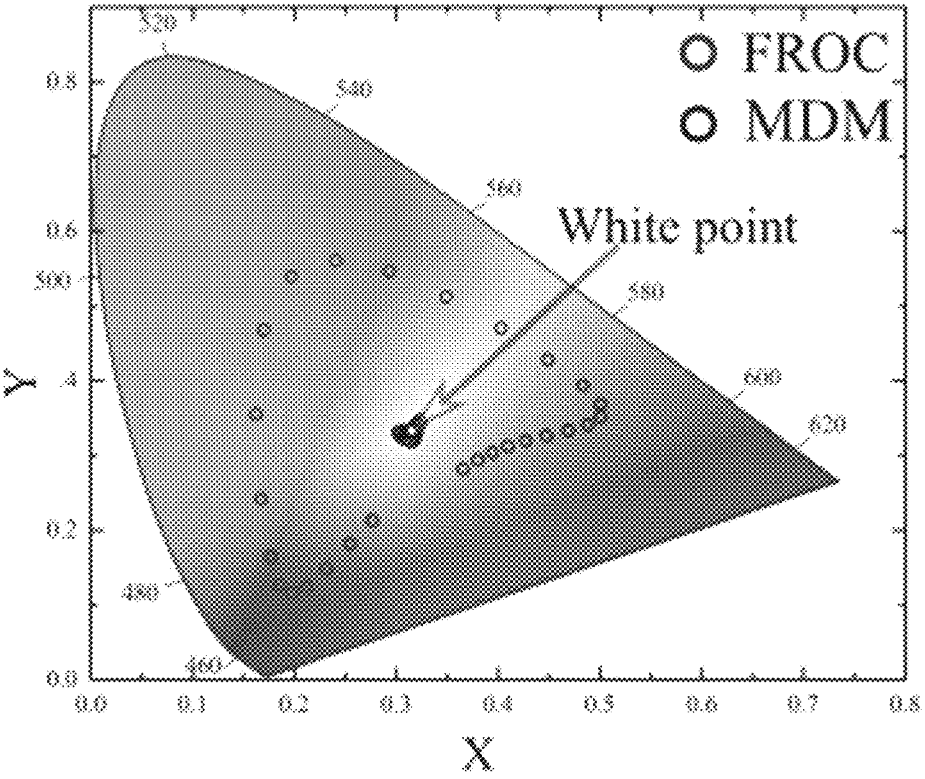
FIG. 3C is a drawing showing a CIE 1931 color space showing the colors corresponding to calculated reflection spectrum of MDM cavities (black dots) and FROC (circles) with varying cavity thicknesses.
Figure 3D:
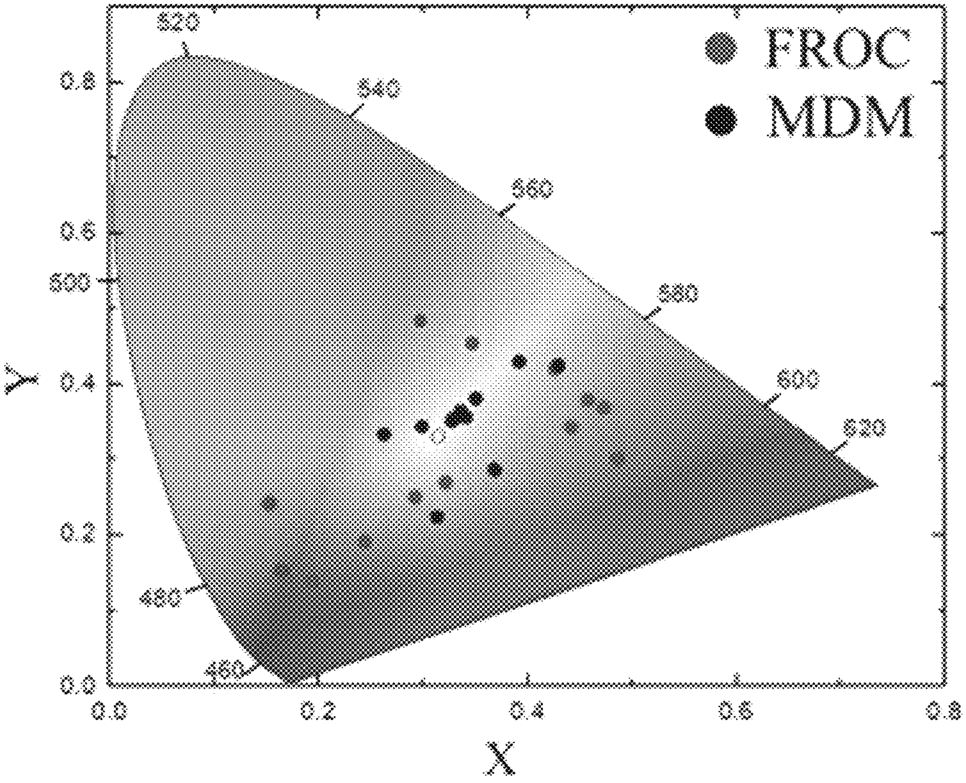
FIG. 3D is a drawing showing a CIE 1931 color space showing the colors corresponding to the FIG. 3C measured reflection spectrum of MDM cavities (black dots) and FROCs (lighter dots)
Figure 3E:
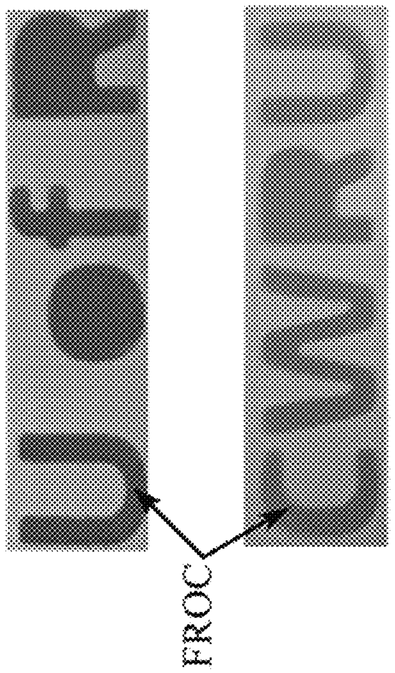
FIG. 3E is a photograph showing a color saturation of FROCs where the letters "U of R" and "CWRU" are printed on an MDM cavity by depositing 15 nm Ge layer.
Figure 3F:
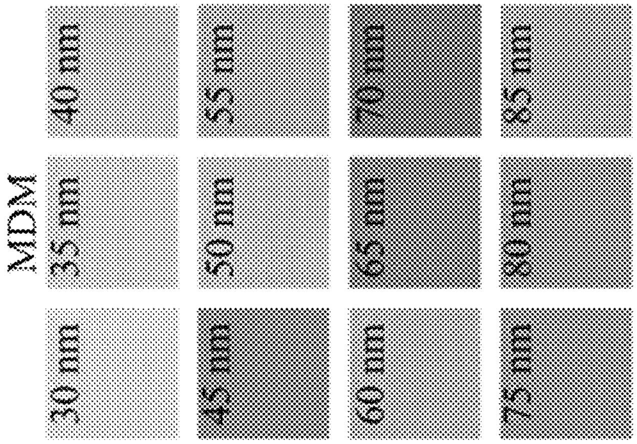
FIG. 3F shows a photograph of fabricated MDM cavities and their corresponding FROCs with $TiO_2$ thickness varying from 30 nm to 85 nm.
Figure 3G:
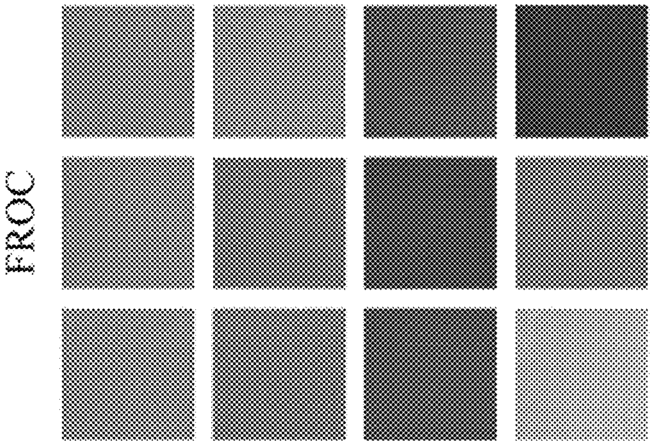
FIG. 3G shows a photograph of FROCs corresponding to the fabricated MDM cavities of FIG. 3F with $TiO_2$ thickness varying from 30 nm to 85 nm.

Part 4 Full and High Purity Structural Coloring in FROCs:

FIG. 3A is a graph showing reflectance of exemplary MDM cavities. FIG. 3B is a graph showing reflectance of exemplary FROCs by increasing a $TiO_2$ thickness. FIG. 3C is a drawing showing a CIE 1931 color space showing the colors corresponding to calculated reflection spectrum of MDM cavities (black dots) and FROC (circles) with varying cavity thicknesses. FIG. 3D is a drawing showing a CIE 1931 color space showing the colors corresponding to the FIG. 3C measured reflection spectrum of MDM cavities (black dots) and FROCs (lighter dots). The overall color purity of FROCs is significantly higher than MDM cavities. FIG. 3E is a photograph showing a color saturation of FROCs where the letters "U of R" and "CWRU" are printed on an MDM cavity by depositing 15 nm Ge layer. FIG. 3F shows a photograph of fabricated MDM cavities and their corresponding FROCs with $TiO_2$ thickness varying from 30 nm to 85 nm. FIG. 3G shows a photograph of FROCs corresponding to the fabricated MDM cavities of FIG. 3F with $TiO_2$ thickness varying from 30 nm to 85 nm.

The narrowband selective reflection of FROCs' and the ability to control the angular and spectral properties of the reflection spectrum make them an excellent platform for structural coloring. Nanophotonic structural coloring technologies have promising applications including high-density coloration [53, 54], anti-counterfeiting and data storage. Plasmonic [54-56], thin-film [30, 31, 33, 39], and metamaterial and metasurface-based [57, 58] structural coloring were demonstrated. An ideal platform for structural coloring should have scalable and inexpensive production, access the entire color gamut, provide colors with high purity and for most applications, should be angle independent. The colors formed using MDM cavities and other light absorption Theory generate subtractive colors, i.e., mainly provide Cyan-Magenta-Yellow (CMY) colors [58, 59]. FIG. 3A shows the measured p-polarized reflection spectrum of exemplary MDM cavities including Ag (20 nm)-$TiO_2$ (35 nm-70 nm)-Ag (100 nm). FIG. 3B shows the reflection spectrum of the same MDM cavities after adding a 15 nm Ge layer to convert them into FROCs. The reflection lines produced by the FROCs can span the visible spectrum and target a relatively narrow range of colors, i.e., the produced colors are not subtractive. FIG. 3C shows the calculated colors produced by FROCs (blue circles) vs. MDM cavities (black dots) represented in CIE 1931 color space (See also FIG. 11 and FIG. 12). The white point corresponds to the spectrum of the illuminant, i.e., white light. FROCs access the entire color gamut since they provide selective reflection at different wavelengths. The experimental results for MDM and FROC structures for $TiO_2$ thickness ranging from 35 nm to 150 nm are shown in FIG. 3D. Access to the entire color gamut with a similar reflection profile has been realized recently with multipolar metasurfaces, which—in contrast with FROC—require intense nanolithography [60].

The color purity of a given structure is determined by considering the relative distance between the structure's coordinate in the CIE color space and the white point. FROCs have significantly high color purity and saturation compared to MDM structures (See also FIG. 13A) [61]. FIG. 3E shows a photograph of two MDM cavities with CWRU and U of R letters "printed" on them by depositing a Ge layer and converting these regions to a FROC. The color saturation is visibly clear for the colors produced using FROCs. This printing method can be used for optical archival data storage. FIG. 3F and FIG. 3G show photos of MDM cavities and the corresponding FROCs, respectively. FROCs are capable of reflecting blue, green, and red colors by simply increasing the dielectric thickness.

With continued reference to FIG. 3A to FIG. 3G, the relatively high-quality factor of FROCs' selective reflection and the ability to control the angular and spectral properties of the reflection spectrum make them an excellent platform for structural coloring. As opposed to pigments, structural colors are produced due to the material's structure not its chemical composition, hence, they can be immune to chemical degradation and enjoy mechanical stability and robustness with great promise to high-density coloration [53, 54], anti-counterfeiting and data storage. Plasmonic [31, 55, 56], thin-film [30, 31, 33, 39], and metamaterial and metasurface-based [58, 57] structural coloration were demonstrated. However, an ideal platform for structural coloring should have scalable and inexpensive production, should access the entire color gamut, and for most applications should be angle independent and provide colors with high purity and saturation. The colors formed using MDM cavities and other light absorption methods generate subtractive colors, i.e., mainly provide Cyan-Magenta-Yellow (CMY) colors [58, 59]. FIG. 3A shows the measured p-polarized reflection spectrum of exemplary MDM cavities including Ag (20 nm)-$TiO_2$-Ag (100 nm) by varying the thickness of the $TiO_2$ film from 35 nm-70 nm. FIG. 3B shows the reflection spectrum of the same MDM cavities after adding a 15 nm Ge layer to convert them to FROCs. The reflection lines produced by the FROCs span the visible spectrum and target a relatively narrow range of color, i.e., the produced colors are not subtractive and are quasi-monochromatic. FIG. 3C shows the calculated colors produced by FROCs (blue circles) vs. MDM cavities (black dots) represented in CIE 1931 color space (see Methods) that links distributions of electromagnetic wavelengths to visually perceived colors. FROCs are thus capable of accessing the entire color gamut since they provide selective reflection at different wavelengths by simply changing the dielectric thickness. The experimental results for MDM and FROC structures for $TiO_2$ thickness ranging from 35 nm to 150 nm are shown in FIG. 3D. The white point corresponds to the spectrum of the illuminant, i.e., white light. The color purity of a given structure is determined by considering the relative distance between the structure's coordinate in the CIE color space and the white point. Overall, FROCs have significantly high color purity compared to MDM structures as well as other experimentally reported structural coloring space [61]. We note that access to the entire color gamut with a similar reflection profile has been realized recently with multipolar metasurfaces, however, by using intense nanolithography [60].

FIG. 3E shows a photograph of two MDM cavities with CWRU and U of R letters "printed" on them by depositing a Ge layer and converting these regions to a FROC. The color saturation is visibly clear for the colors produced using FROCs. This printing method can be used for optical archival data storage. FIG. 3F and FIG. 3G show the produced colors from MDM cavities and the corresponding FROCs, respectively. FROCs are capable of reflecting blue, green, and red colors by simply increasing the dielectric thickness.

Part 5 FROCs as Beam Splitter Filters:

The optical coating can be configured as a beam splitter filter. A thin film optical coating beam spitter filter includes a first resonator broadband light absorber. A second resonator is a narrowband light absorber disposed adjacent to and optically coupled to the broadband light absorber. The thin film optical beam spitter filter coating can be configured as a multi-band spectrum splitter and a thermal receiver.

Figure 4A:
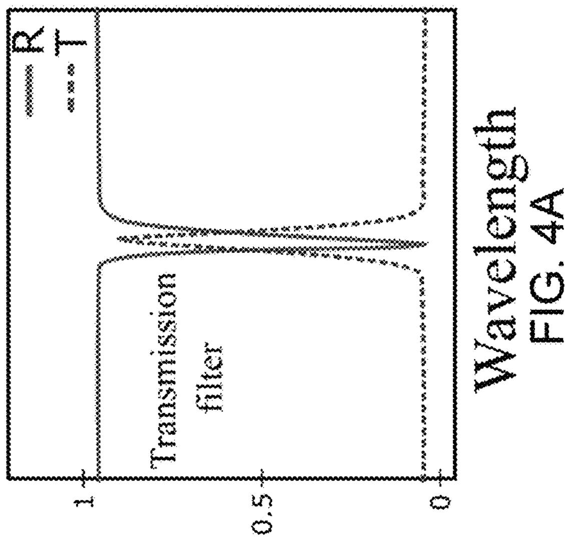
FIG. 4A is a graph showing the spectral response of a transmission filter.
Figure 4B:
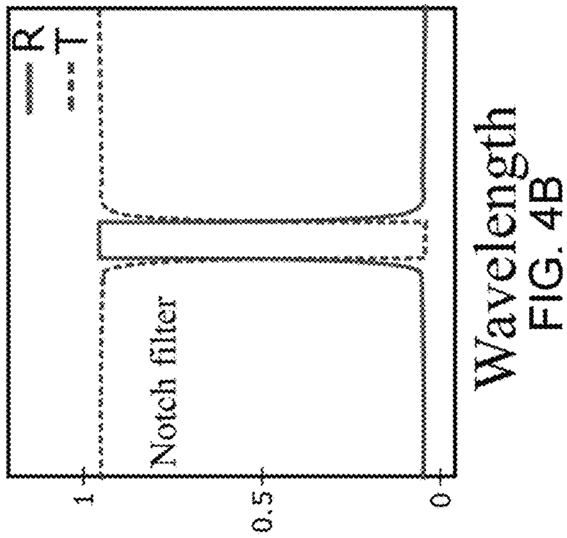
FIG. 4B is a graph showing the spectral response of a notch filter.
Figure 4C:
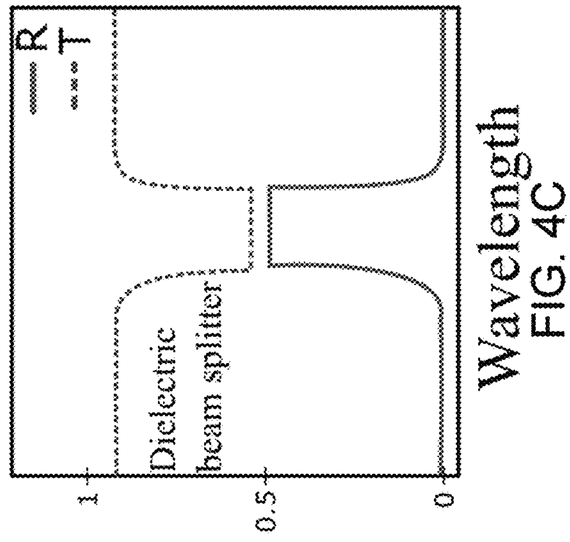
FIG. 4C is a graph showing the spectral response of a dielectric coating commonly used as a beam splitter for pulsed lasers.
Figure 4D:
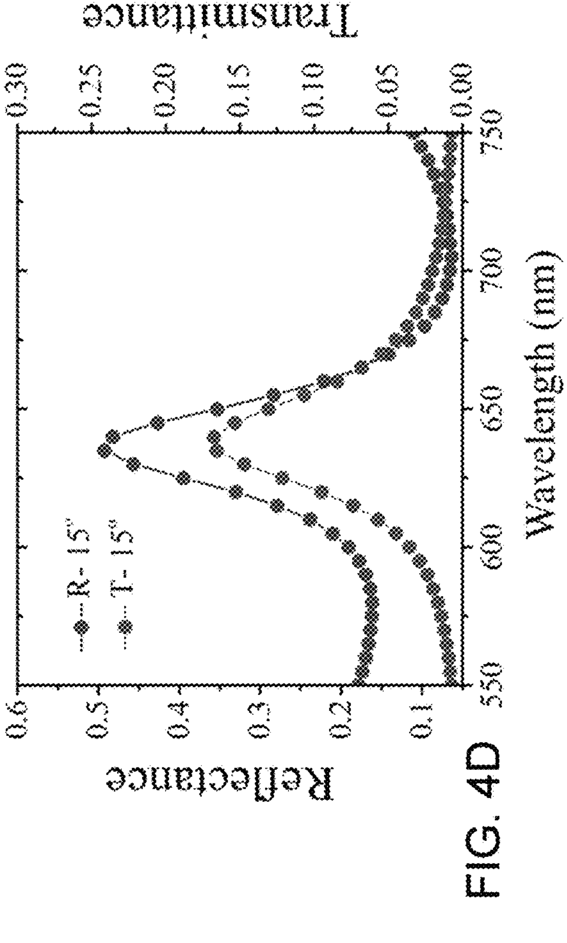
FIG. 4D is a graph showing the measured reflectance and transmittance of a FROC-BSF.
Figure 4E:
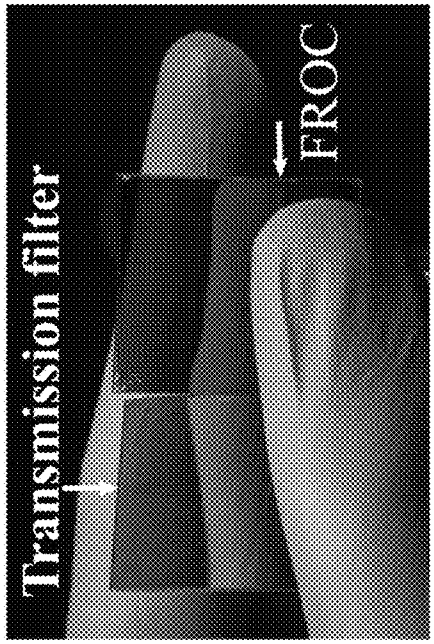
FIG. 4E is a photograph of a conventional transmission filter and a FROC.

FIG. 4A is a graph showing the spectral response of a transmission filter. FIG. 4B is a graph showing the spectral response of a notch filter. FIG. 4C is a graph showing the spectral response of a dielectric coating commonly used as a beam splitter for pulsed lasers. FIG. 4D is a graph showing the measured reflectance and transmittance of a FROC-BSF. The reflection and transmission peaks mostly overlap. FIG. 4E is a photograph of a conventional transmission filter and a FROC. The former reflects red while transmits green. FROC however reflects and transmits the same blue color.

FROCs enjoy a unique property unattainable by existing thin-film optical coatings; acting as a beam splitter filter (BSF). An optical filter is an optical element that selectively transmits, reflects, or absorbs a portion of the optical spectrum. FIG. 4A schematically shows the spectral response of a transmission filter that reflects a broad spectral range while transmits a narrow spectral range. On the other hand, a notch filter (FIG. 4B) reflects a narrow wavelength range and transmits the remainder. If the incident light is broadband all the filters introduced in FIG. 4A, FIG. B, FIG. C will reflect and transmit different colors, the reflected and transmitted colors are different. Consequently, conventional coatings cannot act as a BSF, i.e., it transmits and reflects same color under broadband illumination. Even a dielectric beam splitter, commonly used to split ultrafast pulsed lasers, does not behave as a BSF as shown in FIG. 4C, i.e., for an incident broadband light, the color reflected and transmitted are not the same. Note also that intensity filters, e.g., reflection filter using silvered substrates, are not spectral filters, i.e., they attenuate the transmission at (almost) all wavelengths.

Conversely, FROCs with semi-transparent metallic films do act as BSFs. FIG. 4D shows the measured reflectance and transmittance (incidence angle is 15°) from a BSF-FROC [Ge (15 nm)-Ag (20 nm)-$TiO_2$ (85 nm)-Ag (20 nm)]. Clearly the reflection and transmission peaks overlap at ~645 nm. FIG. 4F shows a photo of a transmission filter and a BSF-FROC. The transmission filter reflects and transmit different colors (red and green, respectively), while the BSF-FROC reflects and transmits the same blue color (See also, FIG. 10A-FIG. 10C). This property is particularly interesting for structural coloring of transparent objects.

Figure 5A:
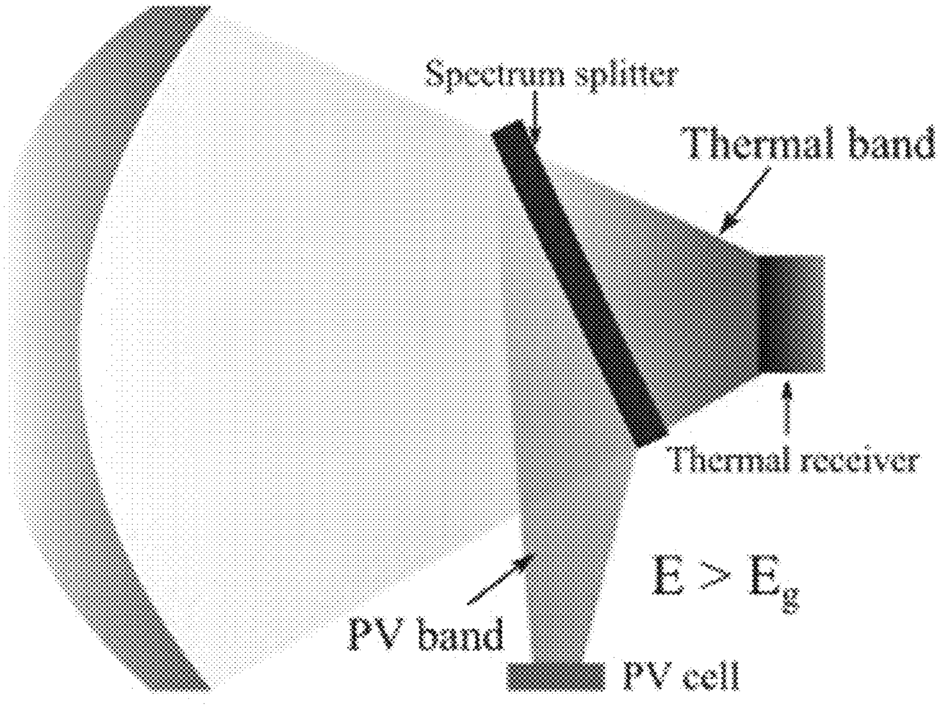
FIG. 5A is a drawing showing a schematic diagram of a conventional PV/solar-thermal energy conversion setup.
Figure 5B:
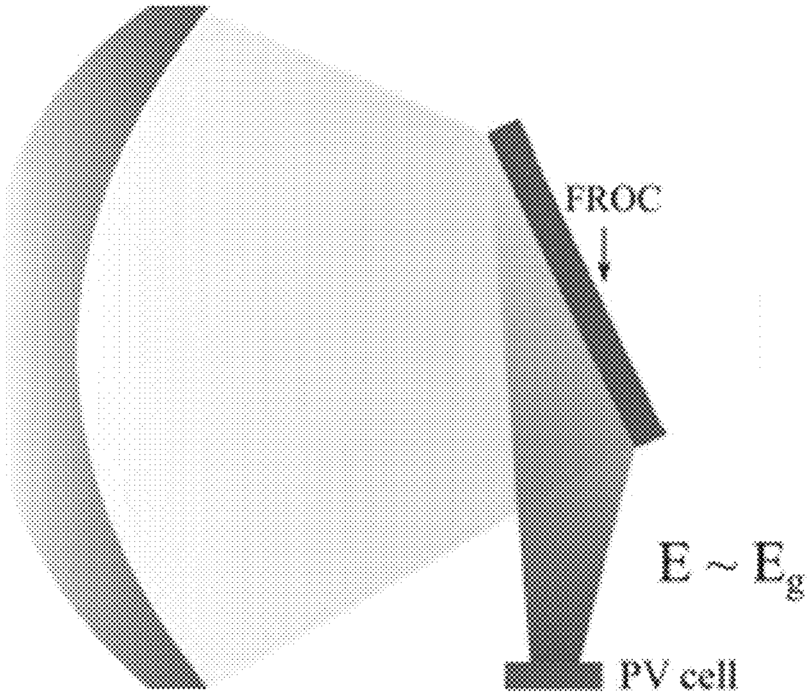
FIG. 5B is a drawing of a FROC.
Figure 5C:
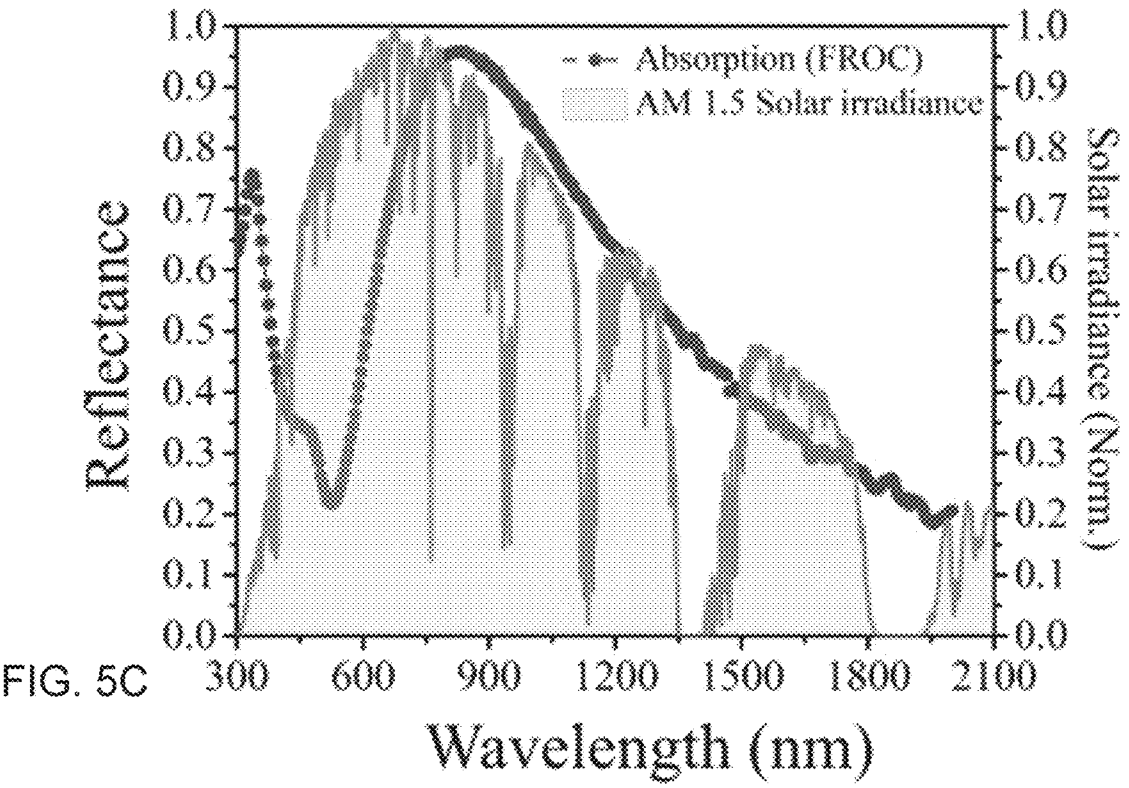
FIG. 5C is a graph showing a measured absorption of a Ge(15 nm)-Ni(5 nm)-$TiO_2$(85 nm)-Ag(120 nm) FROC.
Figure 5D:
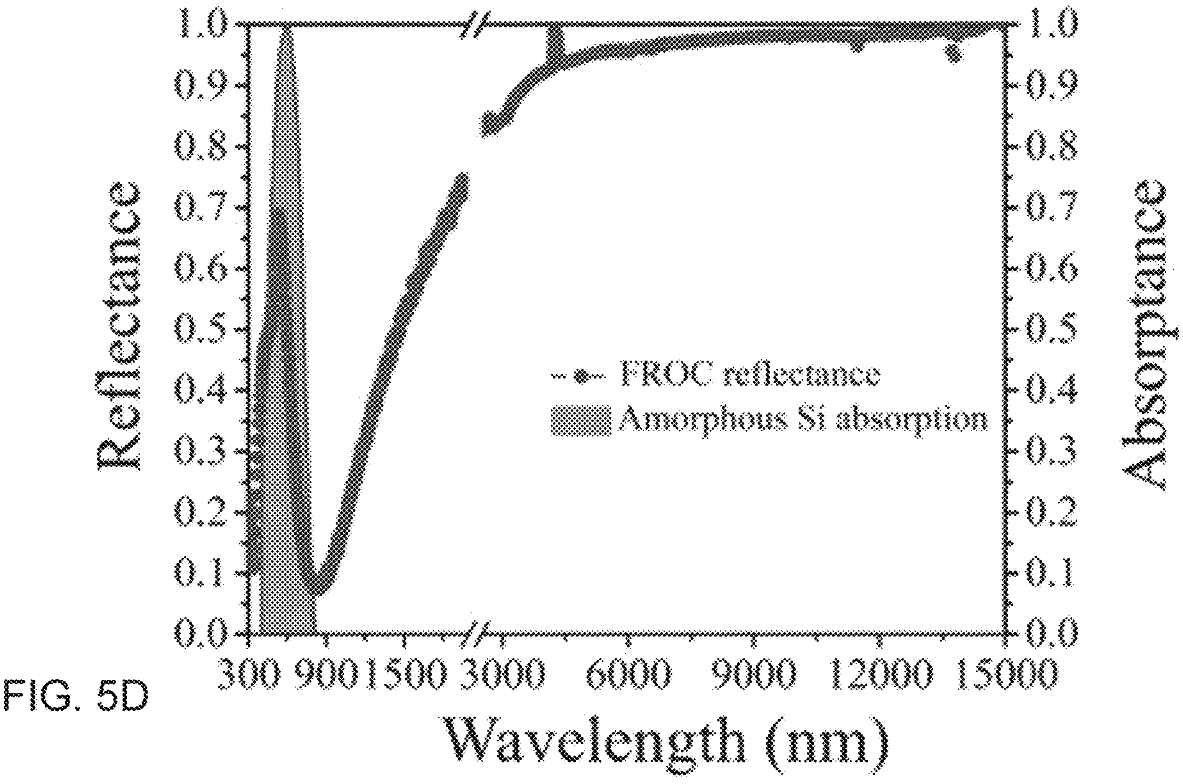
FIG. 5D is a graph showing a measured reflection from the same FROC which selectively reflects light within the wavelength range corresponding to the absorption of an a-Si PV cell (Amorphous Si absorption)
Figures 5E, 5F, 5G:
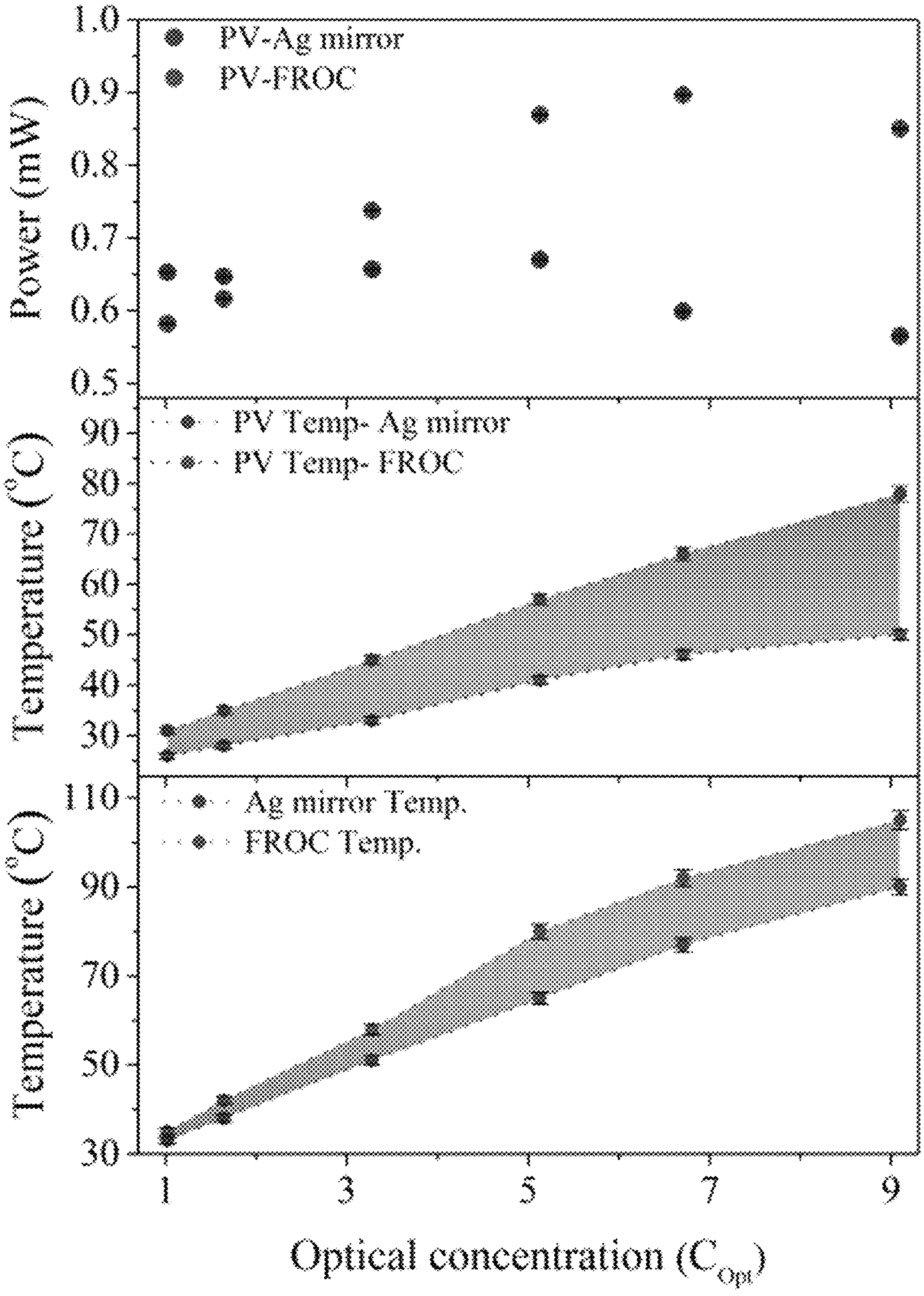
FIG. 5E is a graph showing a measured power output from a PV cell receiving light reflected from an Ag mirror and a FROC for different optical concentrations ($C_{Opt}$)
FIG. 5F is a graph showing the temperature of the PV cell operating with an Ag mirror and a FROC.
FIG. 5G is a graph showing the temperature of the Ag mirror and the FROC.

Part 6 Hybrid Solar Thermal/Electric Energy Generation Using FROCs:

FIG. SA is a drawing showing a schematic diagram of a conventional PV/solar-thermal energy conversion setup where concentrated solar light is incident on a spectrum splitting filter that reflects photons with energies greater than the PV bandgap energy $E_g$ to a PV cell, while transmitting the rest to a separate thermal receiver. FIG. 5B is a drawing of a FROC which reflects photons with energies ~$E_g$, while directly absorbing photons >>$E_g$, or <$E_g$. FIG. SC is a graph showing a measured absorption of a Ge(15 nm)-Ni(5 nm)-$TiO_2$(85 nm)-Ag(120 nm) FROC which shows an overall high average absorption within the solar spectrum (Orange line). FIG. 5C is a graph showing a measured absorption of a Ge(15 nm)-Ni(5 nm)-$TiO_2$(85 nm)-Ag(120 nm) FROC which shows an overall high average absorption within the solar spectrum (AM 1.5 solar irradiance). FIG. 5D is a graph showing a measured reflection from the same FROC which selectively reflects light within the wavelength range corresponding to the absorption of an a-Si PV cell (Amorphous Si absorption). FIG. 5E is a graph showing a measured power output from a PV cell receiving light reflected from an Ag mirror and the FROC for different optical concentrations ($C_{Opt}$). FIG. 5F is a graph showing the temperature of the PV cell operating with an Ag mirror and a FROC. FIG. 5G is a graph showing the temperature of the Ag mirror and the FROC.

Now turning to solar energy applications of FROCs, optical coatings are widely used in solar energy conversion [20, 36, 62] e.g., to split the solar spectrum into several bands to increase the net efficiency of photovoltaics (PV) cells where the solar spectrum is split among PV cells with different bandgaps to achieve efficiencies beyond the Shockley-Queisser limit. However, due to recent advances in PV efficiency and cost, the main challenge facing solar energy generation is dispatchability. From an electricity grid management perspective, solar power generation is equivalent to a decrease in energy demand from power plants. The mismatch between peak solar energy (mid-day) production and peak energy demand (sunset) is causing major energy regulation issues due to the so-called Duck Curve problem [63]. As the sun sets solar energy production decreases rapidly, while energy demands peaks which requires an intense ramp-up in energy production from power plants which can damage existing energy infrastructure. In addition, power plants economics require continuous operation which can cause power over-generation. To address this problem, grid managers curtail solar energy generation by switching-off solar panels [64]. Hybrid thermal-electric solar energy generation can address the dispatchability problem by splitting the solar spectrum into a PV band that generates electricity and thermal band(s) that generates heat which can be stored for night time usage [62, 65]. A major practical challenge for hybrid thermal-electric systems, however, is finding feasible optical materials that can efficiently divide the solar spectrum [65-68].

In addition, most PV cells do not operate efficiently at high optical intensities $I=C_{opt}I_{solar}$, where $C_{Opt}$ is the optical concentration, and $I_{solar}$ is the solar radiation intensity and is ~1000 $W \cdot m^{-2}$. This is because absorbed photons with energies lower or much larger than the PV cell bandgap energy $E_g$ are converted to thermal energy due to sub-bandgap absorption or thermal relaxation of high energy photons. The thermalization of PV cells deteriorates their efficiency. Furthermore, the aging rate of PV cells can double with every 10 °C increase in their temperature [69]. Several approaches were introduced to cool PV cells. [68, 70-72]. These approaches, however, mitigate the thermally induced efficiency reduction and do not exploit the excess thermal energy.

FROCs can address both the Duck curve problem and the PV cell heating problems. FIG. 5A shows a conventional hybrid PV/solar-thermal energy conversion strategy where incident solar spectrum is concentrated on a spectrum splitter which directs sub-bandgap photons ($<E_g$) to a thermal receiver and reflect photons with energies $>E_g$ to a PV cell. A FROC, however, can divide the solar spectrum into three bands; a PV band corresponding the selective reflection wavelength range that reflects useful photons to the PV subsystem, and two thermal bands where photons with energies $<E_g$ and $>>E_g$ are absorbed and converted to heat as shown schematically in FIG. 5B. A FROC behaves simultaneously as a multi-band spectrum splitter and a thermal receiver.

An exemplary FROC including Ge(15 nm)-Ni(5 nm)-$TiO_2$(85 nm)-Ag(120 nm) can be used to reflect within the PV band of an amorphous-Si (a-Si) PV cell. FIG. 5C shows the measured absorption of unpolarized light incident on the FROC at 45° incidence angle. The FROC has strong absorption over the entire solar spectrum with limited absorption beyond the solar spectrum, i.e., it behaves as a selective light absorber with average absorptance $\bar{\alpha}$~0.55 (See Theory). The solar irradiance spectrum (AM 1.5) is shown for reference. FIG. 5D shows the FROC reflection of unpolarized light at 45° incidence angle where the Fano resonance peak overlaps strongly with the a-Si absorption band (shown in green), i.e., the FROC is designed to selectively reflect the PV band of an a-Si PV cell. Because the $TiO_2$ refractive index has a weak temperature dependence within the temperature range of interest [73], heating does not affect the FROC's resonance. The a-Si PV cell, thus, receives useful photons only and, ideally, can operate with higher efficiency at higher optical concentrations, while the FROC high temperature can be independently used for other solar-thermal application or for energy storage. In addition, the FROC behaves as a selective solar absorber as it has low spectral emissivity $\bar{\varepsilon}$~0.0014 in the IR wavelength range (See FIG. 14A-FIG. 14C). The low emissivity suppresses the blackbody radiation losses and increases the optothermal efficiency of the absorber [74, 75].

To demonstrate hybrid thermal/electric energy generation using FROCs experimentally, a solar simulator and a lens were used to provide optical concentration in a configuration similar to the one presented in FIG. 5B (See also, FIG. 15A-FIG. 15D). Solar light is incident on a reflecting silver mirror or a FROC tilted at a 45° angle and is then directed to an a-Si PV cell. The temperature of the Ag mirror, FROC and the PV cell are measured via thermocouples (See Theory). At low optical concentrations $C_{Opt}$, the PV generates more power for light reflected from an Ag mirror (FIG. 5E). However, for $C_{Opt} \geq 2$, the PV receiving solar light from a FROC generates higher power. This is because for lower optical concentrations the higher reflection of the Ag mirror within the PV band outweighs the efficiency deterioration due to heat generated inside the PV. At higher $C_{Opt}$, however, the thermalization reduces the PV efficiency and a PV operating with a FROC generates more power. FIG. 5F shows that the measured temperature of a PV cell operating with light reflected from an Ag mirror is consistently higher than the PV cell operating with light reflected from a FROC. The temperature difference between the two PV cells at $C_{Opt}=9$ is ~30° C., i.e., a possible six-fold increase in the projected lifetime of the PV cell operating with a FROC. The generated power from the FROC/PV system is ~50% higher than the Ag/PV system at $C_{Opt}=5$.

In addition, the FROC temperature is higher than the silver mirror temperature for all optical concentrations (FIG. 5G) i.e., the unwanted heat inside the PV is now generated inside the FROC and can be used for thermal energy storage. Note that an alternative approach is to overlap a DBR mirror with a selective solar, however, this approach requires micron thick mirrors and if the PV band is narrow, as in the case with a-Si cells, DBR mirrors may not be practical [66, 67].

Part 7 Other Applications:

Superior PV efficiency under one sun illumination is another use for FROCs. Moreover, multiple Fano resonances can be used to create hybrid thermal electric energy generation while operating a multijunction PV cell. Double and multi-Fano resonances can be accomplished using FROCs [77] as well as the photonic analogue of electromagnetic induced transparency. Furthermore, nonlinear properties of FROCs can open the door for active photonic applications [78] and reconfigurable nonreciprocity [79]. Incorporating a phase change material in FROC can be used for tunable optical modulators with high modulation depth and can find applications in steganography [80, 81]. The reflection spectrum of FROCs suggests that they can support new types of resonant surface electromagnetic waves [82]. Finally, FROCs behavior as an absorptive and iridescent-free notch filter promises a wide range of applications for low noise point of care diagnostic instruments.

Part 8 Supplemental Description

Figure 6:
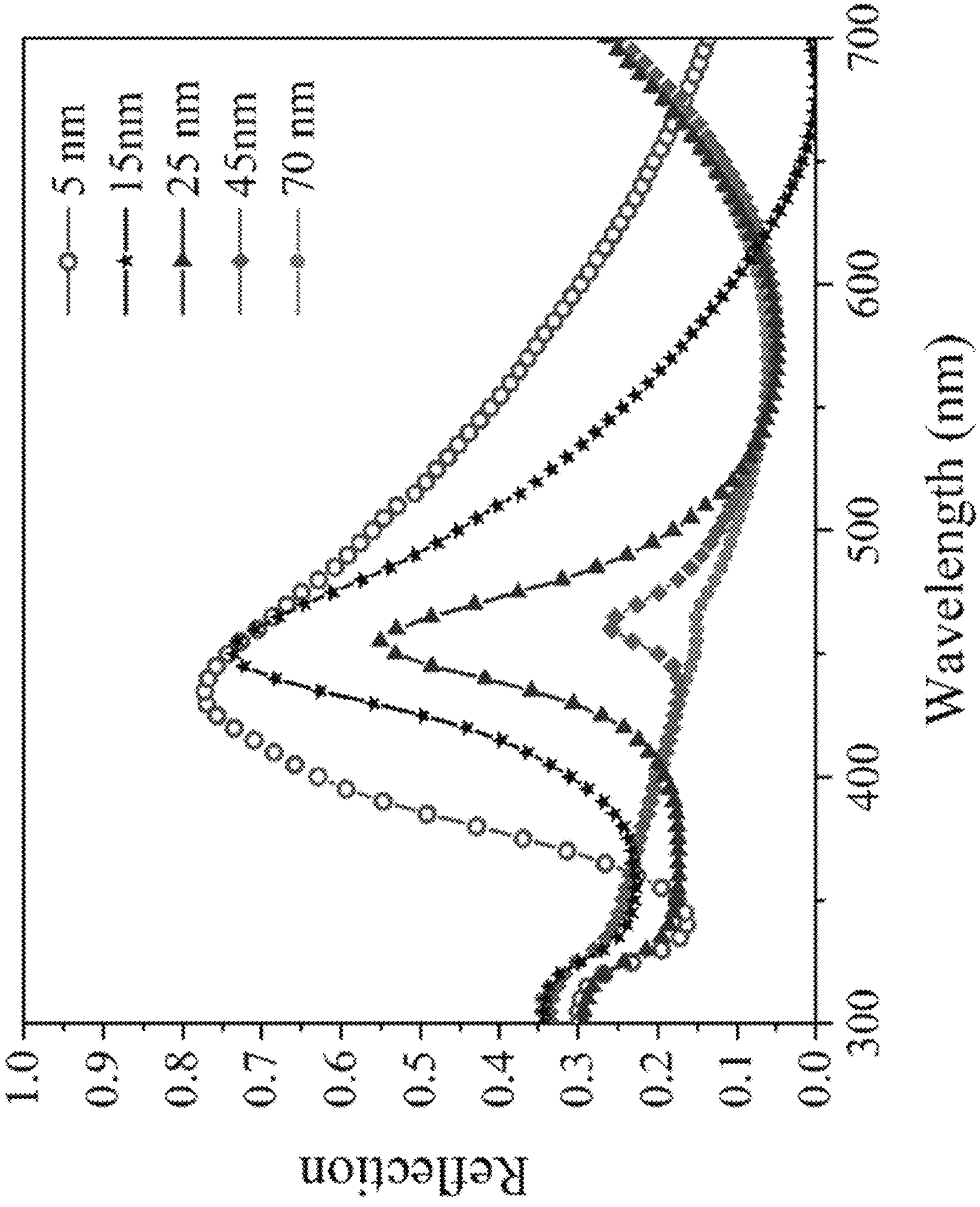
FIG. 6 is a graph showing tuning the coupling between the two oscillators by increasing the metal layer thickness.

Tuning the Coupling Between the Oscillators:

FIG. 6 is a graph showing tuning the coupling between the two oscillators by increasing the metal layer thickness. From Part 2, equation 3, it can be seen that as we decrease the transmission across the metallic layer, i.e., as $\tilde{t}_{ad}$ and $\tilde{t}_{da} \rightarrow 0$, the coupling between the cavities decrease (See FIB. 1B). Accordingly, tuning the coupling is tantamount to tuning the transmission across the metallic layer, e.g., by changing its thickness or using different types of metals, e.g., Cu, Au, or Al. The coupling tunability by changing the thickness of the metallic film from 5 nm to 70 nm was experimentally demonstrated as shown in FIG. 6. As the metal thickness increase ($L_m \rightarrow \infty$) the coupling decrease and the Fano resonance spectral lineshape diminish. Fano resonance almost entirely disappear when $L_m$=70 nm.

Figure 7A:
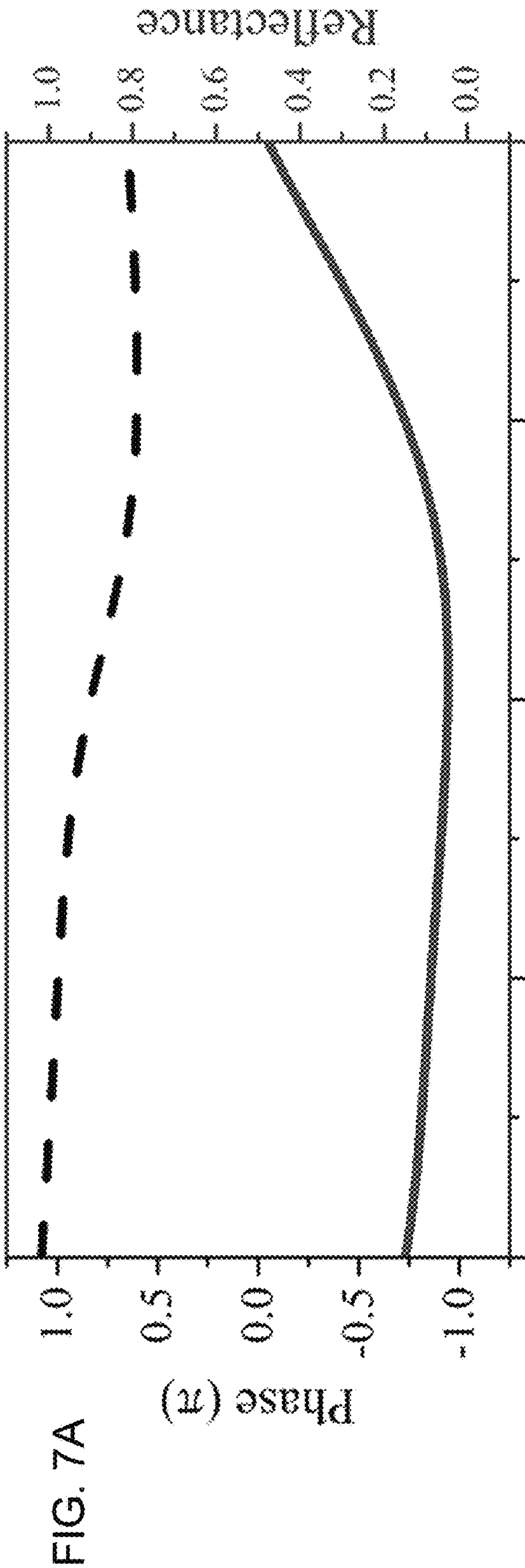
FIG. 7A is a graph showing a phase profile of thin-film light absorbers, the calculated reflection phase for a broadband absorber (15 nm Ge-100 nm Ag)
Figure 7B:
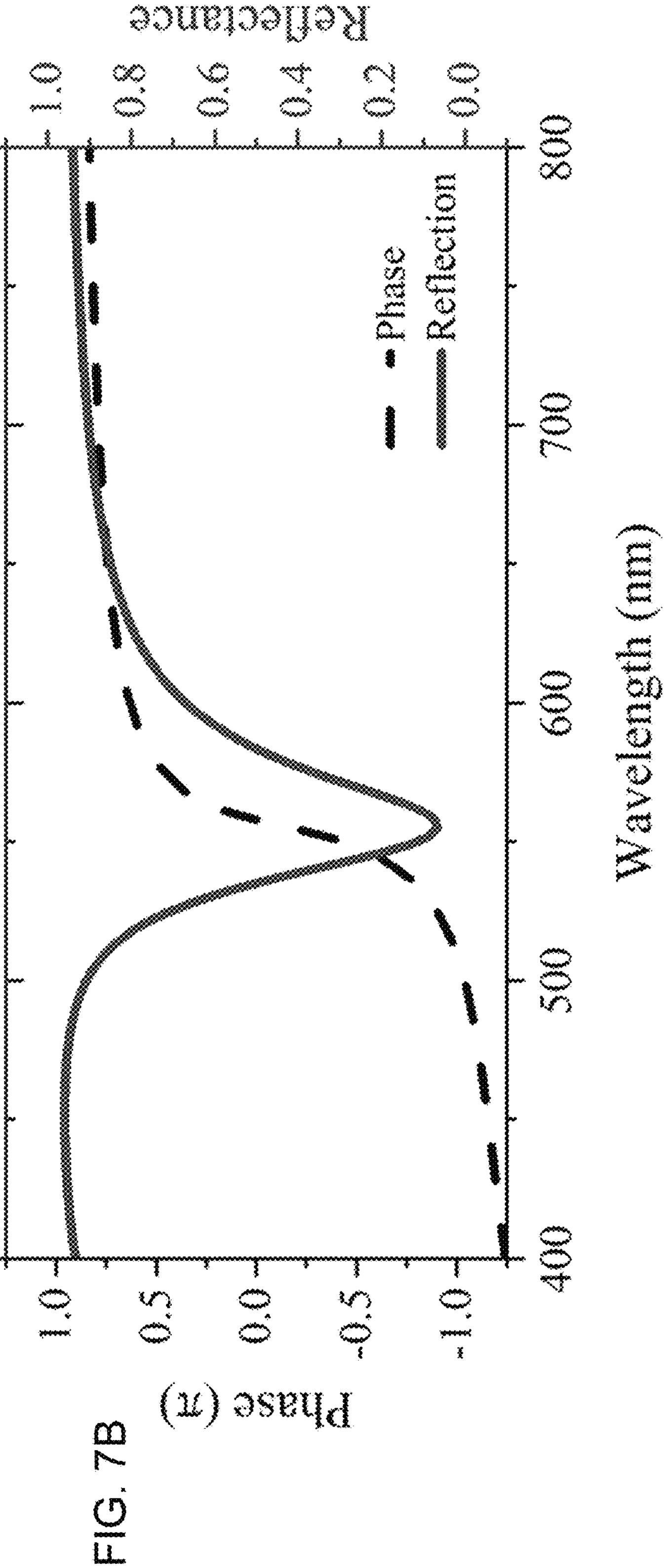
FIG. 7B is a graph showing a phase profile of thin-film light absorbers, the calculated reflection phase for a narrowband absorber (25 nm Ag-60 nm $TiO_2$-100 nm Ag)

FIG. 7A is a graph showing a phase profile of thin-film light absorbers, the calculated reflection phase for a broadband absorber (15 nm Ge-100 nm Ag). FIG. 7B is a graph showing a phase profile of thin-film light absorbers, the calculated reflection phase for a narrowband absorber (25 nm Ag-60 nm $TiO_2$-100 nm Ag). The phase and reflection were calculated using transfer matrix method. The broadband absorber has almost a constant phase, while the narrowband absorber undergoes a rapid (~π phase shift near resonance. This leads to the asymmetric line shape of the observable where Fano resonance occurs, i.e., absorption line.

Figure 8:
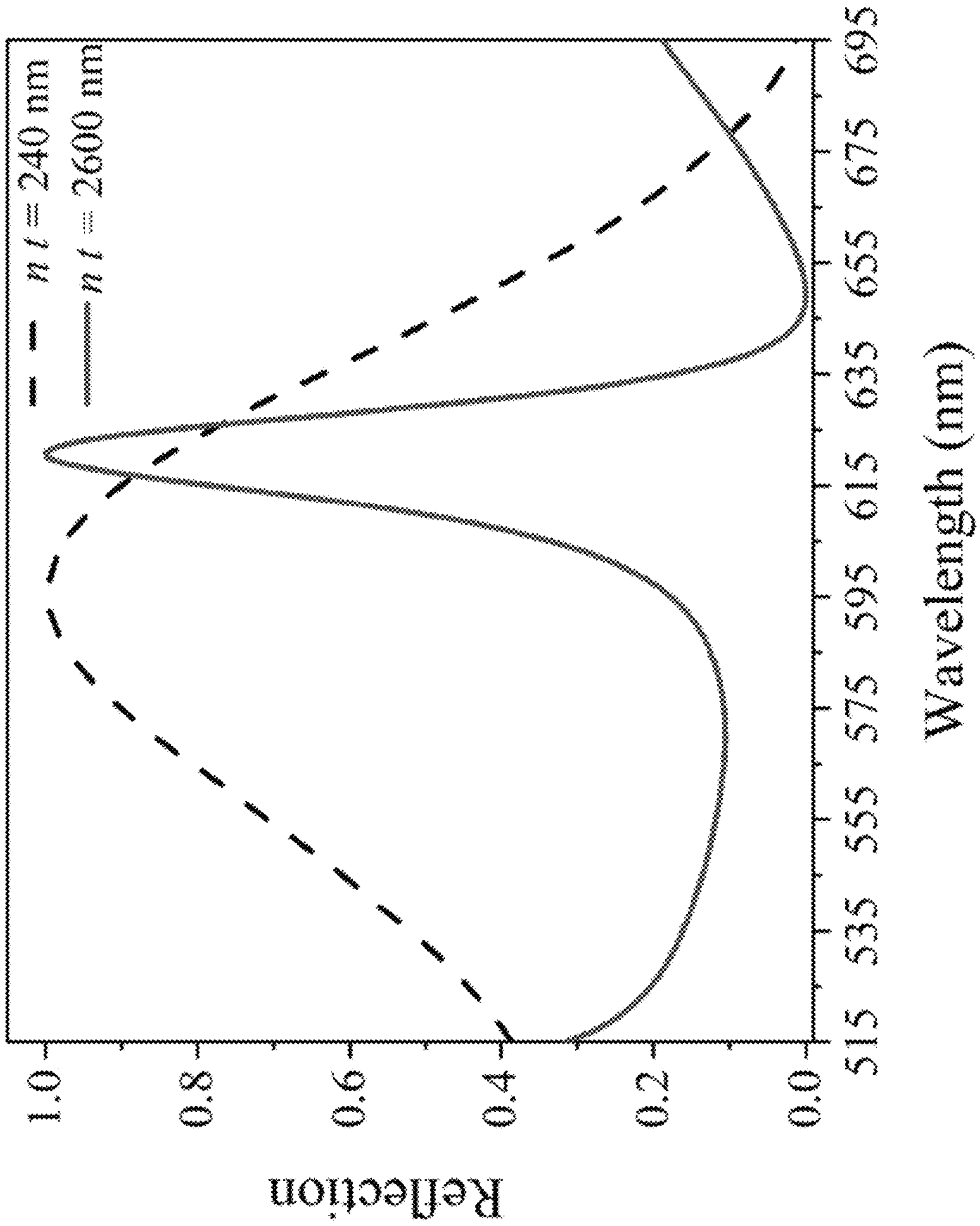
FIG. 8 is a contour plot showing a measured reflection (p-polarized light, incident angle=15°) of a short optical thickness FROC.

FIG. 8 is a graph showing a measured reflection (p-polarized light, incident angle=15°) of a short optical thickness FROC n*t=240 nm and a large optical thickness FROC n*t=2600 nm. Because the damping in the weakly damped cavity $\Gamma_2$ is inversely proportional to the optical thickness, optically thicker cavities enjoy narrower Fano resonance.

Figure 9:
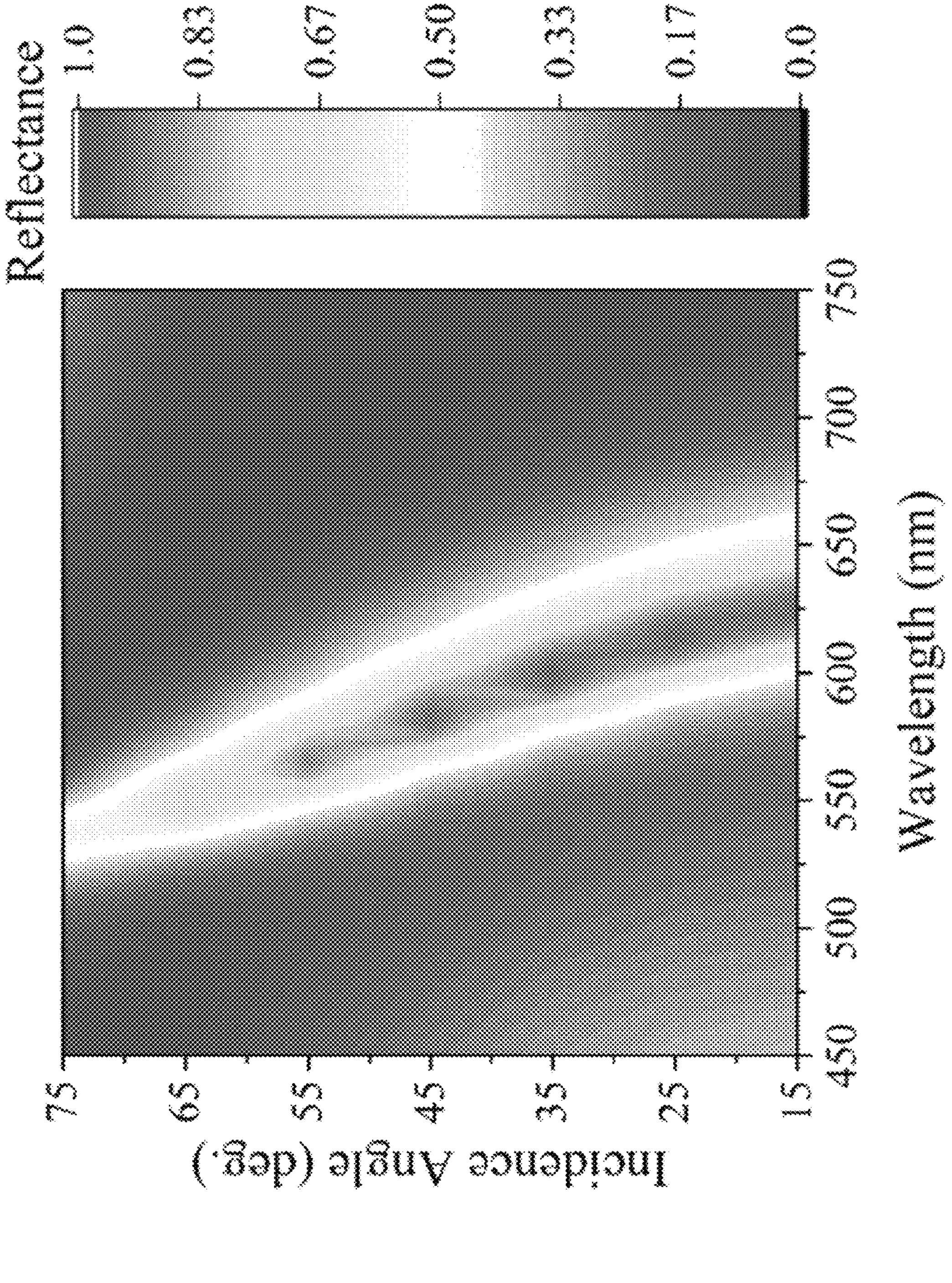
FIG. 9 is a contour plot showing how b Because the Fano resonance bandwidth depends on the MDM cavity bandwidth.

FIG. 9 is a contour plot showing how we can deduce the angle dependence of the bandwidth, because the Fano resonance bandwidth depends on the MDM cavity bandwidth which is given by $$\delta\lambda = \lambda_0^2(1-R)/2nt\cos\theta\pi\sqrt{R}.$$

In particular, as we increase the incidence angle, the resonance becomes narrower. In FIG. 9, we measure the angular reflection of a FROC and observe narrowing in the bandwidth as the angle increases from ~50 nm at θ=15° to ~37 nm at θ=75°.

Figure 10A:
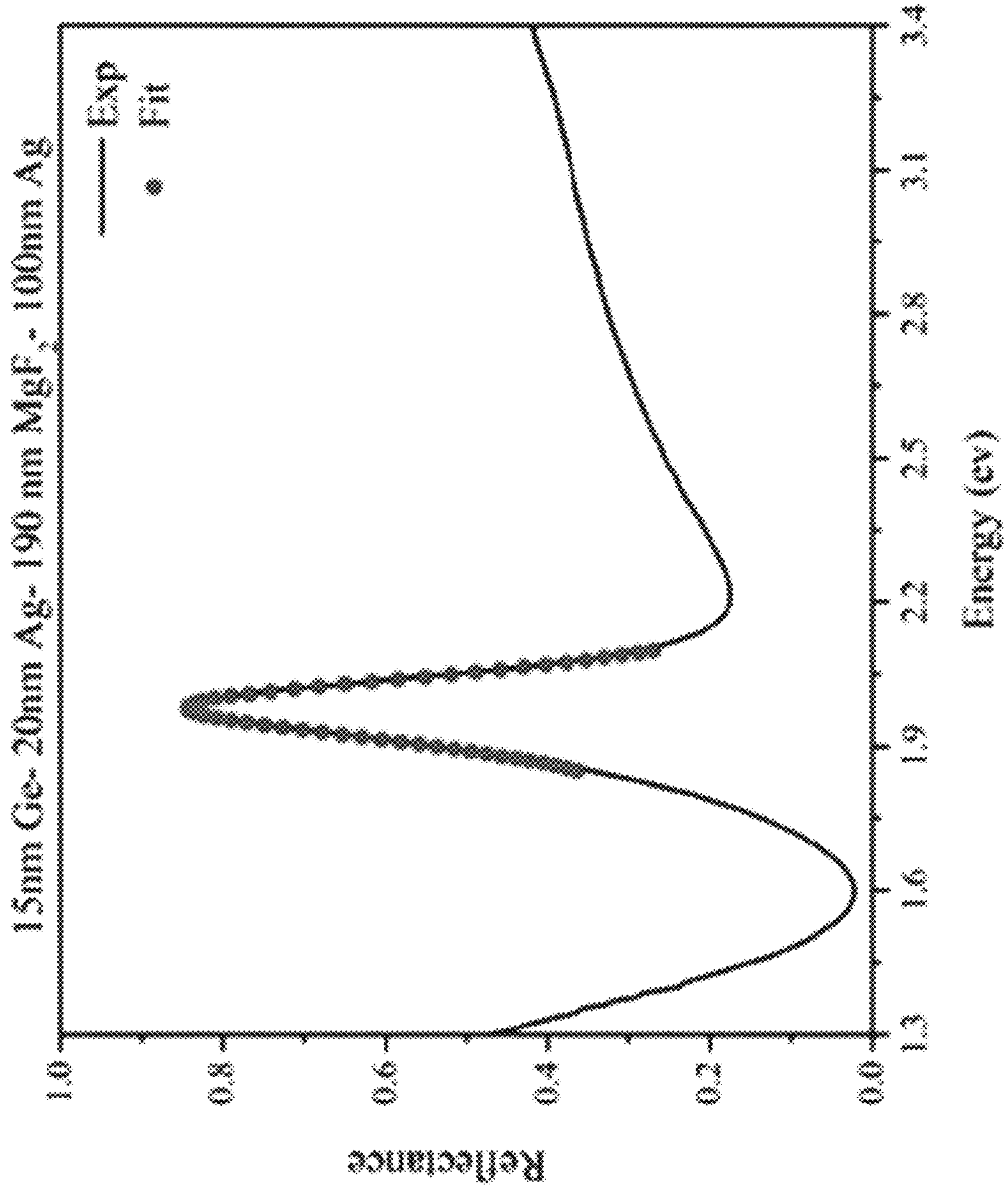
FIG. 10A (S5) is a graph showing line-shapes fit with the Fano formula of eq. E1 for 15 nm Ge-20 nm AG-190 nm MgF2-100 nm Ag.
Figure 10B:
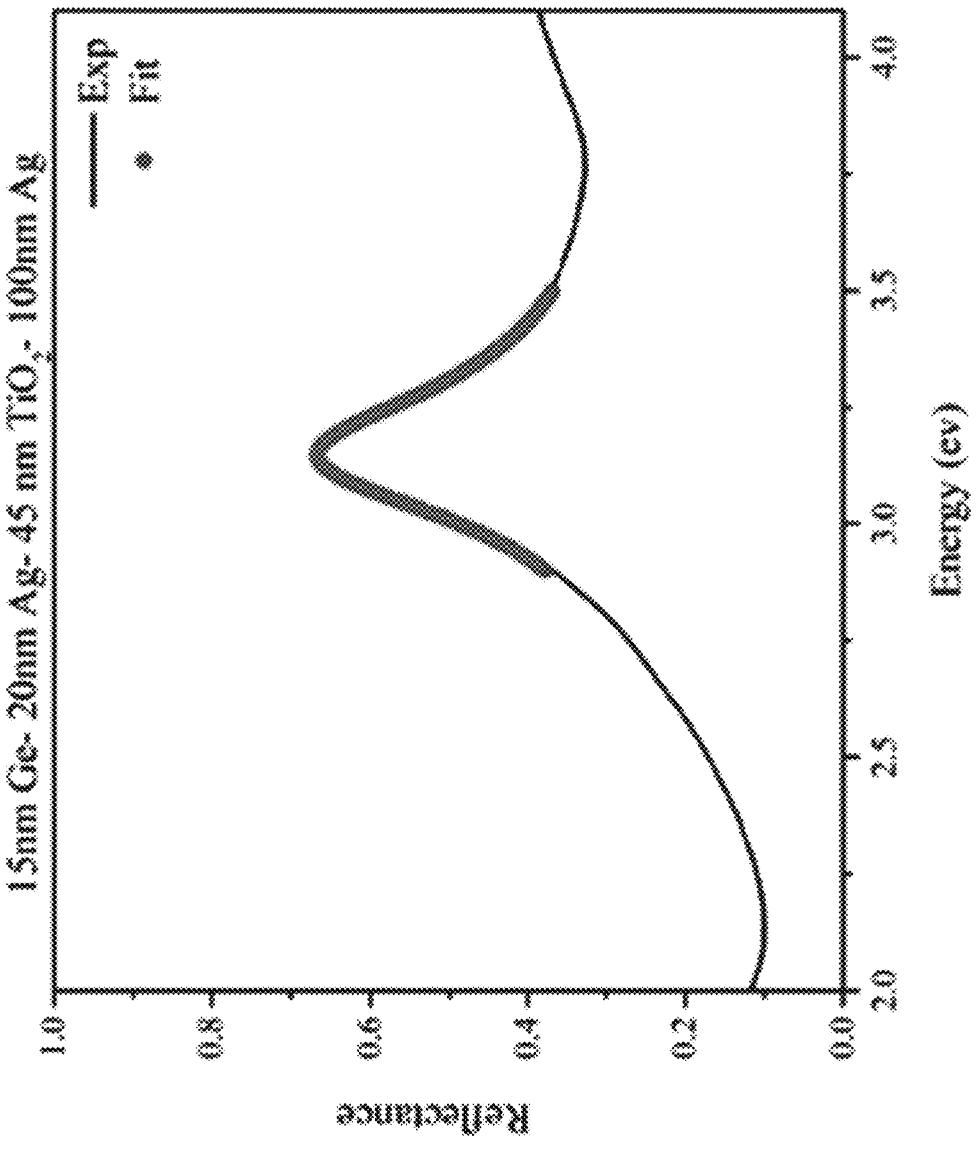
FIG. 10B (S5) is a graph showing line-shapes fit with the Fano formula of eq. E1 for 15 nm Ge-20 nm AG-45 nm $TiO_2$-100 nm Ag.
Figure 10C:
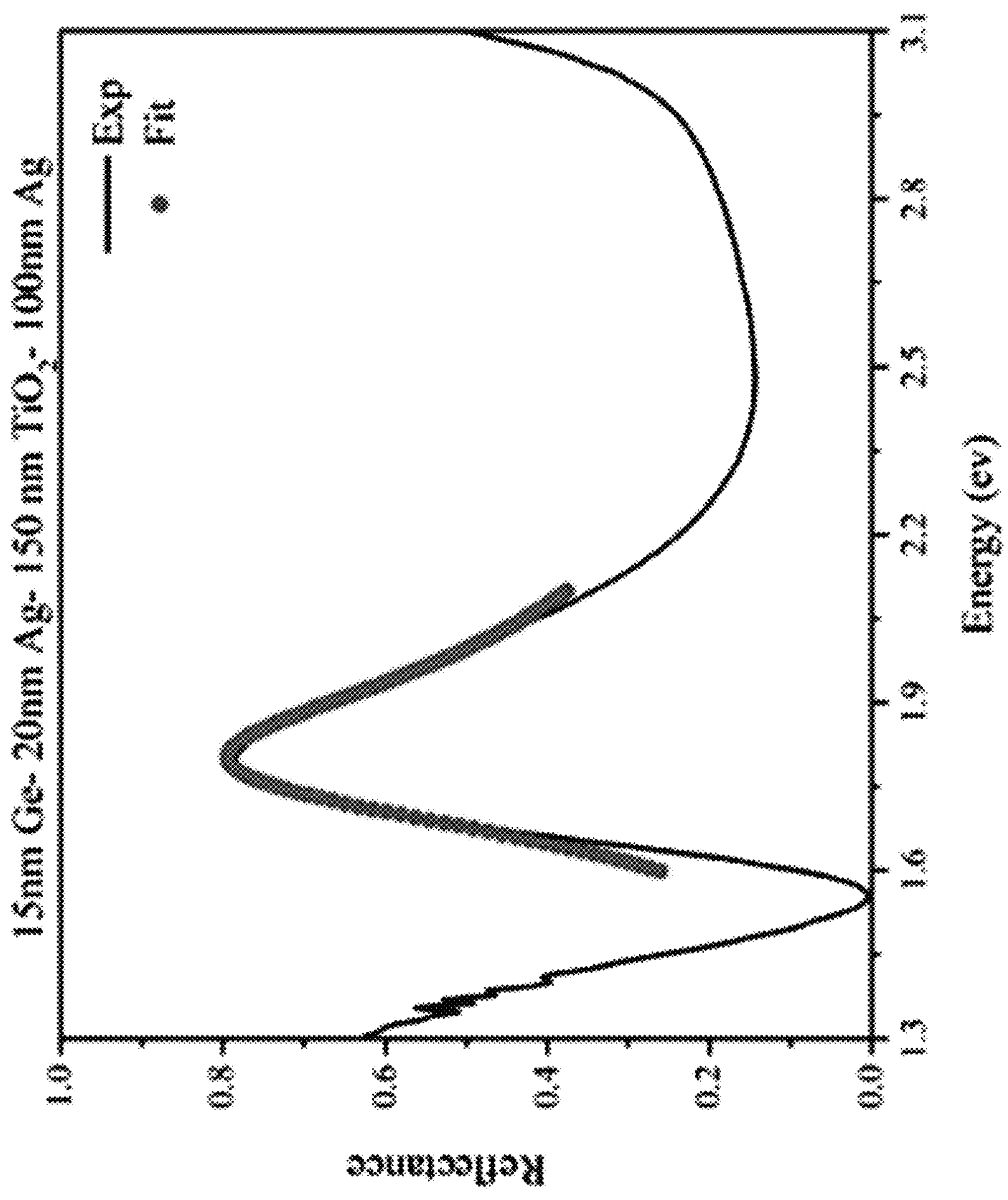
FIG. 10C (S5) is a graph showing line-shapes fit with the Fano formula of eq. E1 for 15 nm Ge-20 nm AG-150 nm $TiO_2$-100 nm Ag.

Fano Resonance Lineshape Fitting:

FIG. 10A is a graph showing line-shapes fit with the Fano formula of eq. E1 for 15 nm Ge-20 nm AG-190 nm MgF2-100 nm Ag. FIG. 10B is a graph showing line-shapes fit with the Fano formula of eq. E1 for 15 nm Ge-20 nm AG-45 nm $TiO_2$-100 nm Ag. FIG. 10C is a graph showing line-shapes fit with the Fano formula of eq. E1 for 15 nm Ge-20 nm AG-150 nm $TiO_2$-100 nm Ag.

To fit the Fano resonance for each sample, we analyzed the largest peak in absorption spectrum. To minimize the effects of the background absorption, the fitting was restricted to data points within half the maximum peak height. Using nonlinear regression, these points were fit to the functional form [1]:

$$\sigma(E) = A + D^2\frac{(q+\Omega(E))^2}{1+\Omega^2(E)} \tag{E1}$$

where E is the energy, q is the Fano parameter, and Ω(E) =2(E−$E_0$/Γ. The resonance energy and width are $E_0$ and Γ, respectively. The constant A≥0 is in some cases necessary to model an overall shift due to background absorption. The fitting is shown in FIG. 6 for three FROCs and the parameters for the three cases are given by:

| Sample | $E_0$[eV] | Γ[eV] | A | D | q |
|---|---|---|---|---|---|
| $MgF_2$ | 1.99 | 0.19 | 0 | 0.12 | −7.78 |
| $TiO_2$ 150 nm | 1.75 | 0.37 | 0 | 0.24 | 3.56 |
| $TiO_2$ 45 nm | 3.13 | 0.35 | 0.26 | 0.056 | 11.33 |

Another way to illustrate the Fano resonance response in FROCs is by considering the phase response of the individual broadband and narrowband nanocavities [1]. As shown in FIG. 7A and FIG. 7B, while the phase of the broadband absorber varies slowly, the phase of the narrowband absorber changes by π at the resonance. The resulting interference profile, thus, exhibit the well-known asymmetric lineshape with a sudden change between a dip and a peak.

Figure 11:
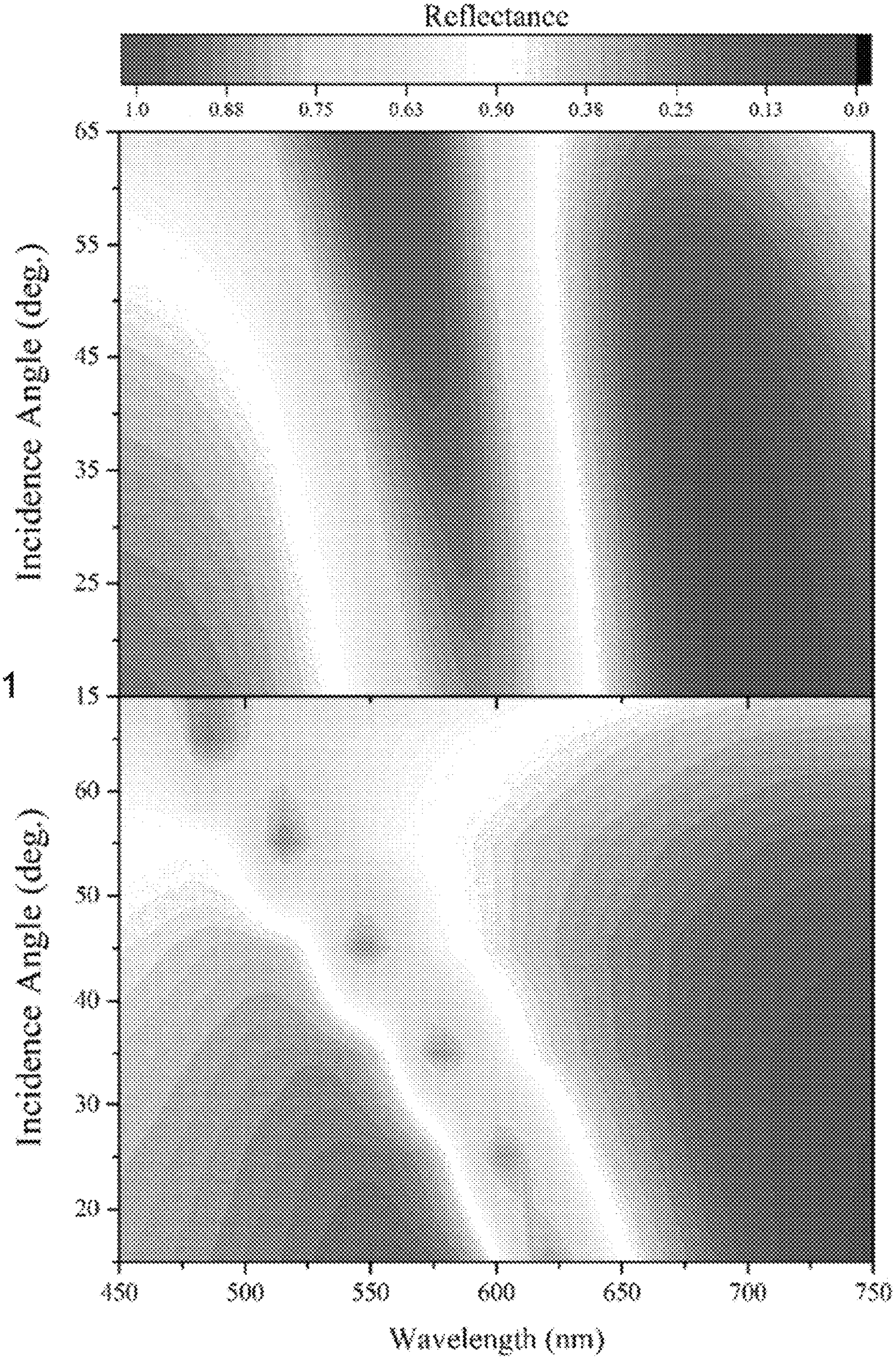
FIG. 11 has contour graphs showing an angular reflection for TE polarized light of a FROC with (Top) $TiO_2$ and (bottom) $MgF_2$, as a dielectric.

S-Polarized Angular Reflection for FROCs with High- and Low-Index Dielectric Films:

FIG. 11 has contour graphs showing an angular reflection for TE polarized light of a FROC with (Top) $TiO_2$ and (bottom) $MgF_2$, as a dielectric. The results are obtained for the same samples presented in FIG. 2G and FIG. 2H.

Figure 12:
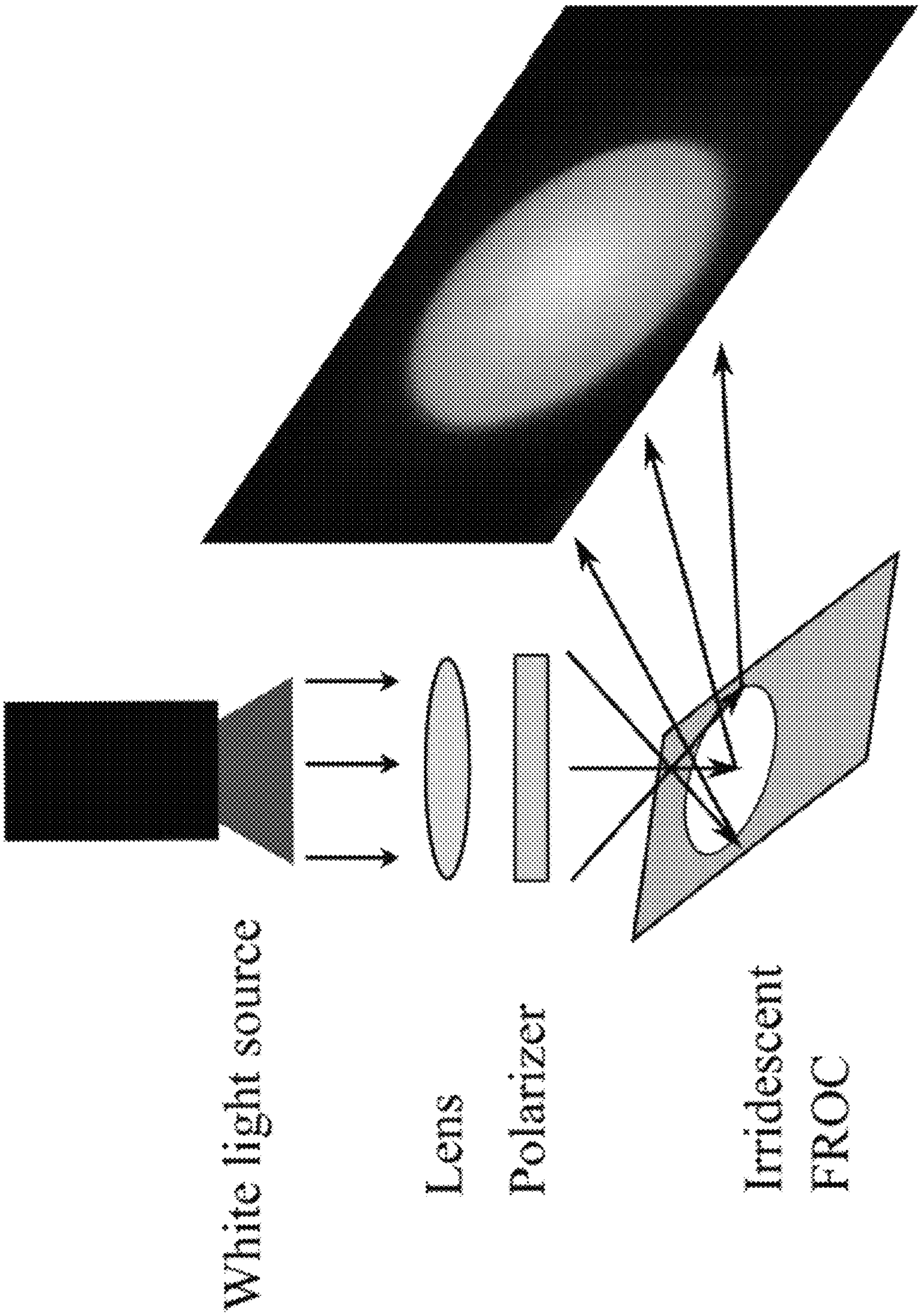
FIG. 12 is a drawings showing and experimental setup to measure spectral splitting using an iridescent FROC.

Experimental Measurement of Spectral Splitting Using Iridescent FROC:

FIG. 12 is a drawings showing and experimental setup to measure spectral splitting using an iridescent FROC. The iridescence of low refractive index FROC can be used to analyze white light spectrum which is important for anti-counterfeiting optical coatings [25], spectrometers and in solar energy applications [62]. To demonstrate this, we used a solar simulator and a converging lens such that light incident on a Ge(15 nm)-Ag(20 nm)-$MgF_2$(190 nm)-Ag(100 nm) FROC has strong angular dispersion. The experimental setup and a photograph of the split spectrum is shown in FIG. 2H, where angularly dispersed white light is split into different wavelengths upon reflection from the FROC. The angular dispersion can be further increased by using lower index dielectric which can be achieved via glanced angle deposition [88]. The experimental setup for spectral splitting using an iridescent FROC is shown in FIG. 12. A photograph of the spatially split spectrum to red, yellow and green is shown.

Figure 13A:
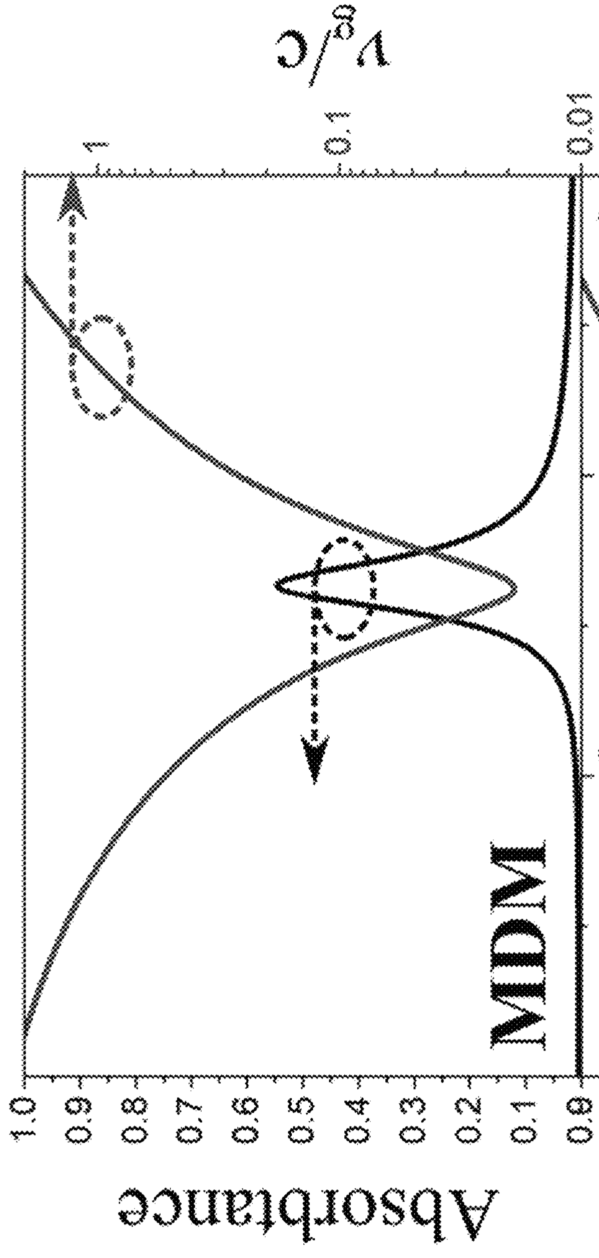
FIG. 13A is a graph showing the calculated group velocity normalized with the speed of light in vacuum ($v_g$/c) and absorption in an MDM cavity.
Figure 13B:
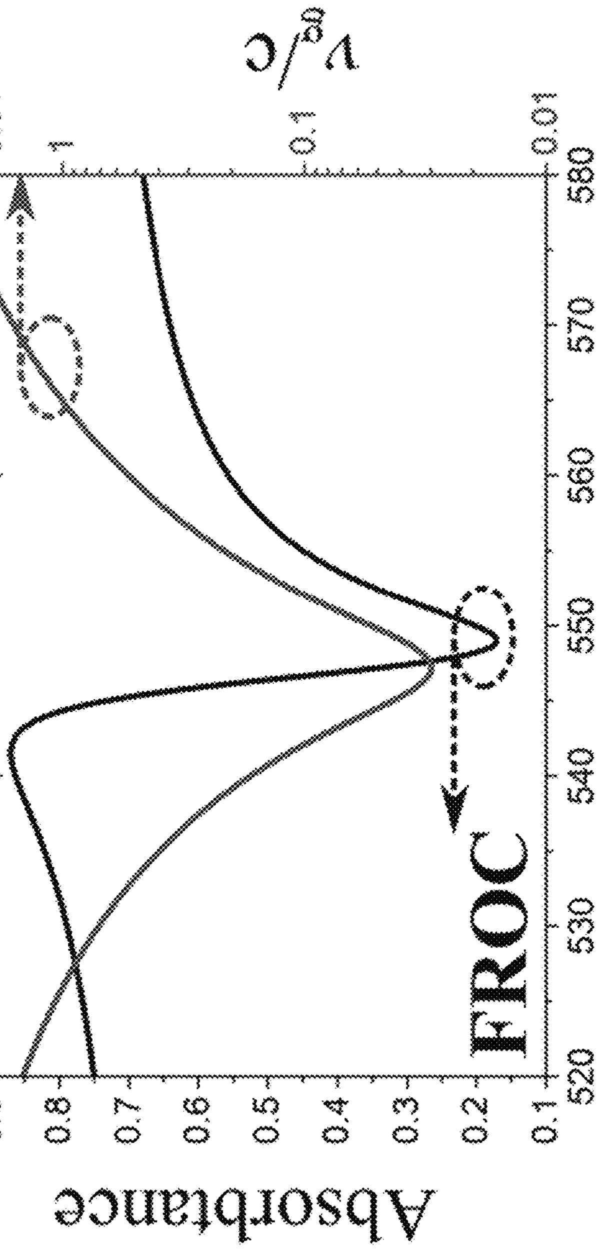
FIG. 13B is a graph showing the calculated group velocity normalized with the speed of light in vacuum ($v_g$/c) and absorption in a FROC that includes the MDM cavity of FIG. 13A.

Group Velocity of Light in FROC:

FIG. 13A is a graph showing the calculated group velocity normalized with the speed of light in vacuum ($v_g$/c) and absorption in an MDM cavity. FIG. 13B is a graph showing the calculated group velocity normalized with the speed of light in vacuum ($v_g$/c) and absorption in a FROC that includes the MDM cavity of FIG. 13A.

The high dispersion associated with Fano resonance leads to a high effective group index and slow light [90]. Along the lines of Yu et al. [83] and Bendickson et al. [84] we will define an effective group velocity of light passing through a stack of layers. Let T (ω) be the complex transmission coefficient of the stack for light at normal incidence of angular frequency ω, which can be calculated using the transfer matrix approach [85]. We assume a superstrate, and substrate medium with the same index $n_0$ on either side of the stack If the stack has a total thickness t, then we can determine the effective index of refraction $n_{eff}(\omega)$ and extinction coefficient $k_{eff}(\omega)$ of a homogeneous material of thickness t that would yield the same $T(\omega)$. This corresponds to the finding the numerical solution of $$T(\omega) = \frac{2\, i\, n_0\, \bar{n}_{eff}(\omega)}{2\, i\, n_0\, \bar{n}_{eff}(\omega)\cos\left(\frac{\omega\, \bar{n}_{eff}(\omega)t}{c}\right) + \left(n_0^2 + \bar{n}_{eff}^2(\omega)\right)\sin\left(\frac{\omega\, \bar{n}_{eff}(\omega)t}{c}\right)} \tag{E2}$$

where the effective complex refractive index $\bar{n}_{eff}=n_{eff}(\omega)+ik_{eff}(\omega)$. The group velocity $v_g(\omega)$ and group index can be determined through:

$$\frac{v_g(\omega)}{c} = n_g^{-1}(\omega) = \left[n_{eff}(\omega) + \omega\frac{dn_{eff}(\omega)}{d\omega}\right]^{-1} \tag{E3}$$

The group velocity was calculated for Ge(15 nm)-Ag(30 nm)-$TiO_2$(50 nm)-Ag(100 nm). Although an MDM cavity exhibits low group velocity $v_g$, the lowest $v_g$ corresponds to maximum optical losses (~0.55) inside the cavity (FIG. 2A). In FROCs, however, the lowest $v_g$ (here ~0.017 c) corresponds to minimum optical losses (~0.15) (FIG. 2B) which makes FROC a promising candidate for nanoscale slow light devices [52].

Comparison between BSF-FROC and Other Beam Splitters:

Figure S9|(a-c) schematically show the spectral response of (a) a transmission filter, and (b) a notch filter and (c) a dielectric coating commonly used as a beam splitter for pulsed lasers.

Figure 14A:
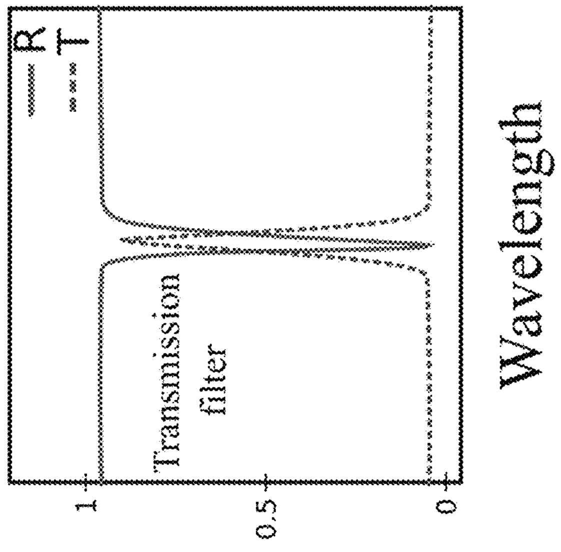
FIG. 14A is a graph that schematically shows the spectral response of a transmission filter that reflects a broad spectral range while transmits a narrow spectral range.
Figure 14B:
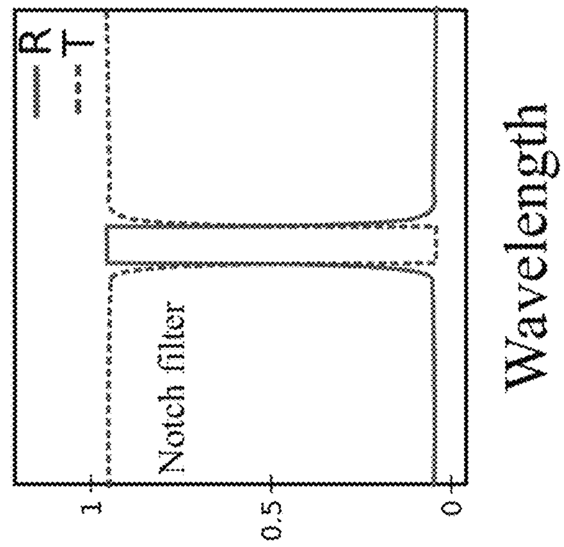
FIG. 14B is a graph showing a notch filter that reflects a narrow wavelength range and transmits the remainder.
Figure 14C:
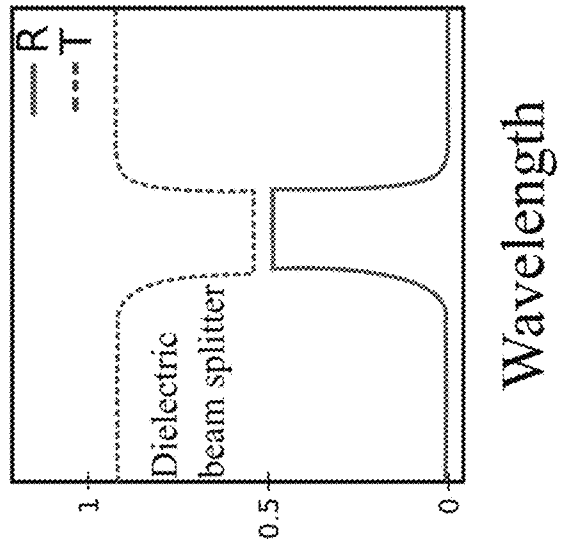
FIG. 14C is a graph showing an incident broadband light, where the color reflected and transmitted are not the same.

FIG. 14A is a graph that schematically shows the spectral response of a transmission filter that reflects a broad spectral range while transmits a narrow spectral range. FIG. 14B is a graph showing a notch filter that reflects a narrow wavelength range and transmits the remainder. FIG. 14C is a graph showing an incident broadband light, where the color reflected and transmitted are not the same.

FIG. 14A schematically shows the spectral response of a transmission filter that reflects a broad spectral range while transmits a narrow spectral range. On the other hand, a Notch filter (FIG. 14B) reflects a narrow wavelength range and transmits the remainder. If the incident light is broadband all the filters introduced in FIG. 4A, FIG. 4B, and FIG. 4C will reflect and transmit different colors, the reflected and transmitted colors are different. Consequently, conventional coatings cannot act as a BSF, i.e., it transmits and reflects same color under broadband illumination. Even a dielectric beam splitter, commonly used to split ultrafast pulsed lasers, does not behave as a BSF as shown in FIG. 14C, i.e., for an incident broadband light, the color reflected and transmitted are not the same. We note also that intensity filters, e.g., reflection filter using silvered substrates, are not spectral filters, i.e., they attenuate the transmission at (almost) all wavelengths.

Figure 15A:
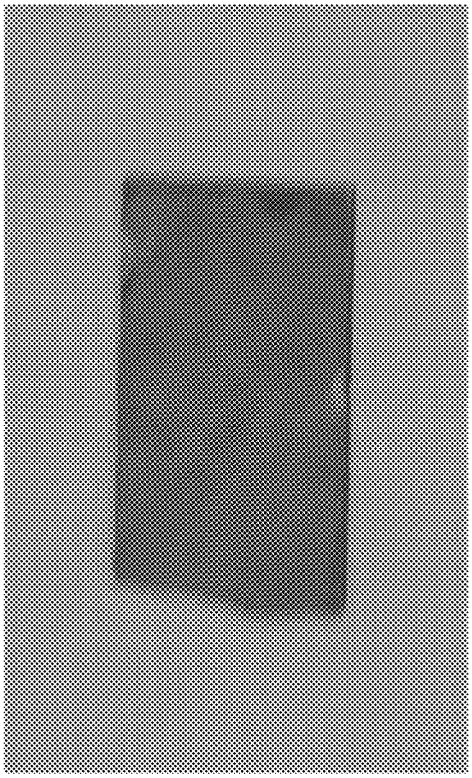
FIG. 15A is a drawing showing a metallic substrate is semitransparent, the FROC color in reflection and transmission.
Figure 15B:
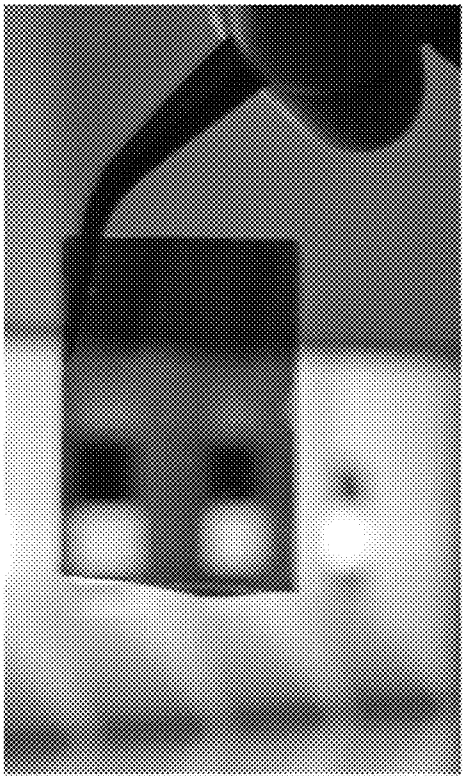
FIG. 15B is another drawing showing a metallic substrate is semitransparent, the FROC color in reflection and transmission.
Figure 15C:
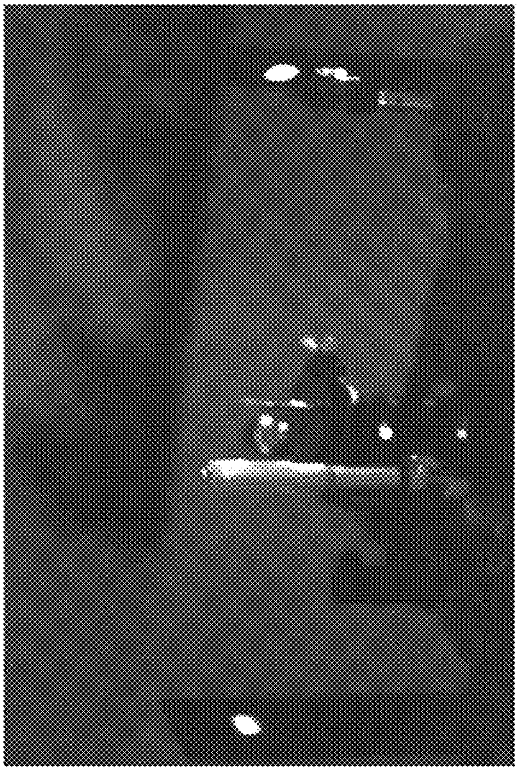
FIG. 15C is a drawing showing the reflected and transmitted light from an MDM cavity which reflects yellow and transmits purple.
Figure 15D:
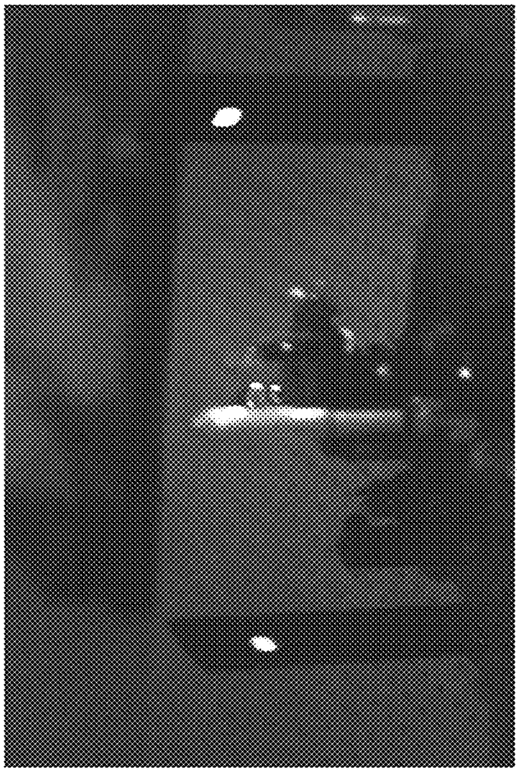
FIG. 15D is a drawing showing how a FROC transmits and reflects the same color (red)

A unique property of FROCs is that it acts as a beam-splitter filter. FIG. 15A is a drawing showing a metallic substrate is semitransparent, the FROC color in reflection and transmission. FIG. 15B is another drawing showing a metallic substrate is semitransparent, the FROC color in reflection and transmission. FIG. 15C is a drawing showing the reflected and transmitted light from an MDM cavity which reflects yellow and transmits purple. FIG. 15D is a drawing showing how a FROC transmits and reflects the same color (red). Accordingly, if the metallic substrate is semitransparent, the FROC color in reflection (FIG. 15A) and transmission (FIG. 15B) is the same. This property is an important step for thin-film based structural coloring. As an optical element, we show the difference between an MDM cavity and a FROC by illuminating them using a collimated white light. We show in (FIG. 15C) the reflected and transmitted light from an MDM cavity which reflects yellow and transmits purple. On the other hand, as shown in FIG. 15D, FROC transmits and reflects the same color (red). FROCs can thus be used as an optical element that filters and splits an incident beam simultaneously.

Comparison Between HTEP and Other Relevant Solar Energy Generation Schemes:

Hybrid thermal/electric energy (HTEP) generation differs from Concentrated Photovoltaics (CPV), Concentrated Solar Thermal power generation (CSP), and Thermophotovoltaics (TPV). Below we provide a brief description of each type of solar energy generation, further explain Hybrid Thermal/Electric Power generation, its prospects and challenges, and finally explain why FROCs are ideal spectrum filter for the HTEP.

Concentrated Photovoltaics (CPV):

CPV attempts to overcome the spectrum loss aspect of the Shockley-Queisser (SQ) limit. The SQ limit arise due to the broadband nature of the solar spectrum (0.2 mm-2 mm). Incident photons with energy <bandgap of the cell $E_g$ cannot be absorbed. Photons with energy higher than the bandgap create high energy electrons that thermalize to the edge of the band. Using multijunction cells allows overcomes the SQ limit. However, because multijunction cells are expensive, they are only competitive when used under high optical concentration, i.e., in a CPV configuration. CPV is a photovoltaic system that focuses solar light onto a small and highly efficient multi-junction solar cell (FIG. 15A-FIG. 15D). Amongst all solar energy generation technologies, CPV is the most efficient reaching up to 42% conversion efficiency. A major challenge for CPV is thermalization that degrades the PV cell lifetime and efficiency. Cooling of the PV cell is crucial for efficient performance.

Figure 16:
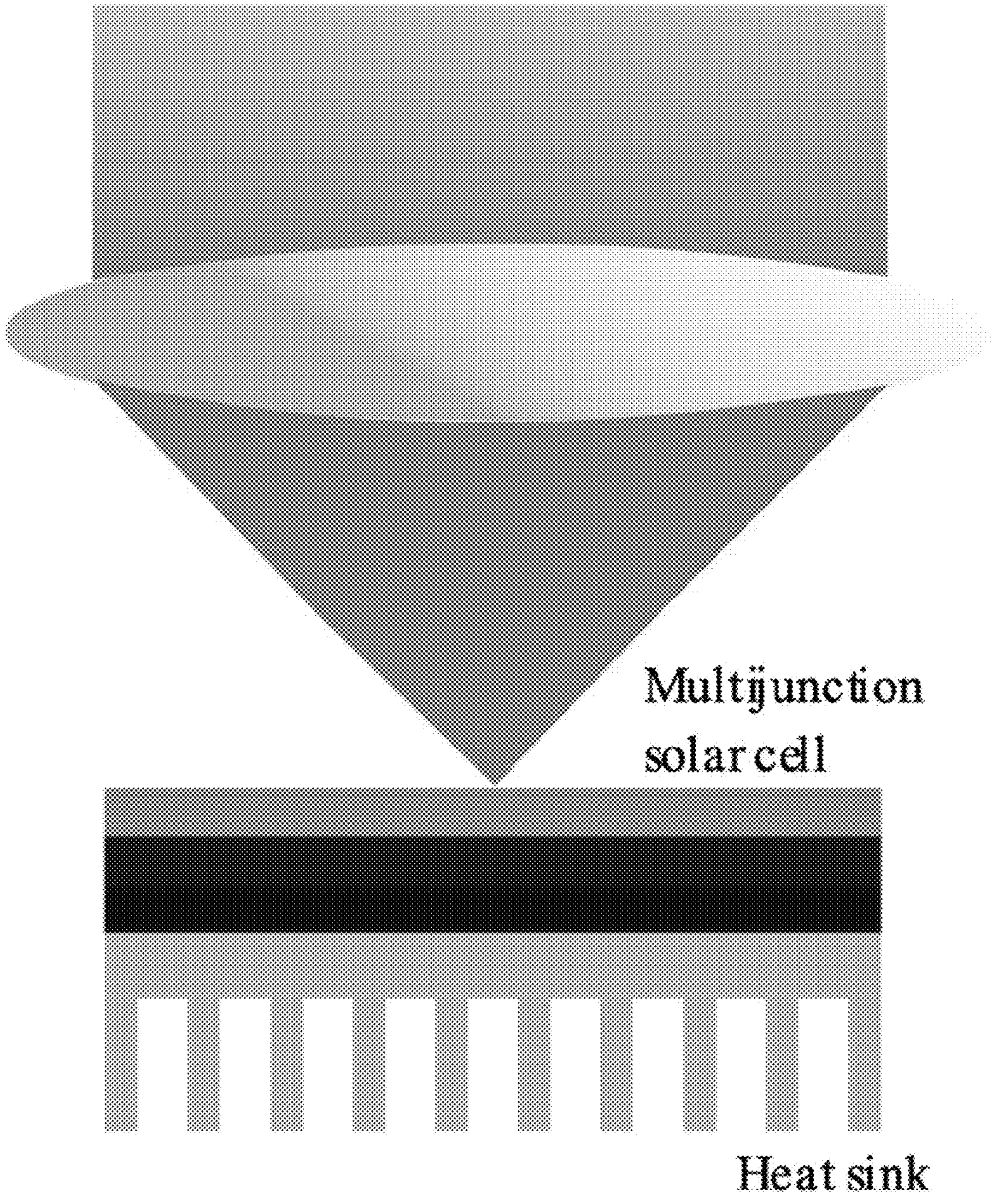
FIG. 16 is a drawing showing a schematic of a CPV system.

FIG. 16 is a drawing showing a schematic of a CPV system. Solar light is optically concentrated on a multijunction solar cell. A heat sink is added to mitigate thermalization of the PV cell.

Concentrated Solar Thermal Power (CSP):

CSP systems generate solar power by concentrating sun light on a solar receiver that efficiently converts solar energy to thermal energy. The thermal energy drives a heat engine connected to an electrical power generator or powers a thermochemical reaction. The efficiency of CSP systems is limited and is generally below 20% since heat energy has an exergy fraction equal to the thermodynamic Carnot efficiency limit of heat conversion to work [64]. On the other hand, because heat can be stored in the form of sensible or latent heat, e.g., using molten salts, CSP offers a solution to the dispatchability problem, i.e., by providing solar power during nighttime. A schematic of a conventional CSP system is shown in FIG. 16, where light is focused using a parabolic trough on a solar absorber that converts solar light to heat that gets carried out by a heat transfer fluid, e.g., water.

Figure 17:
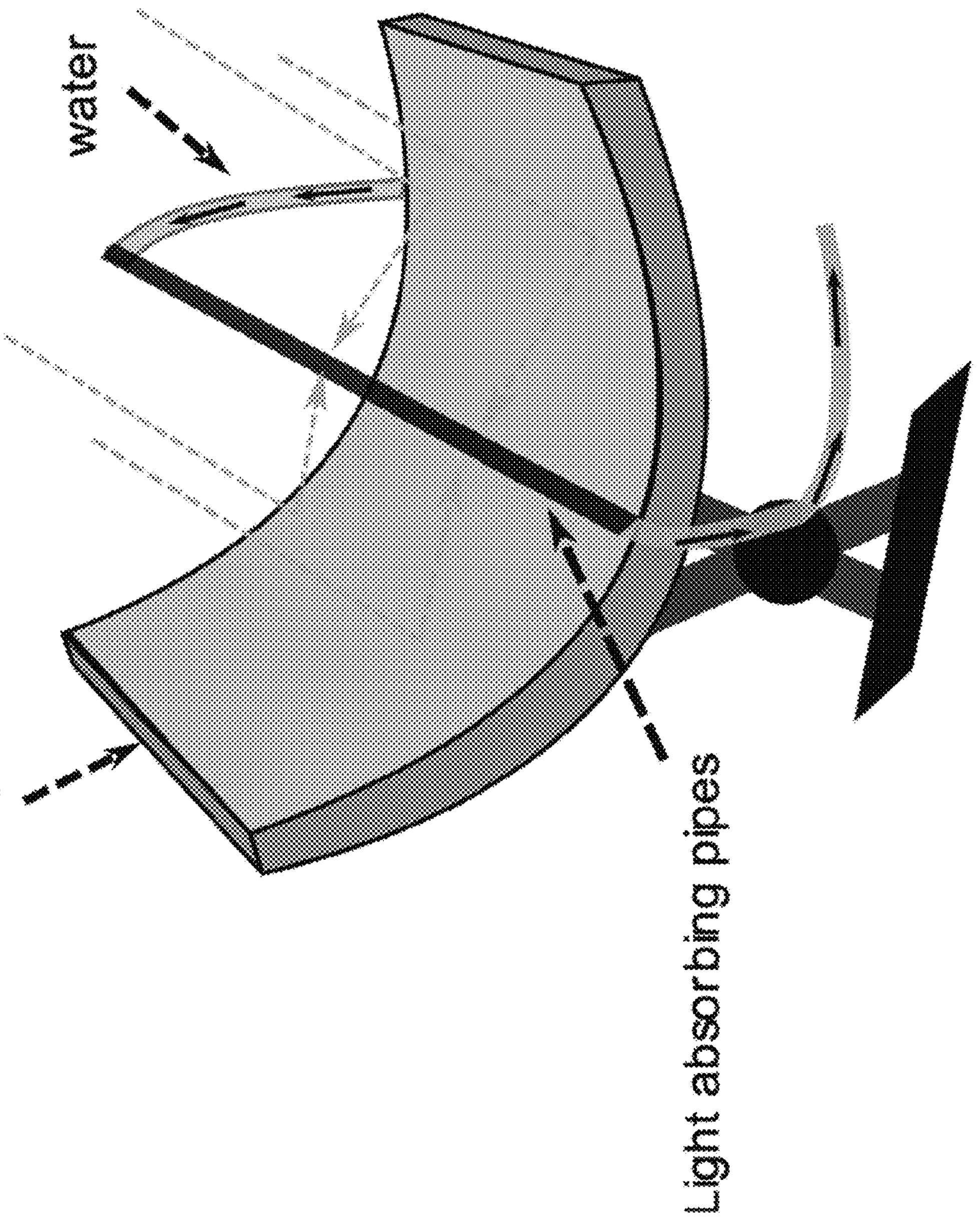
FIG. 17 is a drawing showing a schematic of a CSP system with a parabolic trough.

FIG. 17 is a drawing showing a schematic of a CSP system with a parabolic trough.

Solar Thermophotovoltaics (STPV):

STPV devices typically include a solar absorber, a thermal emitter and a low bandgap PV cell with a bandgap energy $E_g$~0.6 ev-1 ev (FIG. 17). The main goal of STPV is to overcome the SQ limit by controlling the emissivity of the selective thermal emitter. The emitter acts as an artificial "sun" which only radiates photons with energy ~$E_g$, i.e., the thermal emitter does not radiate photons with energy >>$E_g$ or <$E_g$ which minimize the efficiency of PVs [89].

The efficiency upper limit of an STPV system, set by the Carnot efficiency, is given by $$\eta = \left(1 - \frac{T_a^4}{T_s^4}\right) \cdot \left(1 - \frac{T_{PV}}{T_e}\right)$$

where $T_a$, $T_s$, $T_{PV}$, $T_e$, are the absorber, sun,

PV, and emitter temperature, respectively. Accordingly, it is crucial for the STPV absorber to operate at very high temperatures. Most STPV devices operate at ~1000° C. To obtain high conversion efficiency, the side facing the PV cell is designed to be a selective thermal emitter with high emissivity only ~$E_g$.

Due to the difficulty of realizing high emitter temperature, parasitic conductive and convective cooling of the emitter, and thermalization of the PV, however, STPVs are not efficient and are not considered as a promising solar energy generation method due to the strong radiative recombination of low bandgap semiconductors.

Figure 18:
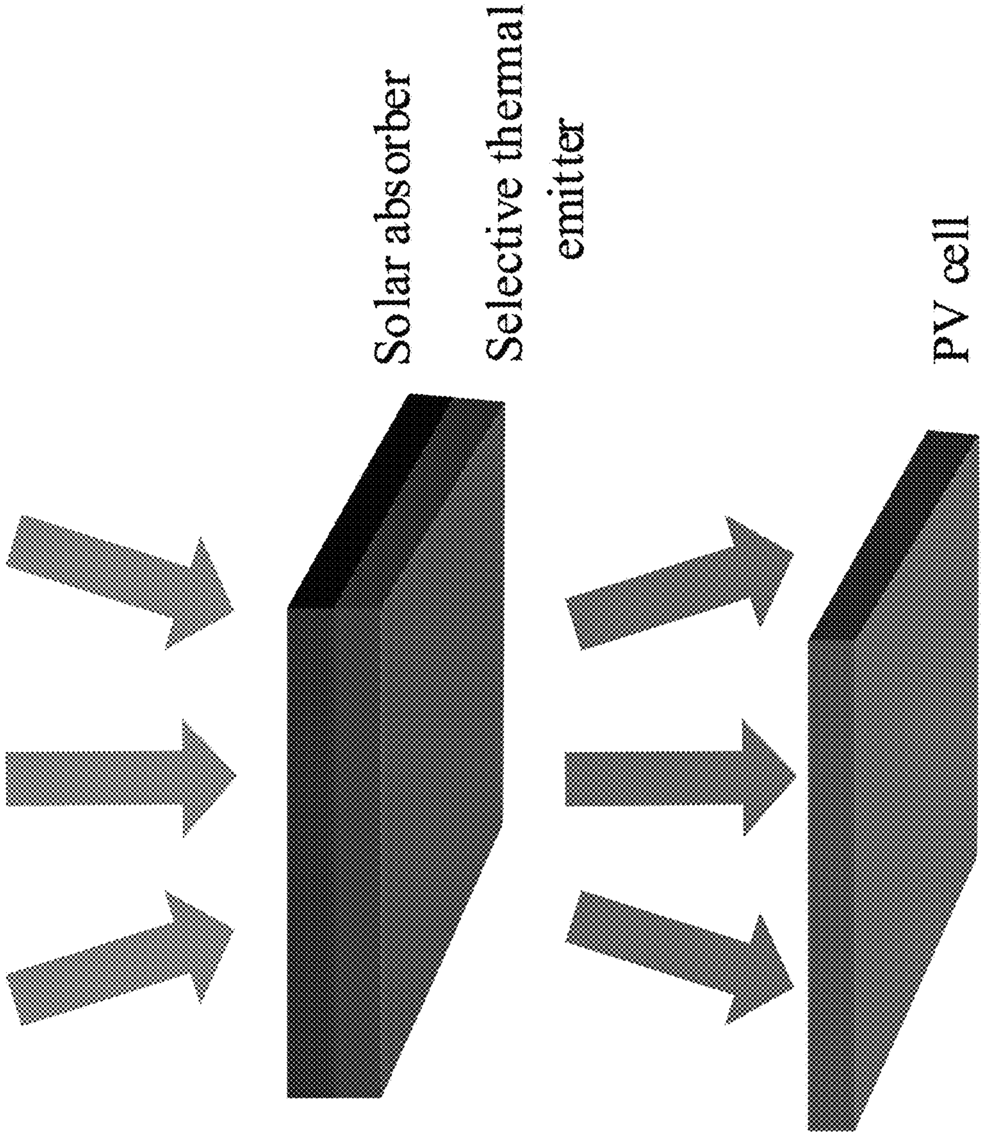
FIG. 18 is a drawing showing a schematic of a solar TPV system.

FIG. 18 is a drawing showing a schematic of a solar TPV system.

Hybrid Thermal/Electric Power (HTEP) Generation:

HTEP is a solar energy generation approach that has gained recent attention [64] as it takes advantage of the strengths of PV and CSP energy generation: PV is energy efficient but solar thermal energy can be stored at low cost. The main goal of HTEP is to direct photons with energy approximately equal to the bandgap energy $E_g$ to a PV cell while directing the rest to a solar absorber. The rationale behind HTEP is as follows:

Single junction semiconductors Suffer from the SQ limit. Moreover, photons with energies that lie in the violet and UV range are particularly difficult to convert as they are absorbed close to the front surface thus suffer from high recombination rates. Consequently, routing photons with energy <$E_g$ or >>$E_g$ away from the PV cell does not severely affect the PV cell performance In fact, routing photons that would thermalize a PV cell can increase its efficiency since thermalization degrades the power conversion efficiency and lifetime of solar cells (~0.5% per °C) [89].

A major problem pertaining to solar PV energy generation is no longer efficiency, rather dispatchability which leads to curtailment (the Duck-curve problem). Therefore, converting a portion of the solar spectrum to heat that can be later stored or used for another application, e.g., solar-driven water desalination, can mitigate the curtailment problem.

There are several approaches to achieve HTEP. We are interested in the spectrum filter approach being the most promising one. In this approach, an HTEP system typically includes three elements; a dielectric Bragg mirror, a solar receiver, and a PV cell [64, 90]. The dielectric mirror is used to reflect photons with energy >$E_g$ to a PV cell while transmitting sub-bandgap photons to a solar/thermal receiver (See FIG. 4B). However, this approach suffers from several challenges namely the high cost of depositing dielectric mirrors which is usually tens of microns thick [64]. Moreover, using optical concentration is required to economically justify using dielectric mirrors. Dielectric mirrors, however, do not operate efficiently under optical concentration due to their strong angular sensitivity [64]. As we show below in FIG. 20, FROC provides a near ideal spectrum splitting approach for HTEP.

Figure 19:
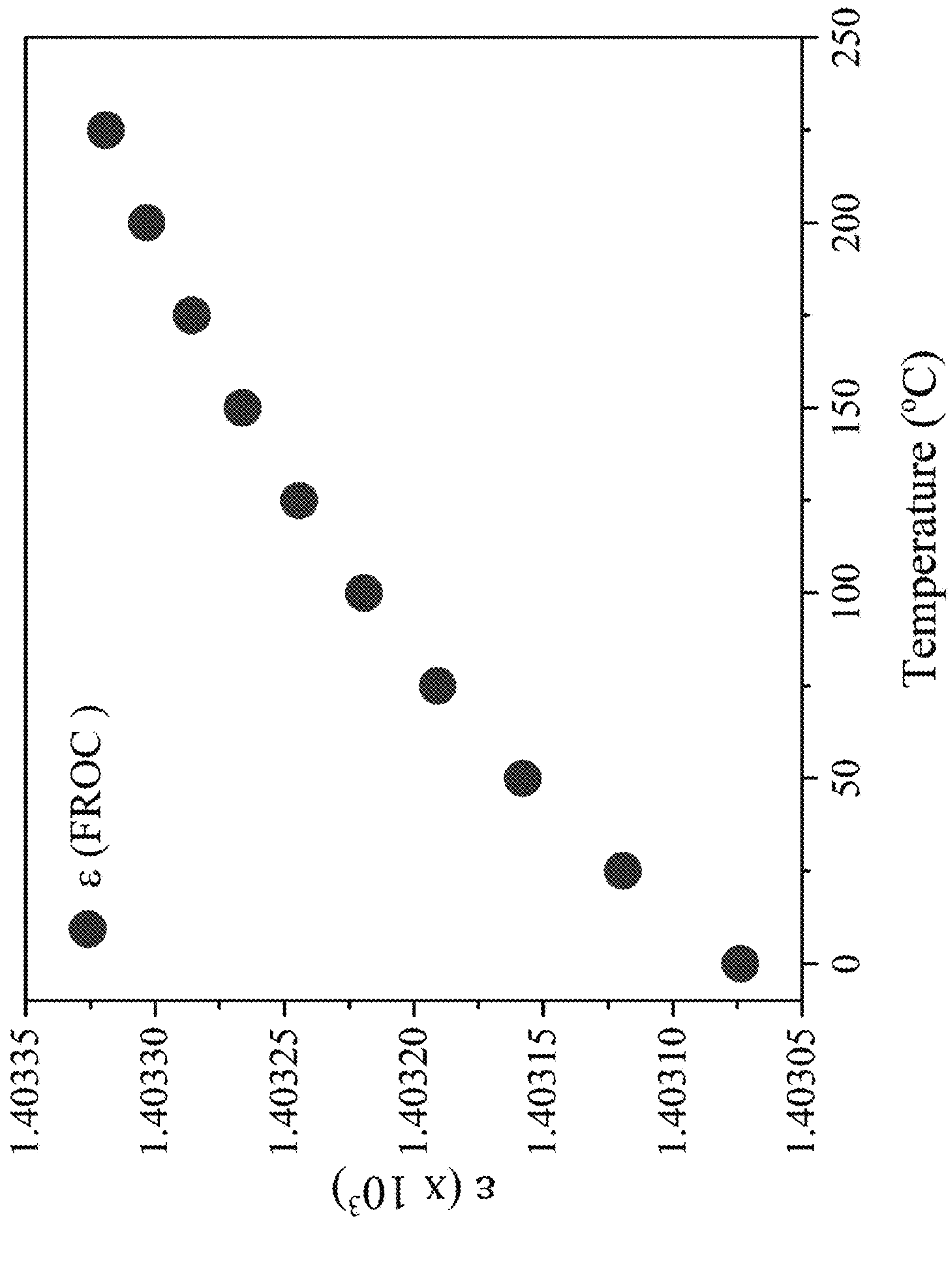
FIG. 19 is a graph showing FROC emissivity vs. Temperature.

FIG. 19 is a graph showing FROC emissivity vs. Temperature. The emissivity of FROC is negligible for a wide temperature range. The low emissivity is essential to minimize radiative parasitic losses for solar-thermal applications.

Figure 20:
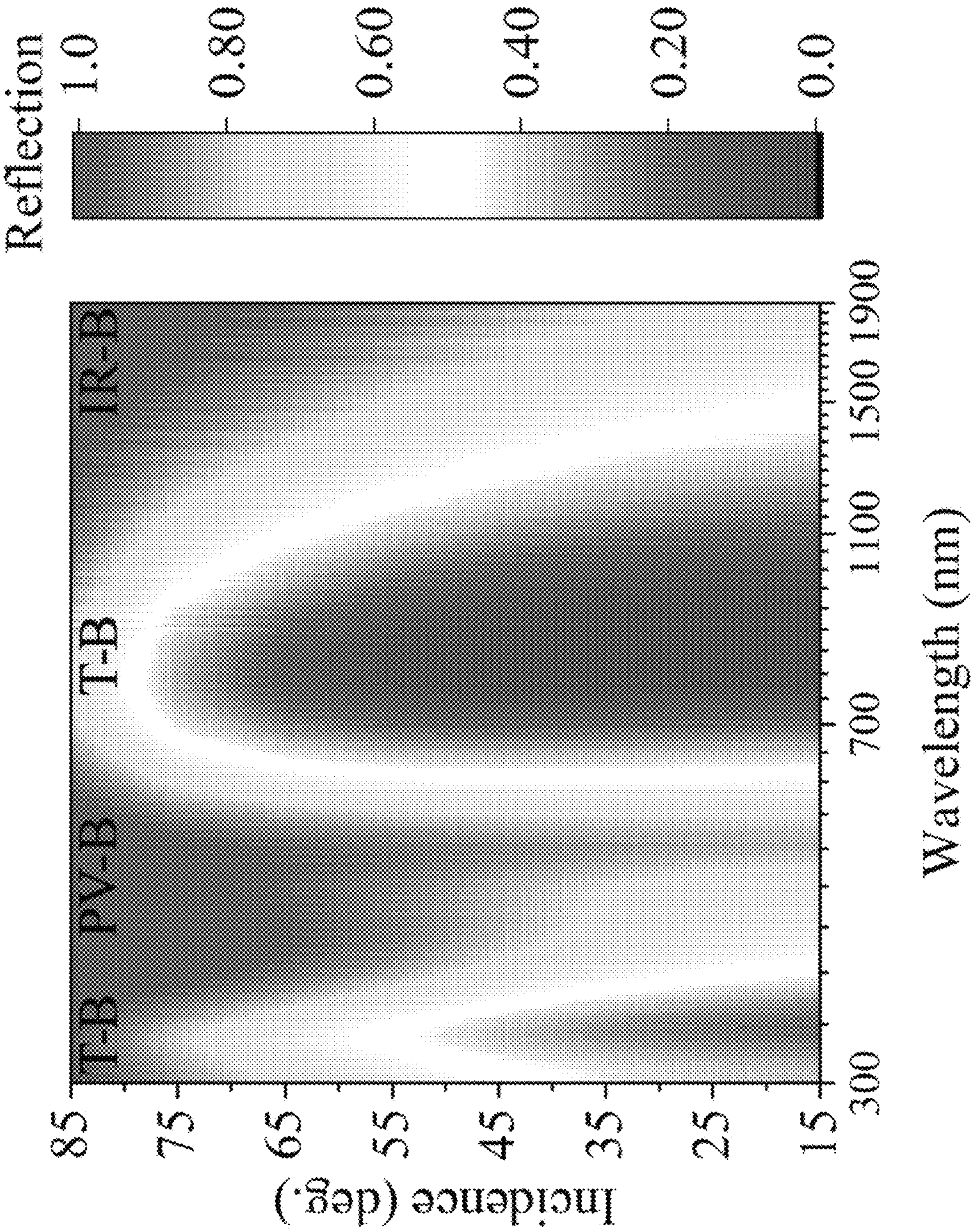
FIG. 20 is a contour graph showing the measured Angular reflection of the Ge(15 nm)-Ni(5 nm)-TiO2(85 nm)-Ag(120 nm) FROC used for HTEP generation.

Angle Independent Performance of FROC Used in HTEP:

FIG. 20 is a contour graph showing the measured Angular reflection of the Ge(15 nm)-Ni(5 nm)-TiO2(85 nm)-Ag(120 nm) FROC used for HTEP generation. Four bands are shown here, the UV and NIR thermal bands, the PV band, and the IR band. The quad-band performance is retained for angles ±75°. The FROC used in the experiments presented in HTEP application has a total thickness of 220 nm; at least an order of magnitude thinner than a dielectric mirror. This means it is significantly cheaper. Moreover, since we can control the iridescence of FROCs (FIG. 2G and FIG. 2H), we constructed a FROC with low angle dependence such that its operation was not affected by using optical concentration. FIG. 20 shows the angular reflection from the FROC used in our experiments. Clearly, the quad-band performance is retained for angles ±70°.

Figure 21:
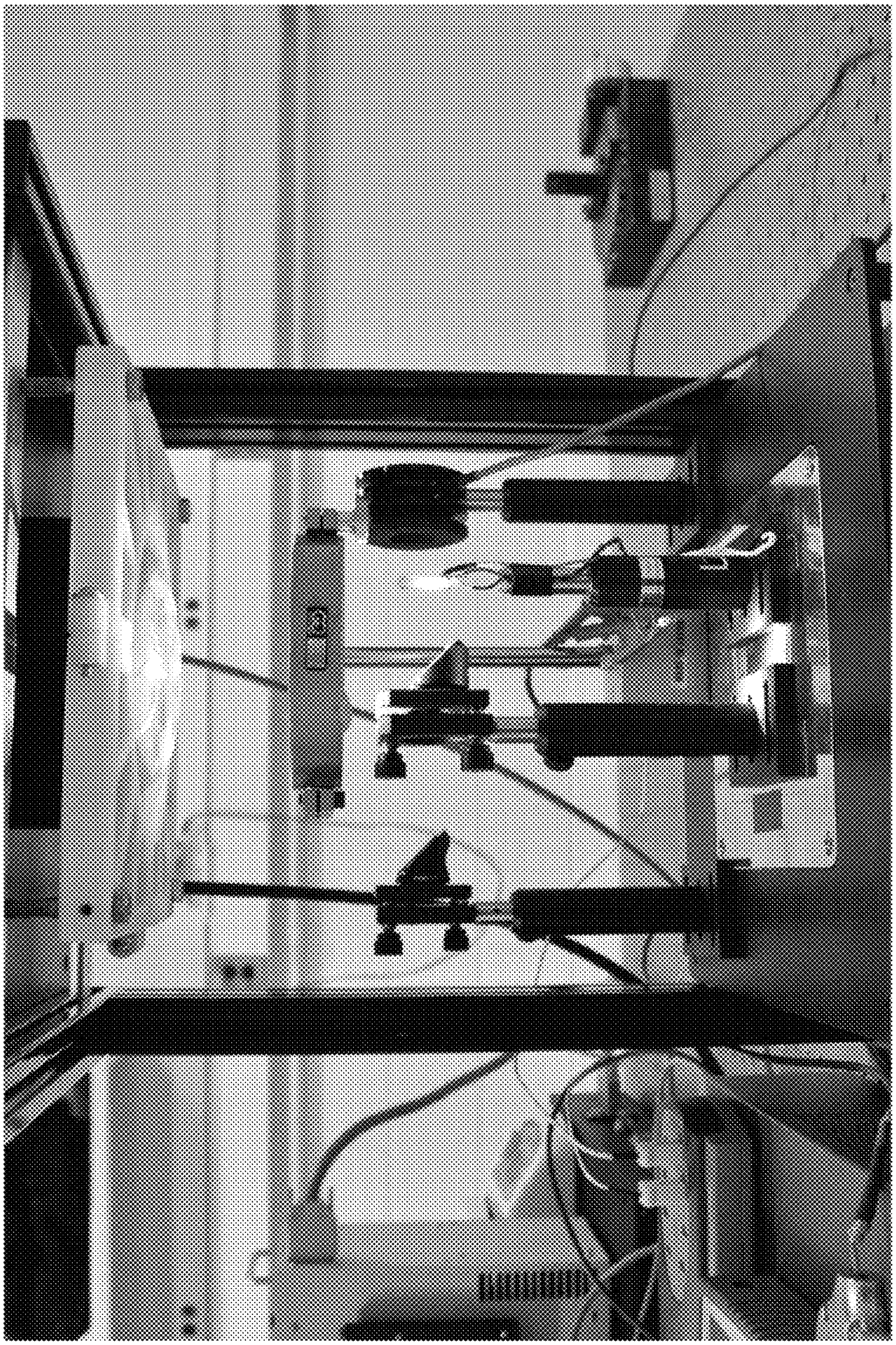
FIG. 21 is a drawing showing an exemplary hybrid Solar thermal-electric energy generation setup showing a solar simulator with two lenses that control the optical concentration.

FIG. 21 is a drawing showing an exemplary hybrid Solar thermal-electric energy generation setup showing a solar simulator with two lenses that control the optical concentration. The incident illumination is directed by a mirror or a FROC to a PV cell.

Figure 22:
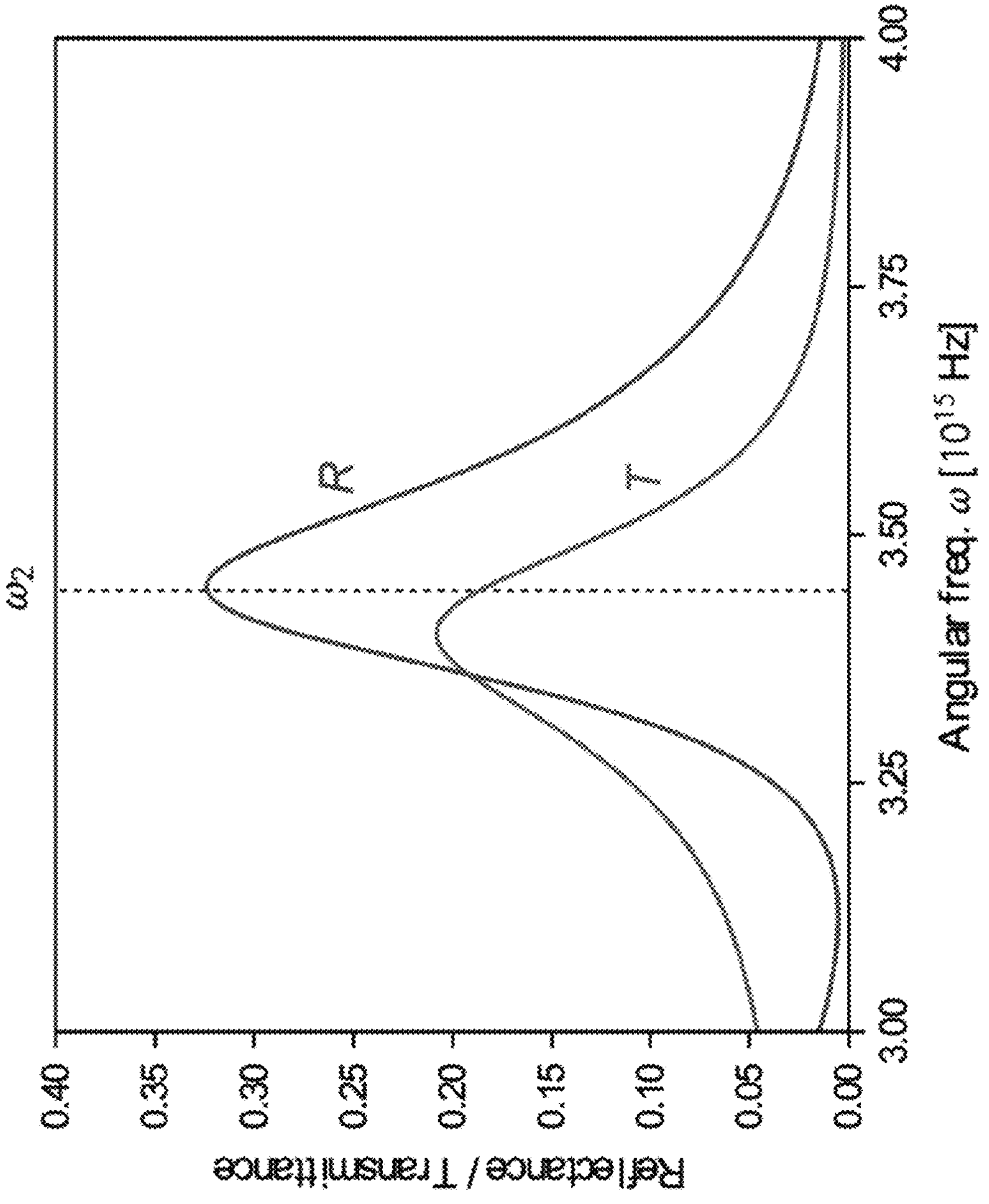
FIG. 22 is a graph showing a theoretical reflectance R and transmittance T curves for the FROC in the beam splitter configuration for material parameters.

Beam Splitter Coupled Oscillator Theory Model:

FIG. 22 is a graph showing a theoretical reflectance R and transmittance T curves for the FROC in the beam splitter configuration for material parameters are given in the Theory section which follows.

Part 9 FROC Generalized

Figure 23:
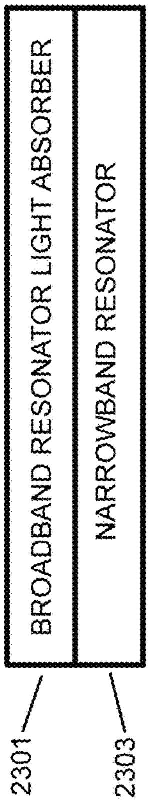
FIG. 23 is a drawing showing an optical coating according to the Application, as a broadband light absorber (e.g. resonator 1, FIG. 1B) disposed adjacent to a narrow band absorber (e.g. resonator 2, FIG. 1B)

FIG. 23 is a drawing showing an optical coating generally according to the Application. A broadband light absorber 2301 (e.g. resonator 1, FIG. 1B) which does not experience a rapid phase change in the reflection or transmission spectrum, is disposed adjacent to a narrow band absorber 2303 (e.g. resonator 2, FIG. 1B) which does experience a rapid phase change within the bandwidth of the broadband light absorber. A rapid phase change is defined as about a 180 degree phase change within the bandwidth of the broadband light absorber. In other words, resonator 1 (the broadband light absorber 2301) exhibits a phase transition within the bandwidth of the broadband light absorber which is slower relative to the rapid phase change of resonator 2 (the narrow band absorber 2303) within the bandwidth of the broadband light absorber. A phase of light reflected from the first resonator varies as a function of wavelength compared to a rapid phase change of the second resonator which exhibits a phase jump within a bandwidth of the broadband light absorber.

Figure 24A:
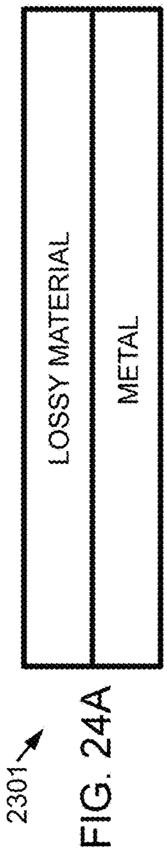
FIG. 24A is a drawing showing a first resonator including a lossy material on a metal.
Figure 24B:
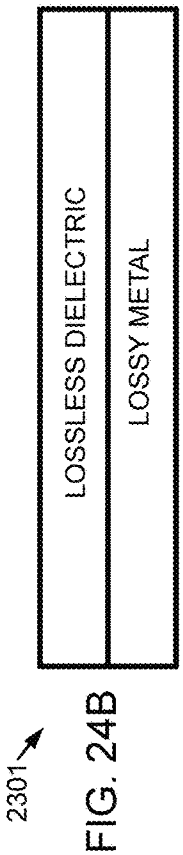
FIG. 24B is a drawing showing a first resonator including a lossless dielectric on a lossy metal.
Figure 24C:
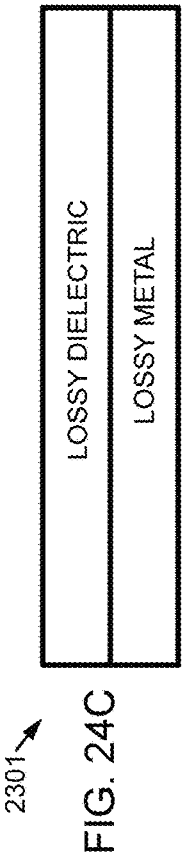
FIG. 24C is a drawing showing a first resonator including a lossy dielectric on a lossy metal.
Figure 24D:
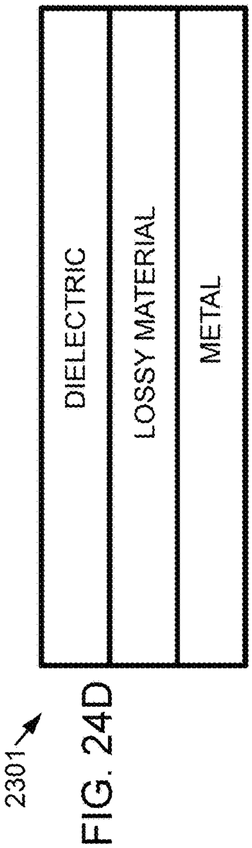
FIG. 24D is a drawing showing a first resonator including a dielectric on a lossy material on a metal.
Figure 24E:
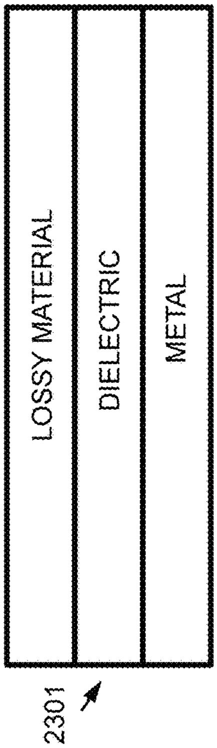
FIG. 24E is a drawing showing a first resonator including a lossy material on a dielectric on a metal.
Figure 25A:
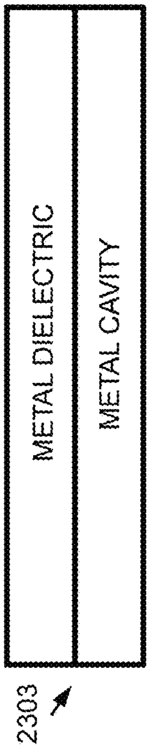
FIG. 25A is a drawing showing a second resonator including a metal dielectric metal cavity.
Figure 25B:
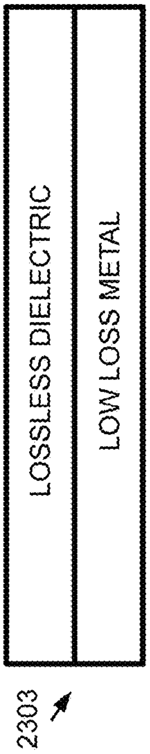
FIG. 25B is a drawing showing a second resonator including a lossless dielectric on a low loss metal.
Figure 25C:
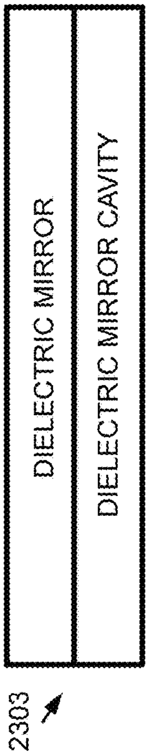
FIG. 25C is a drawing showing a second resonator including a dielectric mirror-dielectric-dielectric mirror cavity.

FIG. 1B shows but one example of a structure of an optical coating according to the Application. There are many other variations of FIG. 23 which can provide an optical coating according to the Application. For example, the broadband absorber can be a lossy material on a metal (FIG. 24A), lossless dielectric on a lossy metal (FIG. 24B), a lossy dielectric on a lossy metal (FIG. 24C), a dielectric on a lossy material on a metal (FIG. 24D), or a lossy material on a dielectric on a metal (FIG. 24E). The narrowband absorber can also have different variations, such as, for example, a metal dielectric metal cavity (FIG. 25A), a lossless dielectric on a low loss metal (FIG. 25B), and a dielectric mirror-dielectric-dielectric mirror cavity (FIG. 25C).

Part 10 Theory:

Coupled oscillator theory of FROCs: Here, we detail the coupled oscillator model presented in the Application. We consider the two resonators defined earlier; an externally driven oscillator with large damping (resonator 1), and a weakly coupled to an oscillator with small damping (resonator 2).

To allow for the analytical results presented in equations 1-3, we will make several simplifications: 1) all fields in are assumed to be propagating along the normal incidence direction (parallel or antiparallel). 2) Though the refractive indices in principle depend on the angular frequency of light, ω, our focus is on a narrow range of frequencies around resonance, and we will ignore the dispersion of the indices within this range. Incorporating the dispersion into the theory would change the quantitative details, but not the qualitative results. 3) The coupling between the resonators occurs through the component of the field that leaks from the resonator 1 through the metal into resonator 2. We will work in the weak coupling regime, where the metal layer is assumed thick enough that most of the field is attenuated in passing through the metal. Specifically, we assume that $$L_m \gg c/(\omega n_m^I).$$

To formulate the theory, it will be useful to refer to the complex Fresnel reflection and transmission coefficients at various interfaces. These are indicated by $r_{ij}$ and $t_{ij}$ respectively in FIG. 1G, where i is the material where the field originates, and j is the material where the field is transmitted. The coefficients can be expressed in terms of the refractive indices of the respective materials:

$$r_{ij} = \frac{n_i - n_j}{n_i + n_j},\ t_{ij} = \frac{2\ n_i}{n_i + n_j}, \tag{4}$$

For convenience we decided to treat the metal spacer layer as an effective interface between the lossy material and the dielectric. The associated reflectance and transmission coefficients are indicated with tildes and have a more complicated form than a simple interface between two materials. For fields within the lossy material propagating into the dielectric through the metal, the coefficients are:

$$\tilde{r}_{ad} = \frac{(n_a + n_m)(n_m - n_d) + e^{-2i\phi_m(\omega)}(n_a - n_m)(n_m + n_d)}{(n_a - n_m)(n_m - n_d) + e^{-2i\phi_m(\omega)}(n_a + n_m)(n_m + n_d)} \approx \frac{n_a - n_m}{n_a + n_m} = r_{am}; \tag{5}$$

$$\tilde{t}_{ad} = \frac{4n_d n_m e^{-i\phi_m(\omega)}}{(n_d - n_m)(n_m - n_a) + e^{-i2\phi_m(\omega)}(n_a + n_m)(n_m + n_d)} \approx \frac{4n_d n_m e^{-i\phi_m(\omega)}}{(n_a + n_m)(n_m + n_d)}. \tag{6}$$

Here $\varphi^i(\omega) \equiv n_i L_i \omega/c$ is the (possibly complex) phase gained by passing through a material of index $n_i$ and thickness $L_i$. We have used the weak coupling assumption (#3 above) to give simpler approximate forms on the right, keeping the leading order contributions. Note that the reflection coefficient is approximately the same as from a simple metal interface, $r_{am}$. For the transmission coefficient, as $L_m$ gets larger, $$e^{i\phi_m(\omega)} \propto e^{-n_m^I L_m \omega/c} \to 0$$

and hence the coefficient gets progressively attenuated, consistent with the weak coupling assumption. Analogously, for fields within the dielectric propagating upwards into the lossy material through the metal, $$\tilde{r}_{da} \approx \frac{n_d - n_m}{n_d + n_m} = r_{dm},\ \tilde{t}_{da} \approx \frac{4\ n_a\ n_m e^{i\phi_m(\omega)}}{(n_d + n_m)\ (n_a + n_m)} \tag{7}$$

To set up our theoretical description, let us first consider each resonator separately, un-coupled from the other. It is easier to start with resonator 2, the MDM Fabry-Perot cavity. Imagine a field $E_{2i}$ that was injected at the top of the lossless dielectric, propagating downwards. The total field $E_2$ that establishes itself in the cavity is a sum of this original field and an infinite series of reflections from the bottom and top metallic interfaces:

$$E_2 = E_{2i} + E_{2i} r_{dm} \tilde{r}_{da} e^{2i\phi_d(\omega)} + E_{2i} r_{dm}^2 \tilde{r}_{da}^2 e^{4i\phi_d(\omega)} + \ldots \tag{8}$$

Summing these reflections, we can express the ratio of the total to the injected field as:

$$\frac{E_2}{E_{2i}} = \frac{1}{1 - r_{dm}\tilde{r}_{da} e^{2i\phi_d(\omega)}} \equiv A_2(\omega) \tag{9}$$

Using the fact that $\tilde{r}_{da} \sim r_{dm}$, as discussed above, and writing the complex coefficient $r_{dm} = |r_{dm}| e^{i\phi_{dm}(\omega)}$ in terms of amplitude and phase, we can rewrite the ratio $A_2(\omega)$ in the form:

$$A(\omega) \approx \frac{1}{1 - |r_{dm}|^2 e^{2i(\phi_d(\omega) + \phi_{dm})}}$$

This exhibits resonance at frequencies $\omega_2$ defined through the condition $\phi_d(\omega_2) = -\phi_{dm} + k\pi$, where k is some integer. Using the definition of $r_{dm}$ from Eq. (1), we can also express this condition as:

$$\tan\ \phi_d(\omega_2) = \tan\ \phi_{dm} = \frac{2n_d n_m^{Im}}{n_d^2 - (n_m^{Im})^2 - (n_m^{Re})^2} \tag{10}$$

For frequencies ω in the vicinity of the resonant value $\omega_2$, we can Taylor expand the denominator of Eq. (6) and write the ratio of field intensities $|A_2(\omega)|^2$ in an approximate damped resonant oscillator form:

$$|A_2(\omega)|^2 \approx \frac{c^2}{4n_d^2 L_d^2 |r_{dm}|^2}\left(\frac{1}{\Gamma_2^2 + (\omega - \omega_2)^2}\right), \tag{11}$$

where the damping factor $\Gamma_2$ is given by $$\Gamma_2 = \frac{c(1-|r_{dm}|^2)}{2n_d L_d |r_{dm}|} \approx \frac{2cn_m^{Re}}{L_d\left(n_d^2 + \left(n_m^{Im}\right)^2\right)} \tag{12}$$

Here we have approximated the expression using the assumption $$n_m^{Re} \ll n_m^{Im}$$

for the metal, keeping the leading order contribution to $\Gamma_2$. As we approach the ideal metal limit, $$n_m^{Re} \to 0,$$

the damping factor $\Gamma_2$ vanishes. But for any real metal there will be some finite damping in the MDM cavity. FIG. 1H shows an example of $|A_2(\omega)|^2$ versus $\omega$ for the material parameters specified in the main text. In addition to the intensity, one can characterize the phase $\Phi_2(\omega)$ of the resonator, defined through $A_2(\omega)=|A_2(\omega)|e^{i\Phi(\omega)}$. FIG. 1I shows $\Phi_2(\omega)$ making a sharp switch from positive to negative as co passes through resonance. In the undamped limit this phase difference would have magnitude $\pi$, but with finite damping it is always less than $\pi$.

Now let us consider resonator 1 alone. We can proceed analogously, calculating the total field $E_1$ that is established in the lossy material when a field $E_{1i}$ is injected. For the uncoupled resonator we will assume the reflection coefficient from the bottom is just $r_{am}$, a simple interface between the lossy material and metal. The ratio of the total to the injected field is then:

$$\frac{E_1}{E_{1i}} = \frac{1}{1 - r_{a0} r_{am} e^{2i\phi_a(\omega)}} \equiv A_1(\omega). \tag{13}$$

Writing $r_{a0}=|r_{a0}|e^{(i\phi_{a0})}$, $r_{am}=|r_{am}|e^{(i\phi_{am})}$, we can rewrite the above equation in the form given by equation 1 in the Application.

$$A_1(\omega) = \frac{1}{1 - |r_{a0} r_{am}| e^{i(2\phi_a(\omega) + \phi_{a0} + \phi_{am})}} \tag{14}$$

which can be rewritten as $$A_1(\omega) = \frac{1}{1 - |r_{a0} r_{am}| e^{-2Im\phi_a(\omega)} e^{i(2Re\phi_a(\omega) + \phi_{a0} + \phi_{am})}}, \tag{15}$$

Where $$Re\phi_a(\omega) = n_a^R L_a \omega / c,\ \mathrm{Im}\phi_a(\omega) = n_a^I L_a \omega / c,$$

$\mathrm{Im}\phi_a(\omega)=n_a^I L_a\omega/c$, there is no exact analytical expression for the frequency $\omega_1$ at which $A_1(\omega)$ exhibits resonance. However, under the assumption that $$n_a^I$$

is typically smaller than $$n_a^R,$$

the resonant frequency is given by the following approximate condition: $2\mathrm{Re}\phi_a(\omega_1) \approx -\phi_{a0} - \phi_{am} + 2k\pi$, where k is an integer.

As with the earlier case, we can express the ratio of intensities in the form of a damped, resonant oscillator. Using the above approximation, we have $$|A_1(\omega)|^2 = \frac{c^2 e^{2n_a^{Im} L_a \omega_1 / c}}{4\left(n_a^R\right)^2 L_a^2 |r_{am} r_{a0}|}\left(\frac{1}{\Gamma_1^2 + (\omega - \omega_1)^2}\right) \tag{16}$$

where the damping factor $\Gamma_1$ is given by $$\Gamma_1 = \frac{c e^{n_a^{Im} L_a \omega_1 / c}\left(1 - e^{-2n_a^{Im} L_a \omega_1 / c} |r_{am} r_{a0}|\right)}{2n_a^{Re} L_a |r_{a0}\ r_{am}|^{1/2}} \tag{17}$$

Unlike resonator 2, where one could approach the undamped limit as the metal becomes ideal $$\left(\Gamma_2 \to 0 \text{ as } n_m^{Re} \to 0\right)$$

here it is not generally possible to eliminate the damping. This is unsurprising, since unlike the Fabry-Perot cavity, we only have a metallic mirror at one surface, and a lossy medium. For $\Gamma_1$ to vanish, the product of $$e^{-2n_a^{Im} L_a \omega_1 / c},$$

$|r_{am}|$ and $|r_{a0}|$ in the numerator would have to equal 1. Since each of these terms is $\leq 1$, that would mean each term individually would have to approach 1 for $\Gamma_1$ to become zero. Eliminating losses in the medium, $$n_a^{Im} \to 0,$$

and making the metal at the bottom ideal, $$n_m^{Re} \to 0,$$

would make the first and third terms equal to 1, respectively. However, in this limiting case, $$|r_{a0}| \to \left|n_0 - n_a^{Re}\right| / \left|n_0 + n_a^{Re}\right|,$$

which is always less than 1 for real materials. So $\Gamma_1$ would still be nonzero. This highlights the fact that resonator 1 will in general be more strongly damped than resonator 2, $\Gamma_1>\Gamma_2$, and one can readily arrange parameters such that $\Gamma_1>>\Gamma_2$. An example of this is shown in FIG. 1G, where the resonance of $|A_1(\omega)|^2$ is highly damped relative to that of $|A_2(\omega)|^2$. The corresponding phase $\Phi_1(\omega)$, shown in FIG. 1C, shows a gradual crossover from positive to negative near $\omega_1$, in contrast to the sharp change in $\Phi_2(\omega)$ for the less damped resonator.

Now let us finally consider what happens when we couple the two resonators together and drive the strongly damped resonator 1. This driving comes from the incident field $E_i$ in the superstrate, which contributes $t_{0a}E_i$ to the field injected into resonator 1. However, there is another contribution from the field in resonator 2 that is reflected upwards from the metal substrate through the metal spacer layer into resonator 1. We can then express the total field injected into resonator 1 as $E_{1i}=t_{0a}E_i+E_2 r_{dm} r_{a0} \tilde{t}_{da} e^{i(2\phi_d(\omega)+\phi_a(\omega))}$. In turn, the fact that there exists a field in resonator 2 is due to the field from resonator 1 propagating downwards through the metal spacer, $E_{2i}=E_1\tilde{t}_{ad}e^{i\phi_a(\omega)}$. All these relationships can be succinctly expressed through equation 3 in the Application.

$$\begin{pmatrix} \frac{1}{A_1(\omega)} & r_{dm}\tilde{t}_{da}\, r_{a0}\, e^{i(2\phi_d(\omega)+\phi_a(\omega))} \\ -\tilde{t}_{da} e^{i\phi_a(\omega)} & \frac{1}{A_2(\omega)} \end{pmatrix} \begin{pmatrix} E_1 \\ E_2 \end{pmatrix} = \begin{pmatrix} t_{0a}E_i \\ 0 \end{pmatrix} \tag{18}$$

The coupling between $E_1$ and $E_2$ occurs through the two off-diagonal terms in the matrix of equation 3, which are assumed small under our weak coupling assumption. In fact, as the spacer metal layer thickness becomes large, $L_m\rightarrow\infty$, the transmission coefficients across the spacer, $\tilde{t}_{da}$ and $\tilde{t}_{ad}$, vanish, making the coupling terms zero. In this limit we recover the two uncoupled oscillators discussed above. For finite $L_m$ we have all the ingredients necessary for Fano resonance: a strongly damped, driven oscillator (resonator 1) weakly coupled to a less damped oscillator (resonator 2). Indeed, the form of Eq. 3 is similar in structure to the simple two-oscillator description of Fano resonance in Ref 26. [1]. Following the approach in that reference, the Fano parameter q can be approximately related to the degree of detuning $\delta$ between the two oscillators at the resonant frequency of the less damped one: $q\approx\cot\delta$, where $\delta=\Phi_1(\omega_2)$ (see FIG. 1*i*). To observe the Fano resonance in $E_1$ near $\omega_2$, one can look at the reflected field $E_r$ in the superstrate, which has a contribution from $E_1$:

$$E_r=r_{0a}E_i+r_{am}t_{a0}e^{2i\phi_a(\omega)}E_1 \tag{19}$$

An example of the reflectance $R=|E_r/E_i|^2$ is shown as a green curve in FIG. 1D, exhibiting the characteristic Fano shape. This is in contrast to the reflectance from resonator 1 alone (a lossy material on a metal substrate), drawn as a blue curve.

Sample fabrication: Films were deposited on a glass substrate (Micro slides, Corning) using electron-beam evaporation for Ni (5 Å/s), Ge (3 Å/s), $TiO_2$ (1 Å/s), and $MgF_2$ (5 Å/s) pellets and thermal deposition for Au (10 Å/s), and Ag (20 Å/s), the deposition rates are specified for each material. All materials were purchased from Kurt J. Lesker.

Numerical calculation of reflection and absorption spectrum: Numerical reflection and absorption spectra were generated using a transfer matrix method-based simulation model written in Mathematica. The calculated power dissipation distribution in the thin-film stack was performed using the commercially available finite-difference time-domain software from Lumerical®. The simulation was performed using a 2D model with incident plane wave at zero incidence angle. Periodic boundary conditions were used in the x-direction and perfectly matched layers where used in the y-direction (normal to the sample). The mesh was tailored to each layer with a mesh step of 0.001 μm. Absorption is complimentary to calculated reflection and transmission, i.e., A=1−R−T, and is complimentary to reflectance for opaque substrates.

Angular reflection measurements: Angular reflection was measured using Variable-angle high-resolution spectroscopic ellipsometer (J. A. Woollam Co., Inc, V-VASE). The transmittance is zero for all wavelengths and angles.

Group Velocity of Light in FROC:

Along the lines of Yu et al. [83] and Bendickson et al. [84] we will define an effective group velocity of light passing through a stack of layers. Let T (ω) be the complex transmission coefficient of the stack for light at normal incidence of angular frequency ω, which can be calculated using the transfer matrix approach [85]. We assume a superstrate and substrate medium with the same index $n_0$ on either side of the stack if the stack has a total thickness t, then we can determine the effective index of refraction $n_{eff}(\omega)$ and extinction coefficient $k_{eff}(\omega)$ of a homogeneous material of thickness r that would yield the same T (ω). This corresponds to the finding the numerical solution of $$T(\omega) = \frac{2\, i\, n_0\, \overline{n}_{eff}(\omega)}{2\, i\, n_0\, \overline{n}_{eff}(\omega)\cos\left(\frac{\omega\, \overline{n}_{eff}(\omega)t}{c}\right) + \left(n_0^2+\tilde{n}_{eff}^2(\omega)\right)\sin\left(\frac{\omega\, \overline{n}_{eff}(\omega)t}{c}\right)} \tag{20}$$

where the effective complex refractive index $\overline{n}_{eff}=n_{eff}(\omega)+ik_{eff}(\omega)$. The group velocity $v_g(\omega)$ and group index can be determined through:

$$\frac{v_g(\omega)}{c} = n_g^{-1}(\omega) = \left[n_{eff}(\omega) + \omega\frac{dn_{eff}(\omega)}{d\omega}\right]^{-1} \tag{21}$$

The group velocity was calculated for Ge(15 nm)-Ag(30 nm)-$TiO_2$(50 nm)-Ag(100 nm).

Bandwidth and Resonance Wavelength of FROCs' Reflection Line:

The bandwidth of FROCs' reflection line depends on the bandwidth of the MDM Fabry-Perot cavity which is given by $$\delta\lambda = \lambda_0^2(1-R)/2\,n\,t\,\cos\theta\,\pi\sqrt{R},$$

where $\lambda_0$ is the peak wavelength, R is reflectance, n and t are the dielectric index and thickness and θ is the incidence angle. Accordingly, to optimize the bandwidth, the mirror reflectance and the dielectric optical thickness should be maximized. Interestingly, increasing the top metal reflectance, by increasing its thickness, decreases the FROC's reflection bandwidth but can decrease the reflection maximum.

Furthermore, using transfer matrix method, we can determine the dielectric thickness necessary to realize resonant reflection-line at a given wavelength (λ). Consider a FROC containing a lossless dielectric with refractive index $n_d(\lambda)$ and thickness $t_d$. The surrounding metal layers have index $n_m(\lambda)+ik_m(\lambda)$, and we will assume $n_m \ll k_m$ (which is true for Ag in the wavelength range of interest). The condition for resonance in the FROC is:

$$\tan\left(\frac{2\pi\ n_d(\lambda)\ t_d}{\lambda}\right) = \frac{2\ k_m(\lambda)n_d(\lambda)}{n_d^2(\lambda) - k_m^2(\lambda)} \tag{22}$$

Given $t_d$, one can numerically try to solve this condition to find λ. Alternatively, if you specified λ, you can solve the above equation for $t_d$:

$$t_d = \frac{\lambda}{2\pi n_d(\lambda)}\left(m\pi - \tan^{-1}\left(\frac{2n_d(\lambda)k_m(\lambda)}{k_m^2(\lambda) - n_d^2(\lambda)}\right)\right) \tag{23}$$

Here m is an integer. Note that the condition for $t_d$ is independent of the details of the Ge layer on top, or the thickness of the metal as long as the assumptions of Fano resonance are satisfied, i.e., the MDM FWHM <<the broadband absorption continuum.

Iridescence Properties of FROCs:

The iridescence of FROC's resonant reflection mode depends entirely on the properties of the MDM cavity. The reflection peak wavelength $\lambda_{max}$, dependence on the incident angle is thus given by [33]

$$\frac{1}{\lambda_{max}(\theta)}\frac{d\lambda_{max}(\theta)}{d\theta} \sim H(\lambda_{max}(\theta), \theta, n_d)\frac{\cos\theta\sin\theta}{n_d^2 - \sin^2\theta}, \tag{24}$$

where H ($\lambda_{max}(\theta)$, θ, $n_d$) is a dimensionless function that depends on solely on θ through $\lambda_{max}$. As $n_d$ increases to values >>1, the above expression decreases as $$n_d^{-2}.$$

Accordingly, the iridescence of FROCs can be mitigated significantly by using a high index dielectric.

Color Analysis Using CIE 1931 Color Space:

The CIE 1931 color space is used to link distributions of electromagnetic wavelengths to visually perceived colors. To accomplish this, three color matching functions are used as a weighted average over a spectrum multiplied by the spectrum of the light illuminating the sample, and the resulting tristimulus values can be used to describe the color in other spaces, e.g., red-green-blue. We then convert these three values to the CIE XYZ color space to measure color purity. Purity of a color is determined as a ratio of the distance in CIE XYZ space between the color and the white point to the distance between the dominant wavelength and the white point. The white point is the least pure color in CIE XYZ space, and its coordinates can be found by finding the tristimulus values of a constant spectrum. The edge of the CIE 1931 chromaticity diagram can be found using a spectrum which is 1 at a specific wavelength and 0 everywhere else. These colors are the purest colors in the space. The dominant wavelength is the point located at the intersection of the ray passing through the sample spectrum whose origin is the white point and the edge of the chromaticity diagram [86]. We constructed a Python program to perform this analysis for all of our samples, and the results can be seen in FIGS. 3*c* and 3*d* [86].

We note here that Color purity is normalized but will yield different results when calculated in different color spaces. Chroma is unnormalized and unlike purity measurements in CIE XYZ, it is perceptually uniform with respect to color differences. Chroma is calculated through a conversion to the CIELUV followed by a cylindrical representation of the color space, known as CIE LCh(uv). The corresponding saturation is calculated as the chroma weighted by the lightness.

Obtaining Red Colors Using FROCs:

Pure red colors using FROCs uses the existence of a single cavity mode in the MDM cavity that reflects the red portion of the visible spectrum. However, thicker cavities support multiple modes which can lead to color mixing between red and blue. The wavelength separation between adjacent transmission peaks in a Fabry-Perot MDM cavity Δλ is given by $$\Delta\lambda = \frac{\lambda_{max}^2}{2\ n_d t_d\ \cos\theta - \lambda_{max}} \tag{25}$$

This is why we used $SiO_2$ as a dielectric instead of $TiO_2$ to obtain red colors since it has smaller $n_d$. Alternatively, one can obtain red colors using Au as a metal in FROC instead of Ag. Au's interband transitions in the blue part of the spectrum, responsible for its golden color, will suppress the cavity mode reflectance in blue.

Calculating the average spectral absorptance and emissivity: The spectrally averaged absorptivity of the selective surface is given by [87]

$$\bar{\alpha} = \frac{1}{I}\int_0^\infty d\lambda\ \varepsilon(\lambda)\frac{dI}{d\lambda} \tag{26}$$

And the emissivity is given by $$\bar{\varepsilon} = \frac{\int_0^\infty d\lambda\ \varepsilon(\lambda)/\{\lambda^5[\exp(hc/\lambda kT) - 1]\}}{\int_0^\infty d\lambda/\{\lambda^5[\exp(hc/\lambda kT) - 1]\}} \tag{207}$$

Where I is the solar intensity, λ is the wavelength, ε(λ) is the spectral emissivity of the selective absorber/emitter, $$\frac{dI}{d\lambda}$$

is the spectral light intensity which corresponds to the AM 1.5 solar spectrum, h is Plank's constant, c is the speed of light, k is the Boltzmann constant, and T is the absorber temperature, here taken as 100° C.

Photovoltaic Measurements:

A Solar simulator (Sanyu Inc., China) with AM1.5G airmass filter was first calibrated for 1 Sun (1000 W/m2) using a NREL certified PV reference solar cell (PV Measurements, Inc.). The output of a thermopile power meter (FieldMax II TO, Coherent Inc.) was set at 500 nm wavelength, corresponding to 1000 $W/m^2$ from calibrated solar simulator was used as unit of one optical concentration. A plano-convex lens of 250 mm focal length and 150 mm diameter was mounted at the output port of solar simulator to enhance optical concentration. The simulator current was varied to adjust solar irradiance from 1000 W/m$^2$ (286 mW at thermopile head) to 5000 W/m$^2$ (1430 mW). The PV cell was purchased, cut and two wires were soldered to have a functioning PV cell. The temperature was measured using thermocouples and we reported the equilibrium temperature. Power measured using a Keithley 2400 source meter by using an open circuit voltage and sweeping the voltage down to 0 while measuring the current. The maximum power reported is the maximum of the voltage and current product. Error bars are estimated based on the systematic error of the performed measurements.

Software for designing, modeling, and analyzing an optical coating according to the Application can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

1 Limonov, M. F., Rybin, M. V., Poddubny, A. N. & Kivshar, Y. S. Fano resonances in photonics. Nature Photonics 11, 543 (2017).
2 Miroshnichenko, A. E. et al. Fano Resonances: A Discovery that Was Not Made 100 Years Ago. Opt. Photon. News 19, 48-48 (2008).
3 Giannini, V., Francescato, Y., Amrania, H., Phillips, C. C. & Maier, S. A. Fano Resonances in Nanoscale Plasmonic Systems: A Parameter-Free Modeling Approach. Nano Letters 11, 2835-2840 (2011).
4 Mukherjee, S. et al. Fanoshells: Nanoparticles with Built-in Fano Resonances. Nano Letters 10, 2694-2701 (2010).
5 Zhang, S., Bao, K., Halas, N. J., Xu, H. & Nordlander, P. Substrate-Induced Fano Resonances of a Plasmonic Nanocube: A Route to Increased-Sensitivity Localized Surface Plasmon Resonance Sensors Revealed. Nano Letters 11, 1657-1663 (2011).
6 Luk'yanchuk, B. et al. The Fano resonance in plasmonic nanostructures and metamaterials. Nature Materials 9, 707 (2010).
7 Fan, J. A. et al. Self-Assembled Plasmonic Nanoparticle Clusters. Science 328, 1135 (2010).
8 Verellen, N. et al. Fano Resonances in Individual Coherent Plasmonic Nanocavities. Nano Letters 9, 1663-1667 (2009).
9 Fedotov, V. A., Rose, M., Prosvirnin, S. L., Papasimakis, N. & Zheludev, N. I. Sharp Trapped-Mode Resonances in Planar Metamaterials with a Broken Structural Symmetry. Physical Review Letters 99, 147401 (2007).
10 Yang, Y., Kravchenko, I. I., Briggs, D. P. & Valentine, J. All-dielectric metasurface analogue of electromagnetically induced transparency. Nature Communications 5, 5753 (2014).
11 Shen, Y. et al. Structural Colors from Fano Resonances. ACS Photonics 2, 27-32 (2015).
12 Khurgin, J. B. Slow light in various media: a tutorial. Adv. Opt. Photon. 2, 287-318 (2010).
13 Miroshnichenko, A. E., Flach, S. & Kivshar, Y. S. Fano resonances in nanoscale structures. Reviews of Modern Physics 82, 2257-2298 (2010).
14 Ruan, B. et al. Ultrasensitive Terahertz Biosensors Based on Fano Resonance of a Graphene/Waveguide Hybrid Structure. Sensors (Basel, Switzerland) 17, 1924 (2017).
15 Wu, C. et al. Fano-resonant asymmetric metamaterials for ultrasensitive spectroscopy and identification of molecular monolayers. Nature Materials 11, 69 (2011).
16 Sounas, D. L. & Alù, A. Fundamental bounds on the operation of Fano nonlinear isolators. Physical Review B 97, 115431 (2018).
17 Cordaro, A. et al. High-index dielectric metasurfaces performing mathematical operations. arXiv preprint arXiv:1903.08402 (2019).
18 Sonnefraud, Y. et al. Experimental Realization of Subradiant, Superradiant, and Fano Resonances in Ring/Disk Plasmonic Nanocavities. ACS Nano 4, 1664-1670 (2010).
19 Liu, N. et al. Plasmonic analogue of electromagnetically induced transparency at the Drude damping limit. Nature Materials 8, 758 (2009).
20 Macleod, H. A. Thin film Optical Filters. 4th edition edn, (London Adam Hilger, 1986).
21 Gallais, L. & Commandré, M. Laser-induced damage thresholds of bulk and coating optical materials at 1030 nm, 500 fs. Appl. Opt. 53, A186-A196 (2014).
22 Anjum, F., Fryauf, D. M., Ahmad, R., Phillips, A. C. & Kobayashi, N. P. Improving silver mirrors with aluminum oxynitride protection layers: variation in refractive index with controlled oxygen content by radiofrequency magnetron sputtering. Vol. 4 (SPIE, 2018).
23 L. E. Tannas, J. Flat-panel displays displace large, heavy, power-hungry CRTs. IEEE Spectr. 26, 34-35 (1989).
24 Hornbeck, L. J. Digital Light Processing for high-brightness high-resolution applications. Vol. 3013 EI (SPIE, 1997).
25 Dobrowolski, J. A., Ho, F. C. & Waldorf, A. Research on thin film anticounterfeiting coatings at the National Research Council of Canada. Appl. Opt. 28, 2702-2717 (1989).
26 Granqvist, C. G. & Hjortsberg, A. Surfaces for radiative cooling: Silicon monoxide films on aluminum. Applied Physics Letters 36, 139-141 (1980).
27 Raman, A. P., Anoma, M. A., Zhu, L., Rephaeli, E. & Fan, S. Passive radiative cooling below ambient air temperature under direct sunlight. Nature 515, 540 (2014).
28 Chen, Z., Zhu, L., Raman, A. & Fan, S. Radiative cooling to deep sub-freezing temperatures through a 24-h day-night cycle. Nature Communications 7, 13729 (2016).
29 Chen, D. Anti-reflection (AR) coatings made by sol-gel processes: A review. Solar Energy Materials and Solar Cells 68, 313-336 (2001).
30 Li, Z., Butun, S. & Aydin, K. Large-Area, Lithography-Free Super Absorbers and Color Filters at Visible Frequencies Using Ultrathin Metallic Films. ACS Photonics 2, 183-188 (2015).
31 ElKabbash, M., Iram, S., Letsou, T., Hinczewski, M. & Strangi, G. Designer Perfect Light Absorption Using Ultrathin Lossless Dielectrics on Absorptive Substrates. Advanced Optical Materials 6, 1800672 (2018).
32 Kats, M. A., Blanchard, R., Genevet, P. & Capasso, F. Nanometre optical coatings based on strong interference effects in highly absorbing media. Nature Materials 12, 20 (2012).
33 ElKabbash, M. et al. Iridescence-free and narrowband perfect light absorption in critically coupled metal high-index dielectric cavities. Opt. Lett. 42, 3598-3601 (2017).
34 Svensson, J. S. E. M. & Granqvist, C. G. Electrochromic Coatings For "Smart Windows". Vol. 0502 OP (SPIE, 1984).
35 Thielsch, R. in Optical Interference Coatings (eds Norbert Kaiser & Hans K. Pulker) 257-279 (Springer Berlin Heidelberg, 2003).
36 Optical thin films and coatings, from materials to applications second edition edn, (2013).
37 Yu, N. & Capasso, F. Flat optics with designer metasurfaces. Nature Materials 13, 139 (2014).
38 Li, Z., Palacios, E., Butun, S., Kocer, H. & Aydin, K. Omnidirectional, broadband light absorption using large-area, ultrathin lossy metallic film coatings. Scientific Reports 5, 15137 (2015).
39 Letsou, T., ElKabbash, M., Iram, S., Hinczewski, M. & Strangi, G. Heat-induced perfect light absorption in thin-film metasurfaces for structural coloring [Invited]. Opt. Mater. Express 9, 1386-1393 (2019).
40 Fan, S. Thermal Photonics and Energy Applications. Joule 1, 264-273 (2017).
41 Watts, C. M., Liu, X. & Padilla, W. J. Metamaterial Electromagnetic Wave Absorbers. Advanced Materials 24, OP98-OP120 (2012).
42 Aydin, K., Ferry, V. E., Briggs, R. M. & Atwater, H. A. Broadband polarization-independent resonant light absorption using ultrathin plasmonic super absorbers. Nature Communications 2, 517 (2011).
43 Landy, N. I., Sajuyigbe, S., Mock, J. J., Smith, D. R. & Padilla, W. J. Perfect Metamaterial Absorber. Physical Review Letters 100, 207402 (2008).
44 Dotan, H. et al. Resonant light trapping in ultrathin films for water splitting. Nature materials 12, 158-164 (2013).
45 ElKabbash, M. et al. Hydrogen Sensing Using Thin-Film Perfect Light Absorber. ACS Photonics 6, 1889-1894 (2019).
46 Sreekanth, K. V. et al. Generalized Brewster Angle Effect in Thin-Film Optical Absorbers and Its Application for Graphene Hydrogen Sensing. ACS Photonics (2019).
47 Gallinet, B. in Fano Resonances in Optics and Microwaves 109-136 (Springer, 2018).
48 Joe, Y. S., Satanin, A. M. & Kim, C. S. Classical analogy of Fano resonances. Physica Scripta 74, 259-266 (2006).
49 Ismail, N., Kores, C. C., Geskus, D. & Pollnau, M. Fabry-Pérot resonator: spectral line shapes, generic and related Airy distributions, linewidths, finesses, and performance at low or frequency-dependent reflectivity. Opt. Express 24, 16366-16389 (2016).
50 Fu, S. et al. Review of recent progress on single-frequency fiber lasers [Invited]. J. Opt. Soc. Am. B 34, A49-A62 (2017).
51 Lee, K.-T., Ji, C., Banerjee, D. & Guo, L. J. Angular- and polarization-independent structural colors based on 1D photonic crystals. Laser & Photonics Reviews 9, 354-362 (2015).
52 Tsakmakidis, K. L., Hess, O., Boyd, R. W. & Zhang, X. Ultraslow waves on the nanoscale. Science 358, eaan5196 (2017).
53 Yang, Z. et al. Reflective Color Filters and Monolithic Color Printing Based on Asymmetric Fabry-Perot Cavities Using Nickel as a Broadband Absorber. Advanced Optical Materials 4, 1196-1202 (2016).
54 Kumar, K. et al. Printing colour at the optical diffraction limit. Nature Nanotechnology 7, 557 (2012).
55 Tan, S. J. et al. Plasmonic Color Palettes for Photorealistic Printing with Aluminum Nanostructures. Nano Letters 14, 4023-4029 (2014).
56 Wang, H. et al. Full Color Generation Using Silver Tandem Nanodisks. ACS Nano 11, 4419-4427 (2017).
57 Cheng, F. et al. Aluminum plasmonic metamaterials for structural color printing. Opt. Express 23, 14552-14560 (2015).
58 Song, M. et al. Achieving full-color generation with polarization-tunable perfect light absorption. Opt. Mater. Express 9, 779-787 (2019).
59 Cheng, F., Gao, J., Luk, T. S. & Yang, X. Structural color printing based on plasmonic metasurfaces of perfect light absorption. Scientific Reports 5, 11045 (2015).
60 Yang, B. et al. Ultrahighly Saturated Structural Colors Enhanced by Multipolar-Modulated Metasurfaces. Nano Letters 19, 4221-4228 (2019).
61 Guay, J.-M. et al. Laser-induced plasmonic colours on metals. Nature Communications 8, 16095 (2017).
62 Mojiri, A., Taylor, R., Thomsen, E. & Rosengarten, G. Spectral beam splitting for efficient conversion of solar energy—A review. Renewable and Sustainable Energy Reviews 28, 654-663 (2013).
63 Paul Denholm, M. O. C., Gregory Brinkman, and Jennie Jorgenson. Overgeneration from Solar Energy in California: A Field Guide to the Duck Chart. (National Renewable Energy Laboratory: Golden, Colo., 2015).
64 Branz, H. M., Regan, W., Gerst, K. J., Borak, J. B. & Santori, E. A. Hybrid solar converters for maximum exergy and inexpensive dispatchable electricity. Energy & Environmental Science 8, 3083-3091 (2015).
65 Vossier, A. et al. Performance bounds and perspective for hybrid solar photovoltaic/thermal electricity-generation strategies. Sustainable Energy & Fuels 2, 2060-2067 (2018).
66 Cao, F. et al. Toward a High-Efficient Utilization of Solar Radiation by Quad-Band Solar Spectral Splitting. Advanced Materials 28, 10659-10663 (2016).
67 Shockley, W. & Queisser, H. J. Detailed Balance Limit of Efficiency of p-n Junction Solar Cells. Journal of Applied Physics 32, 510-519 (1961).
68 Zhu, L., Raman, A., Wang, K. X., Anoma, M. A. & Fan, S. Radiative cooling of solar cells. Optica 1, 32-38 (2014).
69 Sun, X., Sun, Y., Zhou, Z., Alam Muhammad, A. & Bermel, P. in Nanophotonics Vol. 6 997 (2017).
70 Teo, H. G., Lee, P. S. & Hawlader, M. N. A. An active cooling system for photovoltaic modules. Applied Energy 90, 309-315 (2012).
71 Mittelman, G., Kribus, A. & Dayan, A. Solar cooling with concentrating photovoltaic/thermal (CPVT) systems. Energy Conversion and Management 48, 2481-2490 (2007).
72 Riesen, Y., Stuckelberger, M., Haug, F. J., Ballif, C. & Wyrsch, N. Temperature dependence of hydrogenated amorphous silicon solar cell performances. Journal of Applied Physics 119, 044505 (2016).

73 Saleem, M. R., Honkanen, S. & Turunen, J. in IOP Conference Series: Materials Science and Engineering. 012008 (IOP Publishing).
74 Zhan, Z. et al. Enhancing thermoelectric output power via radiative cooling with nanoporous alumina. Nano Energy 65, 104060 (2019).
75 Kraemer, D. et al. High-performance flat-panel solar thermoelectric generators with high thermal concentration. Nature Materials 10, 532-538 (2011).
76 Weinstein, L. A. et al. A Hybrid Electric and Thermal Solar Receiver. Joule 2, 962-975 (2018).
77 Lee, Y. U. et al. Double Fano resonances in a composite metamaterial possessing tripod plasmonic resonances. Journal of Optics 17, 025103 (2015).
78 Yang, Y. et al. Nonlinear Fano-Resonant Dielectric Metasurfaces. Nano Letters 15, 7388-7393 (2015).
79 Xu, Y. & Miroshnichenko, A. E. Reconfigurable nonreciprocity with a nonlinear Fano diode. Physical Review B 89, 134306 (2014).
80 Chen, Z. et al. Graphene controlled Brewster angle device for ultra broadband terahertz modulation. Nature Communications 9, 4909 (2018).
81 Sreekanth, K. V. et al. Phase-Change-Material-Based Low-Loss Visible-Frequency Hyperbolic Metamaterials for Ultrasensitive Label-Free Biosensing. Advanced Optical Materials 7, 1900081 (2019).
82 Meade, R. D., Brommer, K. D., Rappe, A. M. & Joannopoulos, J. D. Electromagnetic Bloch waves at the surface of a photonic crystal. Physical Review B 44, 10961-10964 (1991).
83 Yu, J., Yuan, S., Gao, J.-Y. & Sun, L. Optical pulse propagation in a Fabry-Perot etalon: analytical discussion. J. Opt. Soc. Am. A 18, 2153-2160 (2001).
84 Bendickson, J. M., Dowling, J. P. & Scalora, M. Analytic expressions for the electromagnetic mode density in finite, one-dimensional, photonic band-gap structures. Physical Review E 53, 4107-4121 (1996).
85 Chilwell, J. & Hodgkinson, I. Thin-films field-transfer matrix theory of planar multilayer waveguides and reflection from prism-loaded waveguides. J. Opt. Soc. Am. A 1, 742-753 (1984).
86 Ohta, N. & Robertson, A. Colorimetry: fundamentals and applications. (John Wiley & Sons, 2006).
87 Bermel, P. et al. Design and global optimization of high-efficiency thermophotovoltaic systems. Opt. Express 18, A314-A334 (2010).
88 Xi, J. Q. et al. Optical thin-film materials with low refractive index for broadband elimination of Fresnel reflection. Nature Photonics 1, 176 (2007).
89 Wang, Y., Liu, H. & Zhu, J. Solar thermophotovoltaics: Progress, challenges, and opportunities. APL Materials 7, 080906 (2019).
90 Mitchell, B. et al. Four-junction spectral beam-splitting photovoltaic receiver with high optical efficiency. Progress in Photovoltaics: Research and Applications 19, 61-72 (2011).

What is claimed is:

1. An optical coating comprising:

a first resonator comprising a broadband light absorber comprising a first dielectric and a first metal, wherein the first metal is partially reflective; and a second resonator comprising a narrowband light absorber disposed adjacent to and optically coupled to said broadband light absorber comprising a second dielectric and a second metal, wherein the narrowband light absorber and the broadband light absorber are optically coupled though the first metal, and wherein a resonant destructive interference between spectrally overlapping cavities of said first resonator and said second resonator yields a Fano resonance absorption and reflection line.

* * * * *